United States Patent
Zhang et al.

(10) Patent No.: US 11,733,414 B2
(45) Date of Patent: *Aug. 22, 2023

(54) SYSTEMS AND METHODS FOR GENERATING SUBSURFACE DATA AS A FUNCTION OF POSITION AND TIME IN A SUBSURFACE VOLUME OF INTEREST

(71) Applicant: CHEVRON U.S.A. INC., San Ramon, CA (US)

(72) Inventors: Yang Zhang, Sugar Land, TX (US); Mark Allan Meadows, Danville, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 277 days.

This patent is subject to a terminal disclaimer.

(21) Appl. No.: 17/028,797

(22) Filed: Sep. 22, 2020

(65) Prior Publication Data
US 2022/0091291 A1    Mar. 24, 2022

(51) Int. Cl.
*G01V 1/30* (2006.01)
*E21B 47/003* (2012.01)
*G06F 18/214* (2023.01)
*G06F 18/2415* (2023.01)

(52) U.S. Cl.
CPC ............ *G01V 1/306* (2013.01); *E21B 47/003* (2020.05); *G06F 18/214* (2023.01); *G06F 18/2415* (2023.01)

(58) Field of Classification Search
CPC .... G01V 1/306; E21B 47/003; G06K 9/6256; G06K 9/6277
See application file for complete search history.

(56) References Cited

U.S. PATENT DOCUMENTS

| | | | |
|---|---|---|---|
| 10,353,096 B2* | 7/2019 | Lafet | G01V 1/308 |
| 11,105,943 B2* | 8/2021 | Chen | G01V 99/005 |
| 2016/0103245 A1* | 4/2016 | Pyrcz | G01V 11/00 |
| | | | 703/2 |
| 2019/0064389 A1 | 2/2019 | Denli et al. | |
| 2019/0302295 A1 | 10/2019 | Hoversten et al. | |
| 2020/0183046 A1 | 6/2020 | Wheelock et al. | |
| 2020/0200935 A1* | 6/2020 | Ray | G01V 1/306 |

(Continued)

FOREIGN PATENT DOCUMENTS

WO    WO 2021/130512    7/2021

OTHER PUBLICATIONS

Cao et al., "Time-lapse reservoir property change estimation from seismic using machine learning," The Leading Edge (2017) 36: 234-238.

(Continued)

*Primary Examiner* — Bryan Bui
(74) *Attorney, Agent, or Firm* — Sheppard, Mullin, Richter & Hampton LLP

(57) ABSTRACT

Systems and methods are disclosed for generating subsurface data as a function of position and time. Exemplary implementations may include obtaining a first initial subsurface model and a first set of subsurface parameters, obtaining training subsurface property data and a first training subsurface dataset, generating a first conditioned subsurface model, and storing the first conditioned subsurface model.

17 Claims, 28 Drawing Sheets

(56) References Cited

U.S. PATENT DOCUMENTS

2020/0217978 A1 7/2020 Chen et al.
2022/0091300 A1* 3/2022 Zhang .................. G01V 99/005

OTHER PUBLICATIONS

Côrte et al. "Deep neural network application for 4D seismic inversion to changes in pressure and saturation: Optimizing the use of synthetic training datasets." Geophysical Prospecting 68.7 (2020): 2164-2185.

Dramsch et al., "Deep learning application for 4D pressure saturation inversion compared to Bayesian inversion on North Sea Data." Second EAGE Workshop Practical Reservoir Monitoring 2019. vol. 2019. No. 1. European Association of Geoscientists & Engineers, 2019.

Das et al., "Convolutional neural network for seismic impedance inversion," Geophysics (2019) 84:R869-R880.

Golfetto et al., "Evaluating the magnitude of time-lapse effects through 4D core tests: lessons from a North Sea reservoir." SPE Europec/EAGE Annual Conference. Society of Petroleum Engineers, 2005, 10 pages.

Martin et al., "Using machine learning to predict production at a Peace River thermal EOR site." SPE Reservoir Simulation Conference. Society of Petroleum Engineers, 2017, 8 pages.

Na'imi et al., "Estimation of reservoir porosity and water saturation based on seismic attributes using support vector regression approach." Journal of Applied Geophysics 107 (2014): 93-101.

Nasser et al., "Prestack 3D and 4D seismic inversion for reservoir static and dynamic properties." The Leading Edge 35.5 (2016): 415-422.

Stammeijer et al., "Standards in 4D feasibility and interpretation." The Leading Edge 33.2 (2014): 134-140.

Tiwari et al., "SAGD dynamic reservoir property characterization using machine learning." SEG Technical Program Expanded Abstracts 2018. Society of Exploration Geophysicists, 2018. 2031-2035.

Zhong et al. "Inversion of time-lapse seismic reservoir monitoring data using cycleGAN: a deep learning-based approach for estimating dynamic reservoir property changes." Journal of Geophysical Research: Solid Earth 125.3 (2020), 27 pages.

Moseley et al., "Deep learning for fast simulation of seismic waves in complex media," Solid Earth, 11 (2020), pp. 1527-1549; https://doi.org/10.5194/se-11-1527-2020.

Moseley et al., "Fast approximate simulation of seismic waves with deep learning," Arxix.org, Cornell University Library, Jul. 18, 2018, 10 pages.

Shahraeeni et al., "Fast probabilistic petrophysical mapping of reservoirs from 3D seismic data," Geophysics, vol. 77, No. 3, May 1, 2012, 19 pages.

International Search Report & Written Opinion dated Dec. 20, 2021 for International Application No. PCT/US2021/049912, filed Sep. 10, 2021.

International Search Report & Written Opinion dated Dec. 14, 2021 for International Application No. PCT/US2021/049921, filed Sep. 10, 2021.

International Search Report & Written Opinion dated Dec. 20, 2021 for International Application No. PCT/US2021/049927, filed Sep. 10, 2021.

* cited by examiner

706

712

704

710

702

708

1402

1404

1406

1408

1410

1412

1506　　1512

1504　　1510

1502　　1508

1606
1612

1604
1610

1602
1608

1

SYSTEMS AND METHODS FOR GENERATING SUBSURFACE DATA AS A FUNCTION OF POSITION AND TIME IN A SUBSURFACE VOLUME OF INTEREST

FIELD OF THE DISCLOSURE

The present disclosure relates to systems and methods for generating subsurface data as a function of position and time.

SUMMARY

Implementations of the present disclosure include systems, methods, devices, and apparatuses capable of generating subsurface data as a function of position and time in a subsurface volume of interest. In accordance with the technology described herein, a computer-implemented method for training a subsurface model to generate subsurface data as a function of position and time in a subsurface volume of interest is disclosed. The computer-implemented method is implemented in a computer system that includes a physical computer processor and electronic storage. The computer-implemented method may include a number of operations. One operation may include obtaining a first initial subsurface model and a first set of subsurface parameters. The first set of subsurface parameters may define a first set of subsurface relationships between a first training subsurface dataset and subsurface properties. Another operation may include obtaining at least one of (i) training subsurface property data specifying changes to subsurface property values as a function of position and time in the subsurface volume of interest and (ii) a first training subsurface dataset specifying changes to subsurface energy values as a function of position and time in the subsurface volume of interest. Yet another operation may include generating a first conditioned subsurface model by training the first initial subsurface model using at least one of the training subsurface property data, the first training subsurface dataset, and the first set of subsurface parameters. Another operation may include storing the first conditioned subsurface model.

In implementations, another operation may further include obtaining a first target subsurface property dataset specifying changes to subsurface property values as a function of position and time in the subsurface volume of interest. Another operation may include generating a first target subsurface dataset specifying a first set of subsurface energy values as a function of position and time in the subsurface volume of interest by applying the first conditioned subsurface model to at least the first target subsurface property dataset.

In implementations, one operation may further include obtaining a second target subsurface property dataset specifying changes to the subsurface property values as a function of position and time in the subsurface volume of interest. First noise corresponding to the first target subsurface property dataset may be different from second noise corresponding to the second target subsurface property dataset. Another operation may include generating a second target subsurface dataset specifying a second set of subsurface energy values as a function of position and time in the subsurface volume of interest by applying the first conditioned subsurface model to at least the second target subsurface property dataset. Yet another operation may include generating a first subsurface data uncertainty based on at least the first target subsurface dataset and the second target subsurface dataset.

In implementations, the computer system may further include a display. One operation of the computer-implemented method may include generating a representation of the subsurface data as a function of position and time in the subsurface volume of interest using visual effects to depict at least some of the first target subsurface dataset as a function of position and time. Another operation may include displaying the representation.

In implementations, one operation may include obtaining at least one of a second initial subsurface model and a second set of subsurface parameters. The second set of subsurface parameters may define a second set of subsurface relationships between a second training subsurface dataset and the subsurface properties. Another operation may include generating a second conditioned subsurface model by training the second initial subsurface model using at least one of the training subsurface property data, a second training subsurface dataset, and the second set of subsurface parameters. Yet another operation may include generating a third target subsurface dataset specifying a third set of subsurface energy values as a function of position and time by applying the second conditioned subsurface model to at least the first target subsurface property dataset. Another operation may include generating a second subsurface data uncertainty based on at least the first target subsurface dataset and the third target subsurface dataset.

In implementations, the second subsurface models may include a different model design from the first subsurface models. The model design may include at least one of a machine learning model, a design, a model parameter, and a threshold.

In implementations, at least one of the initial subsurface models and the conditioned subsurface models may include at least one of a neural network, a random forest model, a support vector machine, a regression, and a Bayesian network.

In implementations, the subsurface property data may include changes as a function of position and time to at least one of a geomechanical property, an anisotropic rock property, a reservoir pore pressure, a temperature, a fluid saturation, and a fluid property.

In implementations, the subsurface data may include at least one of a seismic angle stack change, a prestack seismic property change, a timeshift, a time strain, an amplitude-versus-offset (AVO) gather change, a compressional velocity change, a shear-wave velocity change, a density change, a velocity ratio change, a Poisson Ratio change, an acoustic impedance change, and a shear impedance change.

In implementations, the subsurface parameters may include at least one of a set of dry rock matrix coefficients, anisotropic coefficients, grain bulk modulus, grain density, pore pressure, overburden pressure, porosity, temperature, water saturation, oil saturation, gas saturation, brine salinity, oil API gravity, gas gravity, gas-oil ratio, geomechanical compaction coefficient, and geomechanical R-factor.

In accordance with one aspect of the technology described herein, a computer-implemented method for training a subsurface model to generate subsurface data as a function of position and time in a subsurface volume of interest is disclosed. The computer-implemented method may be implemented in a computer system that includes a physical computer processor and electronic storage. The computer-implemented method may include a number of operations. One operation may include obtaining a first conditioned subsurface model. The first conditioned subsurface model may have been generated by applying the first initial subsurface model to at least one of the training subsurface property data, the first training subsurface dataset, and the first set of subsurface parameters. The training subsurface property data may specify changes to subsurface property values as a function of position and time in the subsurface volume of interest. The first training subsurface dataset may specify changes to subsurface energy values as a function of position and time in the subsurface volume of interest. The first set of subsurface parameters may define a first set of subsurface relationships between a first training subsurface dataset and subsurface properties. Another operation may include obtaining a first target subsurface property dataset specifying changes to subsurface property values as a function of position and time in the subsurface volume of interest. Yet another operation may include generating a first target subsurface dataset specifying a first set of subsurface energy values as a function of position and time in the subsurface volume of interest by applying the first conditioned subsurface model to at least the first target subsurface property dataset.

In implementations, the computer system may further include a display. One operation of the computer-implemented method may further include generating a representation of the subsurface data as a function of position and time in the subsurface volume of interest using visual effects to depict at least some of the first target subsurface dataset as a function of position and time. Another operation may include displaying the representation.

In implementations, one operation may further include obtaining a second target subsurface property dataset specifying changes to the subsurface property values as a function of position and time in the subsurface volume of interest. First noise corresponding to the first target subsurface property dataset may be different from second noise corresponding to the second target subsurface property dataset. Another operation may include generating a second target subsurface dataset specifying a second set of subsurface energy values as a function of position and time in the subsurface volume of interest by applying the first conditioned subsurface model to at least the second target subsurface property dataset. Yet another operation may include generating a first subsurface data uncertainty based on at least the first target subsurface dataset and the second target subsurface dataset.

In implementations, the computer system may further include a display. One operation of the computer-implemented method may include generating a representation of at least one of the subsurface data and subsurface data uncertainty as a function of position and time in the subsurface volume of interest using visual effects to depict at least some of the first target subsurface dataset as a function of position and time and corresponding first subsurface data uncertainty. Another operation may include displaying the representation.

In implementations, one operation may further include obtaining at least one of a second initial subsurface model and a second set of subsurface parameters. The second set of subsurface parameters may define a second set of subsurface relationships between a second training subsurface dataset and the subsurface properties. Another operation may include generating a second conditioned subsurface model by training the second initial subsurface model using at least one of the training subsurface property data, a second training subsurface dataset, and the second set of subsurface parameters. Yet another operation may include generating a third target subsurface dataset specifying a third set of subsurface energy values as a function of position and time by applying the second conditioned subsurface model to at least the first target subsurface property dataset. Another operation may include generating a second subsurface data uncertainty based on at least the first target subsurface dataset and the third target subsurface dataset.

In accordance with one aspect of the technology described herein, a system for generating subsurface data as a function of position and time in a subsurface volume of interest is disclosed. The system may include electronic storage and a physical computer processor configured by machine readable instructions to perform a number of operations. One operation may include obtaining a first conditioned subsurface model. The first conditioned subsurface model may have been generated by applying the first initial subsurface model to at least one of the training subsurface property data, the first training subsurface dataset, and the first set of subsurface parameters. Another operation may include obtaining a first target subsurface property dataset specifying changes to subsurface property values as a function of position and time in the subsurface volume of interest. Yet another operation may include generating a first target subsurface dataset specifying a first set of subsurface energy values as a function of position and time in the subsurface volume of interest by applying the first conditioned subsurface model to at least the first target subsurface property dataset.

In implementations, the system may further include a display. One operation may include generating a representation of the subsurface data as a function of position and time in the subsurface volume of interest using visual effects to depict at least some of the first target subsurface dataset as a function of position and time. Another operation may include displaying the representation.

In implementations, one operation may include obtaining a second target subsurface property dataset specifying changes to the subsurface property values as a function of position and time in the subsurface volume of interest. First noise corresponding to the first target subsurface property dataset may be different from second noise corresponding to the second target subsurface property dataset. Another operation may include generating a second target subsurface dataset specifying a second set of subsurface energy values as a function of position and time in the subsurface volume of interest by applying the first conditioned subsurface model to at least the second target subsurface property dataset. Yet another operation may include generating a first subsurface data uncertainty based on at least the first target subsurface dataset and the second target subsurface dataset.

In implementations, one operation may include obtaining at least one of a second initial subsurface model and a second set of subsurface parameters. The second set of subsurface parameters may define a second set of subsurface relationships between a second training subsurface dataset and the subsurface properties. Another operation may include generating a second conditioned subsurface model by training the second initial subsurface model using at least one of the training subsurface property data, a second training subsurface dataset, and the second set of subsurface parameters. Yet another operation may include generating a third target subsurface dataset specifying a third set of subsurface energy values as a function of position and time by applying the second conditioned subsurface model to at least the first target subsurface property dataset. Another operation may include generating a second subsurface data uncertainty based on at least the first target subsurface dataset and the third target subsurface dataset.

In implementations, the second subsurface models may include a different model design from the first subsurface models. The model design may include at least one of a machine learning model, a design, a model parameter, and a threshold.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as limiting. As used in the specification and in the claims, the singular form of "a", "an", and "the" include plural referents unless the context clearly dictates otherwise. The use of "angle" or "angles" is to be synonymous with "offset," unless the context clearly dictates otherwise.

The technology disclosed herein, in accordance with one or more various implementations, is described in detail with reference to the following figures. The drawings are provided for purposes of illustration only and merely depict typical or example implementations of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION

Figure 1A:
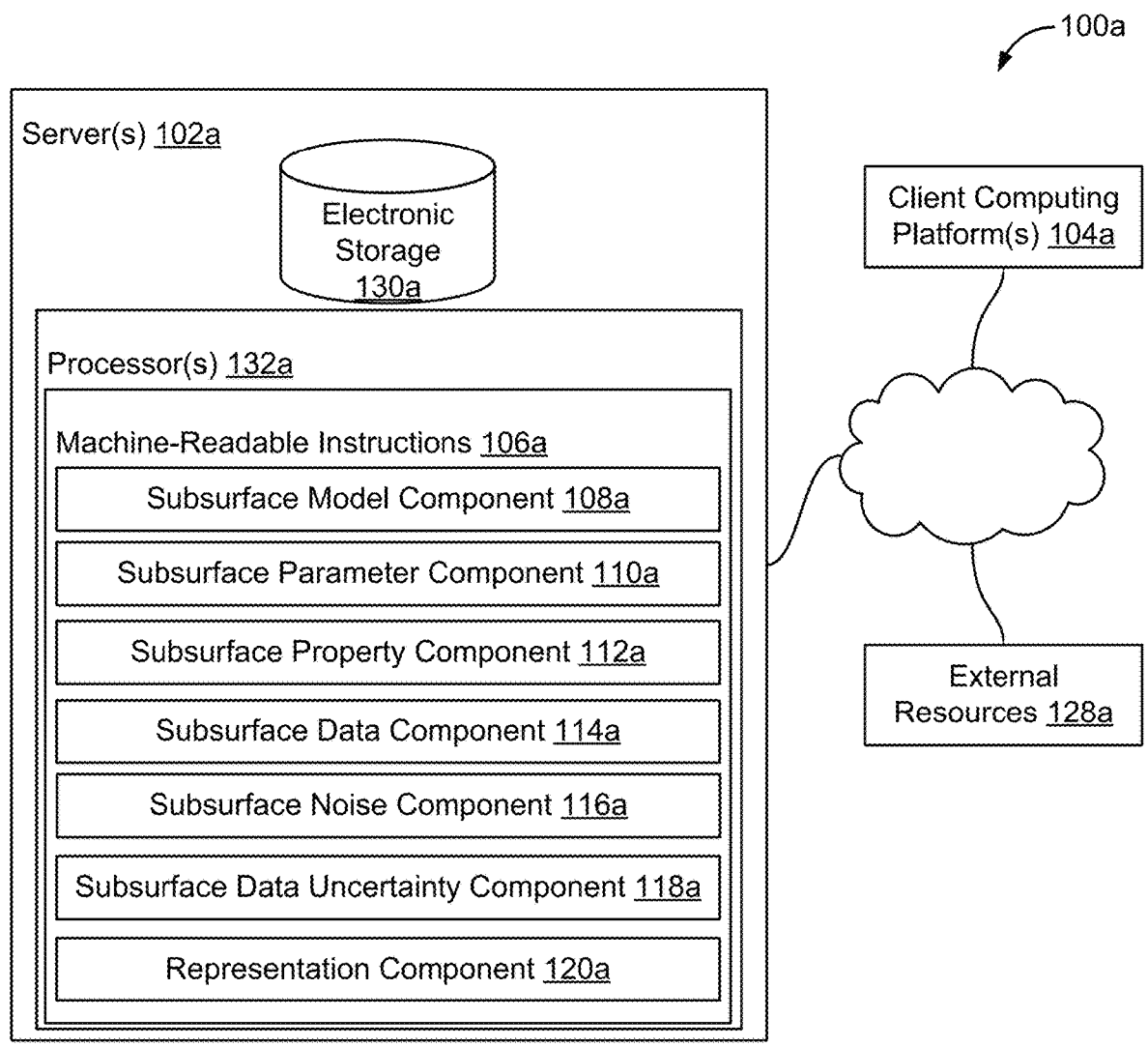
FIG. 1A illustrates a system for generating subsurface data as a function of position and time in a subsurface volume of interest, in accordance with one or more implementations.

Existing approaches may rely on models in 4D feasibility studies that require laboratory measurements for a variety of subsurface features. In addition to requiring a sanitized environment, this can take months to properly measure. Accordingly, estimates of synthetic seismic data, elastic property data, and/or subsurface property data derived from the model may take months to generate. Moreover, these approaches fail to account for uncertainty stemming from a variety of sources. In addition, none of these approaches consider machine learning in complex oil-water-gas systems to generate: 4D synthetic seismic data from 4D elastic or reservoir property data as input; 4D elastic property data from 4D subsurface data as input; and/or 4D subsurface property data from 4D elastic property data as input. Current approaches to 4D subsurface modeling, elastic inversion, and/or subsurface property inversion may also be computationally challenging and/or suffer from unstable and noisy outputs.

Disclosed are systems and methods for generating subsurface data as a function of position and time in a subsurface volume of interest. Position may refer to a 1D, 2D, and/or 3D space. The presently disclosed technology can generate subsurface data as a function of position and time in a subsurface volume of interest based on subsurface property data specifying changes to subsurface property values as a function of position and time. For example, the presently disclosed technology may use machine learning techniques (e.g., neural networks) to train a model using training data. The model may use multiple subsurface parameters that define a subsurface relationship between the subsurface properties and the subsurface data. The model may use the multiple subsurface parameters to define an importance, or weight, to different subsurface properties, and how the different subsurface properties affect the subsurface data. The trained model can immediately be applied to any subsurface property data, whether measured in a lab or in the field, or derived through simulation, to generate corresponding subsurface data. In implementations, uncertainty from various sources (e.g., subsurface property measurements, machine learning estimates, subsurface parameter importance estimates, and so on) may be incorporated into the model by applying a range of subsurface property and subsurface parameter values to the model, thereby generating a range of subsurface data that can be used to estimate subsurface data uncertainty.

In addition, disclosed are systems and methods for generating elastic property data as a function of position and time in a subsurface volume of interest. The presently disclosed technology can generate elastic property data as a function of position and time in a subsurface volume of interest based on subsurface data specifying changes to subsurface energy values as a function of position and time in the subsurface volume of interest. For example, the presently disclosed technology may use machine learning techniques (e.g., neural networks) to train a model using training data. The model may use multiple elastic parameters that define an elastic property relationship between the elastic properties and the subsurface data. The model may use the multiple elastic parameters to define an importance, or weight, to different subsurface data, and how the different subsurface data affect the elastic properties. The trained model can immediately be applied to any subsurface data, whether measured in a lab, in the field, or via simulation, to generate corresponding elastic property data. In implementations, uncertainty from various sources (e.g., subsurface data measurements, machine learning estimates, elastic parameter importance estimates, and so on) may be incorporated into the model by applying a range of subsurface data and elastic parameter values to the model, thereby generating a range of elastic property data that can be used to estimate elastic property data uncertainty. The presently disclosed technology may perform 4D elastic inversion in an efficient and robust manner using model-based machine learning to derive quantities, such as shear-wave velocity and density changes, that traditionally have been difficult to determine. 4D may refer to three-dimensional position and time as the fourth dimension.

In addition, disclosed are systems and methods for generating subsurface property data as a function of position and time in a subsurface volume of interest. The presently disclosed technology can generate subsurface property data as a function of position and time in a subsurface volume of interest based on an input dataset including (a) a first target subsurface dataset specifying changes to subsurface energy values as a function of position and time in the subsurface volume of interest and/or (b) a first target elastic property dataset specifying changes to elastic property values as a function of position and time in the subsurface volume of interest. For example, the presently disclosed technology may use machine learning techniques (e.g., neural networks) to train a model using training data. The model may use multiple subsurface property parameters that define a subsurface property relationship between the subsurface properties and the input dataset. The model may use the multiple subsurface property parameters to define an importance, or weight, to different input data, and how the different input data affect the subsurface properties. The trained model can immediately be applied to the relevant types of input data, whether measured in a lab, in the field, or via simulation, to generate corresponding subsurface property data. In implementations, subsurface property uncertainty from various sources (e.g., input data measurements, machine learning estimates, subsurface property parameter importance estimates, and so on) may be incorporated into the model by applying a range of input data and subsurface property parameter values to the model, thereby generating a range of subsurface property data that can be used to estimate subsurface property data uncertainty. The presently disclosed technology inverts for dynamic changes in subsurface properties over time from 4D subsurface data using model-based machine learning. This avoids traditional problems associated with 4D inversion, such as large computational requirements, to generate quantitative estimates that can be directly applied to reservoir model building/updating and seismic history matching.

The subsurface volume of interest may refer to practically anything under a surface. For example, the subsurface volume of interest may be practically anything under a terrestrial surface (e.g., practically anything under a land surface), practically anything under a seafloor, etc. A water column may be above the subsurface volume of interest, for example, in marine hydrocarbon exploration, in marine hydrocarbon recovery, etc. The subsurface volume of interest may be onshore in some implementations. Alternatively, the subsurface volume of interest may be offshore, with shallow water or deep water above the subsurface volume of interest, in some implementations. The subsurface volume of interest may include faults, fractures, overburdens, underburdens, sideburdens, salts, salt welds, rocks, sands, sediments, pore space, etc. The subsurface volume of interest may include practically any geologic point or volume of interest (such as a survey area).

The subsurface volume of interest may also include hydrocarbons, such as liquid hydrocarbons (also known as oil or petroleum), gas hydrocarbons (e.g., natural gas), solid hydrocarbons (e.g., asphaltenes or waxes), a combination of liquid hydrocarbons, gas hydrocarbons, and solid hydrocarbons, etc. Light crude oil, medium oil, heavy crude oil, and extra heavy oil, as defined by the American Petroleum Institute (API) gravity, are examples of hydrocarbons. Indeed, examples of hydrocarbons are many, and may include, oil, natural gas, kerogen, bitumen, clathrates (also referred to as hydrates), etc. The subsurface volume of interest may be known to include hydrocarbons in some implementations. However, the subsurface volume of interest may not be known to include hydrocarbons, such as during hydrocarbon exploration, in other implementations.

The subsurface volume of interest, the hydrocarbons, or any combination thereof may also include non-hydrocarbon items. For example, non-hydrocarbon items may include connate water, brine, tracers, carbon dioxide, items used in enhanced oil recovery or other hydrocarbon recovery processes, items from other types of treatments (e.g., gels used in conformance control), etc.

In short, each subsurface volume of interest may have a variety of characteristics, such as petrophysical rock properties, reservoir fluid properties, reservoir conditions, or any combination thereof. For example, each subsurface volume of interest may be associated with at least one of: subsurface property, temperature, porosity, permeability, water composition, mineralogy, hydrocarbon type, hydrocarbon quantity, reservoir location, overburden pressure, pore pressure, etc. Indeed, those of ordinary skill in the art will appreciate that the characteristics are many, including, but not limited to: shale gas, shale oil, tight gas, tight oil, tight carbonate, carbonate, vuggy carbonate, unconventional (e.g., a rock matrix with an average pore size less than 1 micrometer), diatomite, geothermal, coalbed methane, a methane hydrate-containing subsurface volume of interest, a mineral-containing subsurface volume of interest, a metal-containing subsurface volume of interest, a subsurface volume of interest having a permeability in the range of 0.01 microdarcy to 10 millidarcy, a subsurface volume of interest having a permeability in the range of 10 millidarcy to 40,000 millidarcy, etc.

FIG. 1A illustrates a system for generating subsurface data as a function of position and time in a subsurface volume of interest, in accordance with one or more implementations. In some implementations, system 100a may include a server 102a. Server 102a may be configured to communicate with a client computing platform 104a according to a client/server architecture and/or other architectures. Client computing platform 104a may be configured to communicate with other client computing platforms via server 102a and/or according to a peer-to-peer architecture and/or other architectures. Users may access system 100a via client computing platform 104a.

Server 102a may be configured by machine-readable instructions 106a. Machine-readable instructions 106a may include an instruction component. The instruction component may include computer program components. The instruction component may include a subsurface model component 108a, a subsurface parameter component 110a, a subsurface property component 112a, a subsurface data component 114a, a subsurface noise component 116a, a subsurface data uncertainty component 118a, a representation component 120a, and/or other instruction component.

Subsurface model component 108a may be configured to obtain a first initial subsurface model. The first initial subsurface model may be based on machine learning techniques to map at least one variable to at least another variable. For example, the first initial subsurface model may receive subsurface property data as input and output subsurface data. The first initial subsurface model may be "untrained" or "unconditioned," indicating it may not estimate an output based on the input as accurately as a "trained" or "conditioned" model.

Subsurface property data may specify changes to a subsurface property value as a function of position and time in the subsurface volume of interest. In implementations, the subsurface property data may include a quantitative and/or qualitative value corresponding to the subsurface property. The changes to the subsurface property may include a change in a position as a function of time, a change in subsurface property values as a function of time, a change in subsurface property values as a function of position, or a combination of the above. For example, the subsurface property data may include changes as a function of position and time to a geomechanical property, a fluid saturation, and/or a fluid property. It should be appreciated that these are exemplary; other subsurface property data may include changes as a function of position and time to an anisotropic rock property, a reservoir pore pressure, and/or a temperature. While changes in values are listed above, a value at a given time and/or position may also be included in the subsurface property data.

Subsurface data may specify changes to subsurface energy values as a function of position and time in the subsurface volume of interest. The changes to the subsurface data may be used to identify a change in a position as a function of time, a change in subsurface energy values as a function of time, the change in subsurface energy values as a function of position, or a combination of the above. The subsurface energy values may be the data collected and/or measured by sending energy through a subsurface volume of interest to a receiver. In some implementations, the subsurface energy values may be characterized as the response of the elastic wavefield to contrasts across interfaces of subsurface layers as energy travels from a source through the subsurface to a receiver. The subsurface data may include a seismic angle stack change, a prestack seismic property change, a timeshift, a time strain, an amplitude-versus-offset (AVO) gather change, a compressional velocity change, a shear-wave velocity change, a density change, and/or a velocity ratio change. It should be appreciated that these are exemplary; other subsurface data may include a Poisson Ratio change, an acoustic impedance change, and/or a shear impedance change. While changes in values are listed above, a value at a given time and/or position may also be included in the subsurface data.

The subsurface models disclosed herein may include, for example, a neural network, a random forest model, a support vector machine, a regression, a Bayesian network, and/or other subsurface models. It should be appreciated that other subsurface models may include, for example, convolutional neural networks, reinforcement learning, transfer learning, and/or other machine learning technologies.

Referring back to FIG. 1A, in some implementations, subsurface model component 108a may be configured to obtain a second initial subsurface model. The second initial subsurface model may be substantially similar to, or the same as, the first initial subsurface model. In some implementations, the second initial subsurface model may be different from the first initial subsurface model. For example, the differences may be based on a different model design, different model components, a different machine learning model, a different set of subsurface parameters, and/or other differences discussed herein.

A given subsurface model design may include a machine learning model, a design, a model parameter, and/or a threshold. For example, different model designs may include different structure parameters (e.g., first neuron number, hidden layer number, batch size, drop out, and/or activation), hyperparameters (e.g., learning rate, optimizer, losses, and/or epochs), functions (e.g., objective functions), thresholds (e.g., measure of model effectiveness), and/or other design features, such as, for example, running time.

For example, a first neuron number may refer to the number of neurons in the first layer of a neural network. A hidden layer number may refer to the number of layers between the first (input) and last (output) layers of a neural network. Batch size may refer to the number of samples processed in one iteration. Drop out may refer to the rate at which randomly selected neurons are ignored during training. Activation may refer to a function that defines the output of a neural-net node given an input or set of inputs. Learning rate may refer to the amount that the weights in a neural network are updated during training, usually expressed as a number between 0 and 1. Optimizer may refer to an algorithm that alters the attributes of a neural network in order to minimize losses and provide the most accurate results possible. Loss may refer to the value calculated by the objective (or loss) function. Epoch may refer to the number of complete passes, or iterations, through the training dataset. Objective function may refer to a function (also known as the cost, or loss, function) that represents the error of a set of weights in a neural network. Threshold may refer to a measure that determines whether a trained neural network adequately reproduces the training data to sufficient accuracy. Running time may refer to the computational runtime required to train a neural network.

In implementations, structure parameters may have more of an impact on optimizing the subsurface model than the hyperparameters or other design features. For example, this might mean that a 1% change in a structure parameter value changes the accuracy, speed, and/or other elements of the subsurface model more than a 1 change in the hyperparameter values or other design feature values. In some implementations, the hyperparameters and/or other design features have more of an impact on optimizing the subsurface model than the structure parameters. In one example, the neuron numbers, hidden layer numbers, and epochs may have the greatest impact on optimizing the subsurface model. The model components may include a different combination of subsurface models, as discussed herein. Subsurface parameters will be discussed herein.

In some implementations, subsurface model component 108a may be configured to generate a first conditioned subsurface model. The first conditioned subsurface model may be generated by training the first initial subsurface model using training subsurface property data, a first training subsurface dataset, and a first set of subsurface parameters. In implementations, the subsurface model is "conditioned," indicating the subsurface model may have been trained to optimize performance and/or improve accuracy of the initial subsurface model. For example, the conditioned subsurface model may more accurately output subsurface data based on subsurface property data as input. In implementations, the conditioned subsurface model may have generated a non-linear relationship between the subsurface property data and the subsurface data.

Training the first initial subsurface model may include applying the first training subsurface property data to the first initial subsurface model based on the first set of subsurface parameters to generate a first iteration of subsurface data. The first initial subsurface model may be adjusted to more accurately estimate the subsurface data based on differences between the first iteration of subsurface data and the training subsurface data that correspond to the first training subsurface property data. This is repeated numerous times until the first subsurface model is "conditioned," i.e., it is able to output subsurface data that are consistently within a threshold of the training subsurface data. In some implementations, the threshold may depend on the speed of the subsurface model, resources used by the subsurface model, and/or other optimization metrics. This threshold may be based on an average of values, a maximum number of values, and/or other parameters. Other metrics may be applied to determine that the first subsurface model is "conditioned."

In some implementations, subsurface model component 108a may be configured to generate a second conditioned subsurface model. The second conditioned subsurface model may be generated in a manner substantially similar to, or the same as, the first conditioned subsurface model. In some implementations, the second conditioned subsurface model may be the same as the first conditioned subsurface model. In implementations, the second conditioned subsurface model may be different than the first conditioned subsurface model. For example, the differences may be based on a different model design, different model components, a different machine learning model, a different initial subsurface model, a different set of subsurface parameters, a different threshold, different training data, and/or other differences, as discussed herein.

In some implementations, subsurface model component 108a may be configured to store the first conditioned subsurface model. For example, the first conditioned subsurface model can be stored in a non-transitory storage medium, electronic storage 130a, non-transient computer readable mediums, and/or optical storage. It should be appreciated that these are merely examples and that the first conditioned subsurface model can be stored in other storage as well (e.g., structured storage, unstructured storage, and/or virtual storage).

In some implementations, subsurface model component 108a may be configured to store the second conditioned subsurface model. This may be substantially similar to, or the same as, how the first conditioned subsurface model is stored, as discussed above.

Subsurface parameter component 110a may be configured to obtain a first set of subsurface parameters. The first set of subsurface parameters may define a first set of subsurface relationships between a first training subsurface dataset and subsurface properties. The subsurface relationships may be a mapping between the first training subsurface dataset and the subsurface properties. For example, the first set of subsurface relationships may specify which subsurface properties from the first training subsurface dataset should be used and specify a corresponding weight each subsurface property has on generating subsurface data. The subsurface properties that are specified in the subsurface relationships may be selected based on subsurface properties that have the greatest impact on subsurface data, which is sometimes known as "feature engineering." In implementations, feature engineering may be accomplished based on machine learning, domain knowledge, and/or other techniques.

In some implementations, the first set of subsurface parameters may not be "feature engineered," and the subsurface model uses all subsurface properties to generate subsurface data. The subsurface parameters may include, for example, a set of dry rock matrix coefficients, anisotropic coefficients, grain bulk modulus, grain density, pore pressure, overburden pressure, porosity, temperature, water saturation, oil saturation, gas saturation, and/or brine salinity. It should be appreciated that these are exemplary; other subsurface parameters may include an oil API gravity, gas gravity, gas-oil ratio, geomechanical compaction coefficient, and/or geomechanical R-factor.

In some implementations, subsurface parameter component 110a may be configured to obtain a second set of subsurface parameters. The second set of subsurface parameters may define a second set of subsurface relationships between a second training subsurface dataset and subsurface properties. In implementations, the second set of subsurface parameters may be substantially similar to, or the same as, the first set of subsurface parameters. In one example, the second set of subsurface parameters may define a second set of subsurface relationships between the first training subsurface dataset and subsurface properties. The second set of subsurface relationships may include one of the subsurface relationships from the first set of subsurface parameters.

In some implementations, the second set of subsurface parameters may be different than the first set of subsurface parameters. For example, the difference between the first set of subsurface parameters and the second set of subsurface parameters may be based on different rock physics assumptions that affect the subsurface relationships between subsurface data and subsurface properties, different fluid models that affect the subsurface relationships between subsurface data and subsurface properties, different techniques of feature engineering (e.g., machine learning and/or domain knowledge, as discussed herein), different sets of subsurface properties selected, different subsurface relationships, different weights each piece of subsurface data has on the subsurface properties or vice versa, and/or other differences discussed herein.

Subsurface property component 112a may be configured to obtain training subsurface property data. The training subsurface property data may be used to train a subsurface model, as discussed herein. The training subsurface property data may initially be collected and/or measured via sensors in the subsurface volume of interest (e.g., field data) and/or be generated through the use of subsurface simulation models (e.g., synthetic data). Field data may be collected and/or measured from a well and/or reservoir in a subsurface volume of interest, or from any other portion of the volume of interest. In one example, the subsurface simulation model may include a reservoir flow simulation model, as described herein. The subsurface simulation model may be used to generate synthetic subsurface property data. A reservoir flow simulation model may be a digital representation of the reservoir (1D, 2D or 3D) that contains all of the model parameters required to simulate reservoir fluid flow and pore pressure evolution over time. Example model parameters may include porosity, relative permeability, temperature, fluid viscosity, etc. The data generated from the reservoir flow simulation model may be converted into 4D subsurface property data based on a rock-physics model. The rock-physics model may express seismic properties, such as, for example, compressional velocity, shear velocity, and density, in terms of rock and fluid properties, some of which (e.g., pore pressure, saturation, and/or other rock and fluid properties) are provided by the reservoir flow simulation model, and others (e.g., overburden pressure, geomechanical properties, as well as other properties) by independent sources, usually from well logs, core-based lab measurements or existing templates. In some implementations, the 4D subsurface property data may be normalized via statistical analysis before being used to train the initial subsurface models. The subsurface property data may be stored, and examples of such storage are discussed herein. The stored subsurface property data may be obtained and/or used as part of the training subsurface property data.

In some implementations, subsurface property component 112a may be configured to generate a first target subsurface property dataset. The first target subsurface property dataset may be field data (e.g., data that are collected and/or measured from a well and/or reservoir, or from another portion of the subsurface volume). In other words, the first target subsurface property data do not have corresponding subsurface data to confirm the conditioned subsurface model is accurately modeling the subsurface relationship between the subsurface property data and the subsurface data. The first target subsurface property dataset may specify changes to subsurface property values as a function of position and time in the subsurface volume of interest. In implementations, the first target subsurface property dataset may be preprocessed via feature engineering, denoising, and/or other preprocessing techniques. In implementations, in order to fill a subsurface volume with subsurface property data, the data might have to be spatially averaged or interpolated between fixed or known values from particular locations within the subsurface volume.

In some implementations, subsurface property component 112a may be configured to generate a second target subsurface property dataset. This may be substantially similar to, or the same as, how the first target subsurface property dataset is generated, as discussed above. In some implementations, the second target subsurface property dataset may be the same as the first target subsurface property dataset. In implementations, the second target subsurface property dataset may be different than the first target subsurface property dataset. For example, the differences may be based on a different subsurface volume of interest, a different set of subsurface properties selected from the subsurface property dataset, different noise corresponding to each subsurface property dataset, different preprocessing techniques, different sensors used to collect and/or measure the subsurface property data, and/or other differences discussed herein.

Subsurface data component 114a may be configured to obtain a first training subsurface dataset. The first training subsurface dataset may be used to train a subsurface model, as discussed herein. The first training subsurface dataset may initially be collected and/or measured via sensors in the subsurface volume of interest (e.g., field data) and/or be generated through the use of subsurface simulation models (e.g., synthetic data), both of which are discussed herein. The synthetic subsurface data may be stored, and examples of such storage are discussed herein. The stored synthetic subsurface data may be obtained and/or used as part of the training subsurface dataset.

In implementations, the first training subsurface dataset may correspond to the training subsurface property data. In some implementations, the first training subsurface dataset may be derived from the training subsurface property data using existing relationships between subsurface property data and subsurface data, the subsurface simulation model, fluid models, rock physics, and/or other models.

In some implementations, subsurface data component 114a may be configured to obtain a second training subsurface dataset. This may be substantially similar to, or the same as, how the first training subsurface dataset is obtained and/or generated, as discussed above. In some implementations, the second training subsurface dataset may be the same as the first training subsurface dataset. In implementations, the second training subsurface dataset may be different than the first training subsurface dataset. For example, the differences may be based on a different subsurface volume of interest, different noise corresponding to each subsurface dataset, different preprocessing techniques, different sensors used to collect and/or measure the training subsurface datasets, different types of data (e.g., purely field data, purely synthetic data, different combinations of field and synthetic data, etc.), different rock physics assumptions, different fluid models, different subsurface simulation models used to generate synthetic subsurface data, and/or other differences discussed herein. In one example, the first training subsurface dataset may be substantially similar to, or the same as, the second training subsurface dataset except for the subsurface simulation models used for each training subsurface dataset, as will be discussed herein.

In some implementations, subsurface data component 114a may be configured to generate a first target subsurface dataset. The first target subsurface dataset may be generated by applying the first conditioned subsurface model to the first target subsurface property dataset. As discussed herein, the first conditioned subsurface model can accurately estimate the first target subsurface dataset using the first target subsurface property dataset as input because the first conditioned subsurface model has been "trained" or "conditioned." The first target subsurface dataset may specify a first set of subsurface energy values as a function of position and time in the subsurface volume of interest.

In some implementations, subsurface data component 114a may be configured to generate a second target subsurface dataset. This may be substantially similar to, or the same as, how the first target subsurface dataset is generated, as discussed above. In some implementations, the second target subsurface dataset may be the same as the first target subsurface dataset. In implementations, the second target subsurface dataset may be different than the first target subsurface dataset. For example, the differences may be based on a difference in a target subsurface property dataset, subsurface noise, a conditioned subsurface model, training subsurface property data, a training subsurface dataset, a set of subsurface parameters, and/or other differences discussed herein. In one example, the first target subsurface property dataset may be substantially similar to, or the same as, the second target subsurface property dataset except for the subsurface noise corresponding to each target subsurface property dataset, as will be discussed herein.

In some implementations, subsurface data component 114a may be configured to generate a third target subsurface dataset. This may be substantially similar to, or the same as, how the first target subsurface dataset is generated, as discussed above. In some implementations, the third target subsurface dataset may be the same as the first and/or second target subsurface dataset. In implementations, the third target subsurface dataset may be different than the first and/or second target subsurface dataset. For example, the differences may be based on a difference in a target subsurface property dataset, subsurface noise, a conditioned subsurface model, training subsurface property data, a training subsurface dataset, a set of subsurface parameters, and/or other differences discussed herein.

In one example, the first target subsurface dataset may be substantially similar to, or the same as, the third target subsurface dataset except the set of subsurface parameters that define a set of subsurface relationships between a given training subsurface dataset and the subsurface properties, as discussed herein. In another example, the first target subsurface dataset may be substantially similar to, or the same as, the third target subsurface dataset except the subsurface models used to generate each subsurface dataset may be different, as discussed herein.

Subsurface noise component 116a may be configured to generate and/or obtain first subsurface noise. The first subsurface noise may correspond to the first target subsurface property dataset. Noise may refer to irregular fluctuations in the data derived from various sources. For example, the subsurface noise may be derived from natural noise (e.g., noise from sensors collecting and/or measuring field data), synthetic noise (e.g., noise simulating natural noise), and/or other sources. Noise is commonly classified as either coherent or non-coherent (i.e., random). Generally speaking, noise represents the non-signal portion of seismic data, i.e., everything other than the signal. Synthetic non-coherent noise can be produced by generating a string of random numbers corresponding to a particular statistical model, scaling them appropriately, and adding them to the seismic signal. Synthetic coherent noise is usually generated by modeling the signal together with seismic events that are not considered signal (e.g., surface waves, multiples, noise from extraneous surface sources, etc.). It is generally easier to add random noise to the signal than it is coherent noise, because the latter is usually model-dependent and requires a modeling capability at least as sophisticated as that used to generate the signal. Synthetic noise can be added to input data to create multiple realizations for later uncertainty analysis, or for the purpose of regularizing the synthetic subsurface model to improve predicted outputs by bridging the gap between ideal synthetic input and field data input. Adding subsurface noise to synthetic subsurface property data may provide more accurate subsurface data. In some implementations, adding subsurface noise to generated subsurface property data may allow the training subsurface property data to be based on both field data and synthetic data. In implementations, this added subsurface noise may be modeled after the natural noise in the field data.

In some implementations, subsurface noise component 116a may be configured to generate and/or obtain second subsurface noise. This may be substantially similar to, or the same as, how the first subsurface noise is generated, as discussed above. The second subsurface noise may correspond to the second target subsurface property dataset. In some implementations, the second subsurface noise may be the same as the first subsurface noise. In implementations, the second subsurface noise may be different than the first subsurface noise. For example, the differences may be based on a different subsurface noise model (e.g., field-data-based, machine-learning-based, etc.), different subsurface noise type (e.g., only natural noise, only synthetic noise, different sets of natural and synthetic noise), different subsurface natural noise sources (e.g., different sensors, different preprocessing methods, etc.), and/or other differences discussed herein.

Subsurface data uncertainty component 118a may be configured to generate a first subsurface data uncertainty. The first subsurface data uncertainty may help to determine how accurate values in the subsurface data are. In implementations, the first subsurface data uncertainty may specify a likelihood a value is accurate. In some implementations, the first subsurface data uncertainty may specify a range of values between which a "true" value exists. For example, the subsurface data uncertainty may be in the form of an error bar, a confidence interval, a probability distribution, a standard deviation, standard error, and/or another format. It should be appreciated that the above formats are merely exemplary, and that other subsurface data uncertainty may include a likelihood function, variance, skewness, kurtosis, and the like.

The first subsurface data uncertainty may be based on the first target subsurface dataset and the second target subsurface dataset. For example, the first subsurface data uncertainty may be based on differences between the first target subsurface dataset and the second target subsurface dataset. The differences may be based on different values in the target subsurface datasets derived from changes to a common error source between the training subsurface datasets, such as, for example, noise (e.g., derived from subsurface noise models, subsurface noise type, subsurface natural noise sources, etc.), interpolation, model (e.g., subsurface model designs, model components, machine learning models, sets of subsurface parameters, thresholds, weights, etc.), parameter uncertainty (e.g., limited to sample data), and/or other sources. In implementations, the first subsurface data uncertainty may be based on the first target subsurface dataset and the third target subsurface dataset, or any other combination of subsurface datasets.

In some implementations, subsurface data uncertainty component 118a may be configured to generate a second subsurface data uncertainty. The second subsurface data uncertainty may be based on the first target subsurface dataset and the third target subsurface dataset. In some implementations, the second subsurface data uncertainty may be based on the second target subsurface dataset and the third target subsurface dataset, or any other combination of subsurface datasets. The second subsurface data uncertainty may be substantially similar to, or the same as, how the first subsurface data uncertainty is generated, as discussed above. In some implementations, the second subsurface data uncertainty may be the same as the first subsurface data uncertainty. In implementations, the second subsurface data uncertainty may be different than the first subsurface data uncertainty. For example, the differences may be based on a different error source used to generate the first subsurface data uncertainty, as discussed above. The differences may also be based on comparing different subsurface datasets, different formats for the subsurface data uncertainty, different methods of generating the subsurface data uncertainties, and/or other differences discussed herein.

Representation component 120a may be configured to generate a representation of the subsurface data, subsurface property data, and/or subsurface data uncertainty. The representation may be generated using visual effects to depict at least some of the subsurface data, subsurface property data, and/or subsurface data uncertainty as a function of position and time. The visual effects may include a visual transformation of the representation. A visual transformation may include a visual change in how the representation is presented or displayed. In some implementations, a visual transformation may include a visual zoom, a visual filter, a visual rotation, a visual stretching or change in aspect ratio, and/or a visual overlay (e.g., text and/or graphics overlay). In some implementations, a representation of the other subsurface datasets, subsurface property data, subsurface data uncertainty, and/or a combination of this data may be generated. In some implementations, the representation may be a video.

In one example, the representation may include a map overlay. The map overlay may include a digital elevation model map, a gross depositional environment map, a geophysical attribute, a physical map, a political map, and/or other types of maps. The map may be displayed as a raster image, a contour map, or a thematic map; it may also be partially transparent to view other information displayed below it. The first representation may illustrate a map of the subsurface volume of interest and corresponding subsurface data, subsurface property data, and/or subsurface data uncertainty. Different sets of data may be represented using different colors and/or shades of a color. For example, a first target subsurface dataset may be represented using a color gradient, a second target subsurface dataset may be represented using a color bar (e.g., different colors), and/or other visual effects to represent the subsurface data, subsurface property data, and/or subsurface data uncertainty.

In one example, the representation may be a four-dimensional video of a subsurface volume of interest displaying changes to subsurface data, subsurface property data, and/or subsurface data uncertainty as a function of position and time. In some implementations, the representation may be a static image and changes to data as a function of time may be visualized using color. The representation may include any representation of the subsurface volume, e.g., a vertical slice, horizontal slice, perspective view, whether static or time-varying, and/or other representations.

Representation component 120a may be configured to display the representation. The representation may be displayed on a graphical user interface and/or other displays. The graphical user interface may include a user interface based on graphics and/or text. In implementations, a user may zoom in on and/or view a location of the volume of interest to illustrate more detail on a given location. The graphical user interface may be configured to receive voice input, gestures, haptic input, keyboard, mouse, and/or other input.

In some implementations, server 102a, client computing platform 104a, and/or external resources 128a may be operatively linked via an electronic communication link. For example, such electronic communication link may be established, at least in part, via a network such as the Internet and/or other networks. It will be appreciated that this is not intended to be limiting, and that the scope of this disclosure includes implementations, in which server 102a, client computing platform 104a, and/or external resources 128a may be operatively linked via some other communication media.

A given client computing platform 104a may include a processor to execute computer program components. The computer program components may enable a user corresponding to the given client computing platform 104a to interface with system 100a and/or external resources 128a, and/or provide other functionality attributed herein to client computing platform 104a. By way of non-limiting example, the given client computing platform 104a may include a desktop computer, a laptop computer, a handheld computer, a tablet computing platform, a Netbook, a Smartphone, a gaming console, and/or other computing platforms.

External resources 128a may include sources of information outside of system 100a, external entities participating with system 100a, and/or other resources. In some implementations, some or all of the functionality attributed herein to external resources 128a may be provided by resources included in system 100a.

Server 102a may include electronic storage 130a, processor 132a, and/or other components. Server 102a may include communication lines, or ports to enable the exchange of information with a network and/or other computing platforms. Illustration of server 102a in FIG. 1A is not intended to be limiting. Server 102a may include a plurality of hardware, software, and/or firmware components operating together to provide the functionality attributed herein to server 102a. For example, server 102a may be implemented by a cloud of computing platforms operating together as server 102a.

Electronic storage 130a may include storage media that electronically store information. The electronic storage media of electronic storage 130a may include one or both of system storage that is provided integrally (i.e., substantially non-removable) with server 102 and/or removable storage that is removably connectable to server 102a via, for example, a port (e.g., a USB port, a firewire port, and/or other ports) or a drive (e.g., a disk drive and/or other drives). Electronic storage 130a may include non-transitory storage media, non-transient electronic storage, optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EEPROM, RAM, and/or other electrical charge-based storage media), solid-state storage media (e.g., flash drive and/or other solid-state storage media), and/or other electronically readable storage media. Electronic storage 130a may include a virtual storage resource (e.g., cloud storage, a virtual private network, and/or other virtual storage resources). Electronic storage 130a may store software algorithms, information determined by processor 132a, information received from server 102a, information received from client computing platform 104a, and/or other information that enables server 102a to function as described herein. It should be appreciated that the information may be stored in its natural and/or raw format (e.g., data lakes).

Processor 132a may provide information processing capabilities in server 102a. As such, processor 132a may include a physical computer processor, a digital processor, an analog processor, a digital circuit designed to process information, an analog circuit designed to process information, a state machine, and/or other mechanisms for electronically processing information. Although processor 132a is shown in FIG. 1A as a single entity, this is for illustrative purposes only. In some implementations, processor 132a may include a plurality of processing units. These processing units may be physically located within the same device, or processor 132a may represent processing functionality of a plurality of devices operating in coordination. Processor 132a may execute components 108a, 110a, 112a, 114a, 116a, 118a, 120a, and/or other components. Processor 132a may execute components 108a, 110a, 112a, 114a, 116a, 118a, 120a, and/or other components by software; hardware; firmware; some combination of software, hardware, and/or firmware; and/or other mechanisms for configuring processing capabilities on processor 132a. As used herein, the term "component" may refer to any component or set of components that perform the functionality attributed to the component. This may include a physical processor during execution of processor readable instructions, the processor readable instructions, circuitry, hardware, storage media, or any other components.

It should be appreciated that although components 108a, 110a, 112a, 114a, 116a, 118a, and 120a are illustrated in FIG. 1A as being implemented within a single processing unit, in implementations, in which processor 132a includes multiple processing units, one of components 108a, 110a, 112a, 114a, 116a, 118a, and/or 120a may be implemented remotely from the other components. The description of the functionality provided by the different components 108a, 110a, 112a, 114a, 116a, 118a, and/or 120a described below is for illustrative purposes, and is not intended to be limiting, as any of components 108a, 110a, 112a, 114a, 116a, 118a, and/or 120a may provide more or less functionality than is described. For example, one of components 108a, 110a, 112a, 114a, 116a, 118a, and/or 120a may be eliminated, and some or all of its functionality may be provided by other ones of components 108a, 110a, 112a, 114a, 116a, 118a, and/or 120a. As an example, processor 132a may execute an additional component that may perform some or all of the functionality attributed below to components 108a, 110a, 112a, 114a, 116a, 118a, and/or 120a.

Figure 1B:
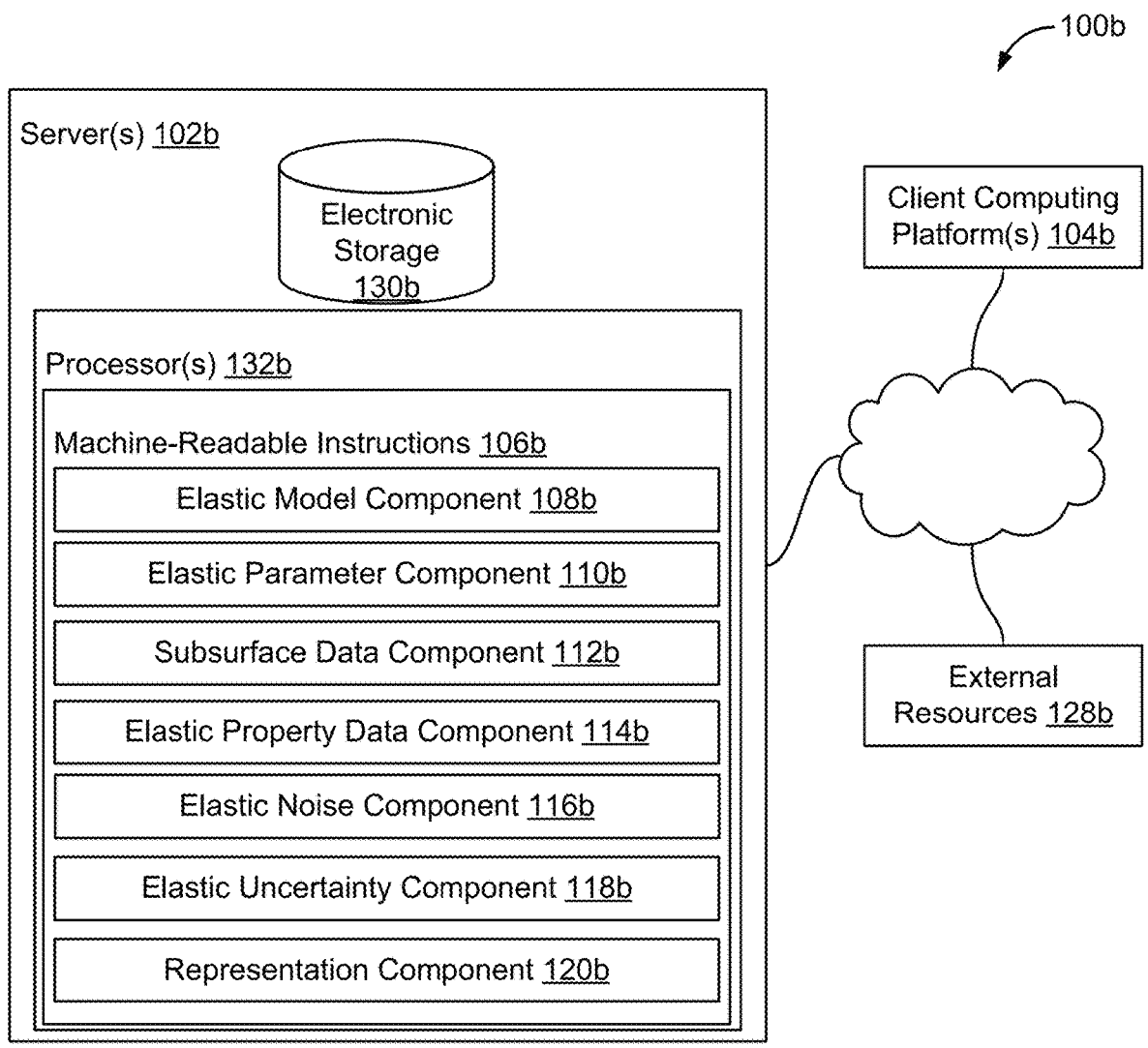
FIG. 1B illustrates a system for generating elastic property data as a function of position and time in the subsurface volume of interest, in accordance with one or more implementations.

FIG. 1B illustrates a system for generating elastic property data as a function of position and time in a subsurface volume of interest, in accordance with one or more implementations. In some implementations, system 100b may include server 102b. Server 102b may be configured to communicate with client computing platform 104b according to a client/server architecture and/or other architectures. Client computing platform 104b may be configured to communicate with other client computing platforms via server 102b and/or according to a peer-to-peer architecture and/or other architectures. Users may access system 100b via client computing platform 104b.

Server 102b may be configured by machine-readable instructions 106b. Machine-readable instructions 106b may include an instruction component. The instruction component may include computer program components. The instruction component may include an elastic model component 108b, an elastic parameter component 110b, a subsurface data component 112b, an elastic property data component 114b, an elastic noise component 116b, an elastic uncertainty component 118b, a representation component 120b, and/or other instruction component.

Elastic model component 108b may be configured to obtain a first initial elastic model. The first initial elastic model may be based on machine learning techniques to map at least one variable to at least another variable. For example, the first initial elastic model may receive subsurface data as input and output elastic property data. The first initial elastic model may be "untrained" or "unconditioned," indicating it may not estimate an output based on the input as accurately as a "trained" or "conditioned" model.

Subsurface data may specify changes to subsurface energy values as a function of position and time in the subsurface volume of interest. The changes to the subsurface data may be used to identify a change in a position as a function of time, a change in subsurface energy values as a function of time, the change in subsurface energy values as a function of position, or a combination of the above. The subsurface energy values may be the data collected and/or measured by sending energy through a subsurface volume of interest to a receiver. In some implementations, the subsurface energy values may be characterized as the response of the elastic wavefield to contrasts across interfaces of subsurface layers as energy travels from a source through the subsurface to a receiver. The subsurface data may include a seismic angle stack change, a prestack seismic property change, a timeshift, and/or a time strain. It should be appreciated that these are exemplary; other subsurface data may include an amplitude-versus-offset (AVO) gather change. While changes in values are listed above, a value at a given time and/or position may also be included in the subsurface data.

Elastic property data may specify changes to a first set of elastic property values as a function of position and time in the subsurface volume of interest. In implementations, the elastic property data may include a quantitative and/or qualitative value corresponding to the elastic property. The changes to the elastic property may include a change in a position as a function of time, a change in elastic property values as a function of time, a change in elastic property values as a function of position, or a combination of the above. For example, the elastic property data may include changes as a function of position and time to an acoustic impedance, shear impedance, shear modulus, Young's modulus, incompressibility, compressibility, anisotropic parameters, and/or compressional velocity. It should be appreciated that these are exemplary; other elastic property data may include changes as a function of position and time to a shear-wave velocity, velocity ratio, Poisson Ratio, and/or density. While changes in values are listed above, a value at a given time and/or position may also be included in the elastic property data.

The elastic models disclosed herein may include, for example, a neural network, a random forest model, a support vector machine, a regression, a Bayesian network, and/or other elastic models. It should be appreciated that other elastic models may include, for example, convolutional neural networks, reinforcement learning, transfer learning, and/or other machine learning technologies.

Referring back to FIG. 1B, in some implementations, elastic model component 108b may be configured to obtain a second initial elastic model. The second initial elastic model may be substantially similar to, or the same as, the first initial elastic model. In some implementations, the second initial elastic model may be different from the first initial elastic model. For example, the differences may be based on a different model design, different model components, a different machine learning model, a different set of elastic parameters, and/or other differences discussed herein.

A given elastic model design may include a machine learning model, a design, a model parameter, and/or a threshold. For example, different model designs may include different structure parameters (e.g., first neuron number, hidden layer number, batch size, drop out, and/or activation), hyperparameters (e.g., learning rate, optimizer, losses, and/or epochs), functions (e.g., objective functions), thresholds (e.g., measure of model effectiveness), and/or other design features, such as, for example, running time. In implementations, structure parameters may have more of an impact on optimizing the elastic model than the hyperparameters or other design features. For example, this might mean that a 1% change in a structure parameter value changes the accuracy, speed, and/or other elements of the elastic model more than a 1% change in the hyperparameter values or other design feature values. In some implementations, the hyperparameters and/or other design features have more of an impact on optimizing the elastic model than the structure parameters. In one example, the neuron numbers, hidden layer numbers, and epochs may have the greatest impact on optimizing the elastic model. The model components may include a different combination of elastic models, as discussed herein. Elastic parameters will be discussed herein.

In some implementations, elastic model component 108b may be configured to generate a first conditioned elastic model. The first conditioned elastic model may be generated by training the first initial elastic model using training subsurface data, a first training elastic property dataset, and a first set of elastic parameters. In implementations, the elastic model is "conditioned," indicating the elastic model may have been trained to optimize performance and/or improve accuracy of the initial elastic model. For example, the conditioned elastic model may more accurately output elastic property data based on subsurface data as input. In implementations, the conditioned elastic model may have generated a non-linear relationship between the subsurface data and the elastic property data.

Training the first initial elastic model may include applying the training subsurface data to the first initial elastic model based on the first set of elastic parameters to generate a first iteration of elastic property data. The first initial elastic model may be adjusted to more accurately estimate the elastic property data based on differences between the first iteration of elastic property data and the first training elastic property data that correspond to the training subsurface data. This is repeated numerous times until the first elastic model is "conditioned," i.e., it is able to output elastic property data that are consistently within a threshold of the first training elastic property data. In some implementations, the threshold may depend on the speed of the elastic model, resources used by the elastic model, and/or other optimization metrics. This threshold may be based on an average of values, a maximum number of values, and/or other parameters. Other metrics may be applied to determine that the first elastic model is "conditioned."

In some implementations, elastic model component 108b may be configured to generate a second conditioned elastic model. The second conditioned elastic model may be generated in a manner substantially similar to, or the same as, the first conditioned elastic model. In some implementations, the second conditioned elastic model may be the same as the first conditioned elastic model. In implementations, the second conditioned elastic model may be different than the first conditioned elastic model. For example, the differences may be based on a different model design, different model components, a different machine learning model, a different initial elastic model, a different set of elastic parameters, a different threshold, different training data, and/or other differences, as discussed herein. In one example, the first conditioned elastic model may be substantially similar to, or the same as, the second conditioned elastic model except for the model design, as will be discussed herein.

In some implementations, elastic model component 108b may be configured to store the first conditioned elastic model. For example, the first conditioned elastic model can be stored in a non-transitory storage medium, electronic storage 130b, non-transient computer readable mediums, and/or optical storage. It should be appreciated that these are merely examples and that the first conditioned elastic model can be stored in other storage as well (e.g., structured storage, unstructured storage, and/or virtual storage).

In some implementations, elastic model component 108b may be configured to store the second conditioned elastic model. This may be substantially similar to, or the same as, how the first conditioned elastic model is stored, as discussed above.

Elastic parameter component 110b may be configured to obtain a first set of elastic parameters. The first set of elastic parameters may define a first set of elastic relationships between elastic properties and training subsurface data. The elastic relationships may be a mapping between the elastic properties and the training subsurface data. For example, the first set of elastic relationships may specify which elastic properties from the training subsurface data should be used and specify a corresponding weight each piece of training subsurface data has on generating elastic property values. The elastic properties that are specified in the elastic relationships may be selected based on which elements of the training subsurface data have the greatest impact on the elastic property values, which is sometimes known as "feature engineering." In implementations, feature engineering may be accomplished based on machine learning, domain knowledge, and/or other techniques.

In some implementations, the first set of elastic parameters may not be "feature engineered," and the elastic model uses all subsurface data to generate the elastic property values. The elastic parameters may include, for example, a set of dry rock matrix coefficients, anisotropic coefficients, grain bulk modulus, grain density, pore pressure, overburden pressure, porosity, temperature, water saturation, oil saturation, gas saturation, and/or brine salinity. It should be appreciated that these are exemplary; other elastic parameters may include an oil API gravity, gas gravity, gas-oil ratio, geomechanical compaction coefficient, and/or geomechanical R-factor.

In some implementations, elastic parameter component 110b may be configured to obtain a second set of elastic parameters. The second set of elastic parameters may define a second set of elastic relationships between the elastic properties and the training subsurface data. In implementations, the second set of elastic parameters may be substantially similar to, or the same as, the first set of elastic parameters. The second set of elastic relationships may include one of the elastic relationships from the first set of elastic parameters.

In some implementations, the second set of elastic parameters may be different than the first set of elastic parameters. For example, the difference between the first set of elastic parameters and the second set of elastic parameters may be based on different rock physics assumptions that affect the elastic relationships between elastic properties and subsurface data, different fluid models that affect the elastic relationships between elastic properties and subsurface data, different techniques of feature engineering (e.g., machine learning and/or domain knowledge, as discussed herein), different sets of elastic properties selected, different elastic relationships, different weights each piece of subsurface data has on the elastic properties or vice versa, and/or other differences discussed herein.

Subsurface data component 112b may be configured to obtain training subsurface data. The training subsurface data may be used to train an elastic model, as discussed herein. The training subsurface data may initially be collected and/or measured via sensors in the subsurface volume of interest (e.g., field data) and/or be generated through the use of elastic simulation models (e.g., synthetic data). Field data may be collected and/or measured from a well and/or reservoir in a subsurface volume of interest, or from any other portion of the volume of interest. In one example, the elastic simulation model may include a reservoir flow simulation model, as described herein. The elastic simulation model may be used to generate synthetic elastic property data. The data generated from the reservoir flow simulation model may be converted into 4D subsurface data based on a rock-physics model. In some implementations, the 4D subsurface data may be normalized via statistical analysis before being used to train the initial elastic models. The subsurface data may be stored, and examples of such storage are discussed herein. The stored subsurface data may be obtained and/or used as part of the training subsurface data.

In some implementations, subsurface data component 112b may be configured to generate a first target subsurface dataset. The first target subsurface dataset may be field data (e.g., data that are collected and/or measured from a well and/or reservoir, or from any other portion of the subsurface volume). In other words, the first target subsurface dataset does not have corresponding elastic property data to confirm the conditioned elastic model is accurately modeling the elastic relationship between the subsurface data and the elastic property data. The first target subsurface dataset may specify changes to subsurface energy values as a function of position and time in the subsurface volume of interest. In implementations, the first target subsurface dataset may be preprocessed via feature engineering, denoising, and/or other preprocessing techniques.

In some implementations, subsurface data component 112b may be configured to generate a second target subsurface dataset. This may be substantially similar to, or the same as, how the first target subsurface dataset is generated, as discussed above. In some implementations, the second target subsurface dataset may be the same as the first target subsurface dataset. In implementations, the second target subsurface dataset may be different than the first target subsurface dataset. For example, the differences may be based on a different subsurface volume of interest, a different set of subsurface data elements selected from the subsurface dataset, different noise corresponding to each subsurface dataset, different preprocessing techniques, different sensors used to collect and/or measure the subsurface data, and/or other differences discussed herein. In one example, the first target subsurface dataset may be substantially similar to, or the same as, the second target subsurface dataset except for the elastic noise corresponding to each target subsurface dataset, as will be discussed herein.

Elastic property data component 114b may be configured to obtain a first training elastic property dataset. The first training elastic property dataset may be used to train an elastic model, as discussed herein. The first training elastic property dataset may initially be collected and/or measured via sensors in the subsurface volume of interest (e.g., field data) and/or be generated through the use of elastic simulation models (e.g., synthetic data), both of which are discussed herein. The synthetic elastic property data may be stored, and examples of such storage are discussed herein. The stored synthetic elastic property data may be obtained and/or used as part of the first training elastic property dataset.

In implementations, the first training elastic property dataset may correspond to the training subsurface data. In some implementations, the first training elastic property dataset may be derived from the training subsurface data using existing relationships between subsurface data and elastic property data, the elastic simulation model, rock physics, fluid models, and/or other models.

In some implementations, elastic property data component 114b may be configured to obtain a second training elastic property dataset. This may be substantially similar to, or the same as, how the first training elastic property dataset is obtained and/or generated, as discussed above. In some implementations, the second training elastic property dataset may be the same as the first training elastic property dataset. In implementations, the second training elastic property dataset may be different than the first training elastic property dataset. For example, the differences may be based on a different subsurface volume of interest, different noise corresponding to each elastic property dataset, different preprocessing techniques, different sensors used to collect and/or measure the training elastic property datasets, different types of data (e.g., purely field data, purely synthetic data, different combinations of field and synthetic data, etc.), different rock physics assumptions, different fluid models, different elastic simulation models used to generate synthetic elastic property data, and/or other differences discussed herein.

In some implementations, elastic property data component 114b may be configured to generate a first target elastic property dataset. The first target elastic property dataset may be generated by applying the first conditioned elastic model to the first target subsurface dataset. As discussed herein, the first conditioned elastic model can accurately estimate the first target elastic property dataset using the first target subsurface dataset as input because the first conditioned elastic model has been "trained" or "conditioned." The first target elastic property dataset may specify a first set of elastic property values as a function of position and time in the subsurface volume of interest.

In some implementations, elastic property data component 114b may be configured to generate a second target elastic property dataset. This may be substantially similar to, or the same as, how the first target elastic property dataset is generated, as discussed above. In some implementations, the second target elastic property dataset may be the same as the first target elastic property dataset. In implementations, the second target elastic property dataset may be different than the first target elastic property dataset. For example, the differences may be based on a difference in a target subsurface dataset, elastic noise, a conditioned elastic model, training subsurface data, a training elastic property dataset, a set of elastic parameters, and/or other differences discussed herein. In one example, the first target elastic property dataset may be substantially similar to, or the same as, the second target elastic property dataset except for the differences derived from the elastic noise corresponding to each target subsurface dataset, as will be discussed herein.

In some implementations, elastic property data component 114b may be configured to generate a third target elastic property dataset. This may be substantially similar to, or the same as, how the first target elastic property dataset is generated, as discussed above. In some implementations, the third target elastic property dataset may be the same as the first and/or second target elastic property dataset. In implementations, the third target elastic property dataset may be different than the first and/or second target elastic property dataset. For example, the differences may be based on a difference in a target subsurface dataset, elastic noise, a conditioned elastic model, training subsurface data, a training elastic property dataset, a set of elastic parameters, and/or other differences discussed herein.

In one example, the first target elastic property dataset may be substantially similar to, or the same as, the third target elastic property dataset except the set of elastic parameters that define a set of elastic relationships between the training subsurface data and the elastic properties, as discussed herein. In another example, the first target elastic property dataset may be substantially similar to, or the same as, the third target elastic property dataset except the elastic models used to generate each elastic property dataset may be different, as discussed herein.

Elastic noise component 116b may be configured to generate and/or obtain first elastic noise. The first elastic noise may correspond to the first target subsurface dataset. Noise may refer to irregular fluctuations in the data derived from various sources. For example, the elastic noise may be derived from natural noise (e.g., noise from sensors collecting and/or measuring field data), synthetic noise (e.g., noise simulating natural noise), and/or other sources. Adding elastic noise to synthetic subsurface data may provide more accurate elastic property data. In some implementations, adding elastic noise to generated subsurface data may allow the training subsurface data to be based on both field data and synthetic data. In implementations, this added elastic noise may be modeled after the natural noise in the field data.

In some implementations, elastic noise component 116b may be configured to generate and/or obtain second elastic noise. This may be substantially similar to, or the same as, how the first elastic noise is generated, as discussed above. The second elastic noise may correspond to the second target subsurface dataset. In some implementations, the second elastic noise may be the same as the first elastic noise. In implementations, the second elastic noise may be different than the first elastic noise. For example, the differences may be based on a different elastic noise model (e.g., field-data-based, machine-learning-based, etc.), different elastic noise type (e.g., only natural noise, only synthetic noise, different sets of natural and synthetic noise), different elastic natural noise sources (e.g., different sensors, different preprocessing methods, etc.), and/or other differences discussed herein.

Elastic uncertainty component 118b may be configured to generate a first elastic uncertainty. The first elastic uncertainty may help to determine how accurate values in the elastic property data are. In implementations, the first elastic uncertainty may specify a likelihood a value is accurate. In some implementations, the first elastic uncertainty may specify a range of values between which a "true" value exists. For example, the elastic uncertainty may be in the form of an error bar, a confidence interval, a probability distribution, a standard deviation, standard error, and/or another format.

The first elastic uncertainty may be based on the first target elastic property dataset and the second target elastic property dataset. For example, the first elastic uncertainty may be based on differences between the first target elastic property dataset and the second target elastic property dataset. The differences may be based on different values in the target elastic property datasets derived from changes to a common error source between the training elastic property datasets, such as, for example, noise (e.g., derived from elastic noise models, elastic noise type, subsurface natural noise sources, etc.), interpolation, model (e.g., elastic model designs, model components, machine learning models, sets of elastic parameters, thresholds, weights, etc.), parameter uncertainty (e.g., limited to sample data), and/or other sources. In implementations, the first elastic uncertainty may be based on the first target elastic property dataset and the third target elastic property dataset, or any other combination of elastic property datasets.

In some implementations, elastic uncertainty component 118b may be configured to generate a second elastic uncertainty. The second elastic uncertainty may be based on the first target elastic property dataset and the third target elastic property dataset. In some implementations, the second elastic uncertainty may be based on the second target elastic property dataset and the third target elastic property dataset, or any other combination of elastic property datasets. The second elastic uncertainty may be substantially similar to, or the same as, how the first elastic uncertainty is generated, as discussed above. In some implementations, the second elastic uncertainty may be the same as the first elastic uncertainty. In implementations, the second elastic uncertainty may be different than the first elastic uncertainty. For example, the differences may be based on a different error source used to generate the first elastic uncertainty, as discussed above. The differences may also be based on comparing different elastic property datasets, different formats for the elastic uncertainty, different methods of generating the elastic property data uncertainties, and/or other differences discussed herein.

Representation component 120b may be configured to generate a representation of the elastic property data, subsurface data, and/or elastic uncertainty. The representation may be generated using visual effects to depict at least some of the elastic property data, subsurface data, and/or elastic uncertainty as a function of position and time. The visual effects may include a visual transformation of the representation. A visual transformation may include a visual change in how the representation is presented or displayed. In some implementations, a visual transformation may include a visual zoom, a visual filter, a visual rotation, a visual stretching or change in aspect ratio, and/or a visual overlay (e.g., text and/or graphics overlay). In some implementations, the representation may be a video.

In one example, the representation may include a map overlay. The map overlay may include a digital elevation model map, a gross depositional environment map, a geophysical attribute, a physical map, a political map, and/or other types of maps. The map may be displayed as a raster image, a contour map, or a thematic map; it may also be partially transparent to view other information displayed below it. The first representation may illustrate a map of the subsurface volume of interest and corresponding elastic property data, subsurface data, and/or elastic uncertainty. Different sets of data may be represented using different colors and/or shades of a color. For example, a first target elastic property dataset may be represented using a color gradient, a second target elastic property dataset may be represented using a color bar (e.g., different colors), and/or other visual effects to represent the elastic property data, subsurface data, and/or elastic uncertainty.

In one example, the representation may be a four-dimensional video of a subsurface volume of interest displaying changes to elastic property data, subsurface data, and/or elastic uncertainty as a function of position and time. In some implementations, the representation may be a static image and changes to data as a function of time may be visualized using color.

Representation component 120b may be configured to display the representation. The representation may be displayed on a graphical user interface and/or other displays. The graphical user interface may include a user interface based on graphics and/or text. In implementations, a user may zoom in on and/or view a location of the volume of interest to illustrate more detail on a given location. The graphical user interface may be configured to receive voice input, gestures, haptic input, keyboard, mouse, and/or other input.

In some implementations, server 102b, client computing platform 104b, and/or external resources 128b may be operatively linked via an electronic communication link. For example, such electronic communication link may be established, at least in part, via a network such as the Internet and/or other networks. It will be appreciated that this is not intended to be limiting, and that the scope of this disclosure includes implementations, in which server 102b, client computing platform 104b, and/or external resources 128b may be operatively linked via some other communication media.

A given client computing platform 104b may include a processor to execute computer program components. The computer program components may enable a user corresponding to the given client computing platform 104b to interface with system 100b and/or external resources 128b, and/or provide other functionality attributed herein to client computing platform 104b. By way of non-limiting example, the given client computing platform 104b may include a desktop computer, a laptop computer, a handheld computer, a tablet computing platform, a Netbook, a Smartphone, a gaming console, and/or other computing platforms.

External resources 128b may include sources of information outside of system 100b, external entities participating with system 100b, and/or other resources. In some implementations, some or all of the functionality attributed herein to external resources 128b may be provided by resources included in system 100b.

Server 102b may include electronic storage 130b, processor 132b, and/or other components. Server 102b may include communication lines, or ports to enable the exchange of information with a network and/or other computing platforms. Illustration of server 102b in FIG. 1B is not intended to be limiting. Server 102b may include a plurality of hardware, software, and/or firmware components operating together to provide the functionality attributed herein to server 102b. For example, server 102b may be implemented by a cloud of computing platforms operating together as server 102b.

Electronic storage 130b may include storage media that electronically store information. The electronic storage media of electronic storage 130b may include one or both of system storage that is provided integrally (i.e., substantially non-removable) with server 102 and/or removable storage that is removably connectable to server 102b via, for example, a port (e.g., a USB port, a firewire port, and/or other ports) or a drive (e.g., a disk drive and/or other drives). Electronic storage 130b may include non-transitory storage media, non-transient electronic storage, optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EEPROM, RAM, and/or other electrical charge-based storage media), solid-state storage media (e.g., flash drive and/or other solid-state storage media), and/or other electronically readable storage media. Electronic storage 130b may include a virtual storage resource (e.g., cloud storage, a virtual private network, and/or other virtual storage resources). Electronic storage 130b may store software algorithms, information determined by processor 132b, information received from server 102b, information received from client computing platform 104b, and/or other information that enables server 102b to function as described herein. It should be appreciated that the information may be stored in its natural and/or raw format (e.g., data lakes).

Processor 132b may provide information processing capabilities in server 102b. As such, processor 132b may include a physical computer processor, a digital processor, an analog processor, a digital circuit designed to process information, an analog circuit designed to process information, a state machine, and/or other mechanisms for electronically processing information. Although processor 132b is shown in FIG. 1B as a single entity, this is for illustrative purposes only. In some implementations, processor 132b may include a plurality of processing units. These processing units may be physically located within the same device, or processor 132b may represent processing functionality of a plurality of devices operating in coordination. Processor 132b may execute components 108b, 110b, 112b, 114b, 116b, 118b, 120b, and/or other components. Processor 132b may execute components 108b, 110b, 112b, 114b, 116b, 118b, 120b, and/or other components by software; hardware;

firmware; some combination of software, hardware, and/or firmware; and/or other mechanisms for configuring processing capabilities on processor 132b. As used herein, the term "component" may refer to any component or set of components that perform the functionality attributed to the component. This may include a physical processor during execution of processor readable instructions, the processor readable instructions, circuitry, hardware, storage media, or any other components.

It should be appreciated that although components 108b, 110b, 112b, 114b, 116b, 118b, and 120b are illustrated in FIG. 1B as being implemented within a single processing unit, in implementations, in which processor 132b includes multiple processing units, one of components 108b, 110b, 112b, 114b, 116b, 118b, and/or 120b may be implemented remotely from the other components. The description of the functionality provided by the different components 108b, 110b, 112b, 114b, 116b, 118b, and/or 120b described below is for illustrative purposes, and is not intended to be limiting, as any of components 108b, 110b, 112b, 114b, 116b, 118b, and/or 120b may provide more or less functionality than is described. For example, one of components 108b, 110b, 112b, 114b, 116b, 118b, and/or 120b may be eliminated, and some or all of its functionality may be provided by other ones of components 108b, 110b, 112b, 114b, 116b, 118b, and/or 120b. As an example, processor 132b may execute an additional component that may perform some or all of the functionality attributed below to components 108b, 110b, 112b, 114b, 116b, 118b, and/or 120b.

Figure 1C:
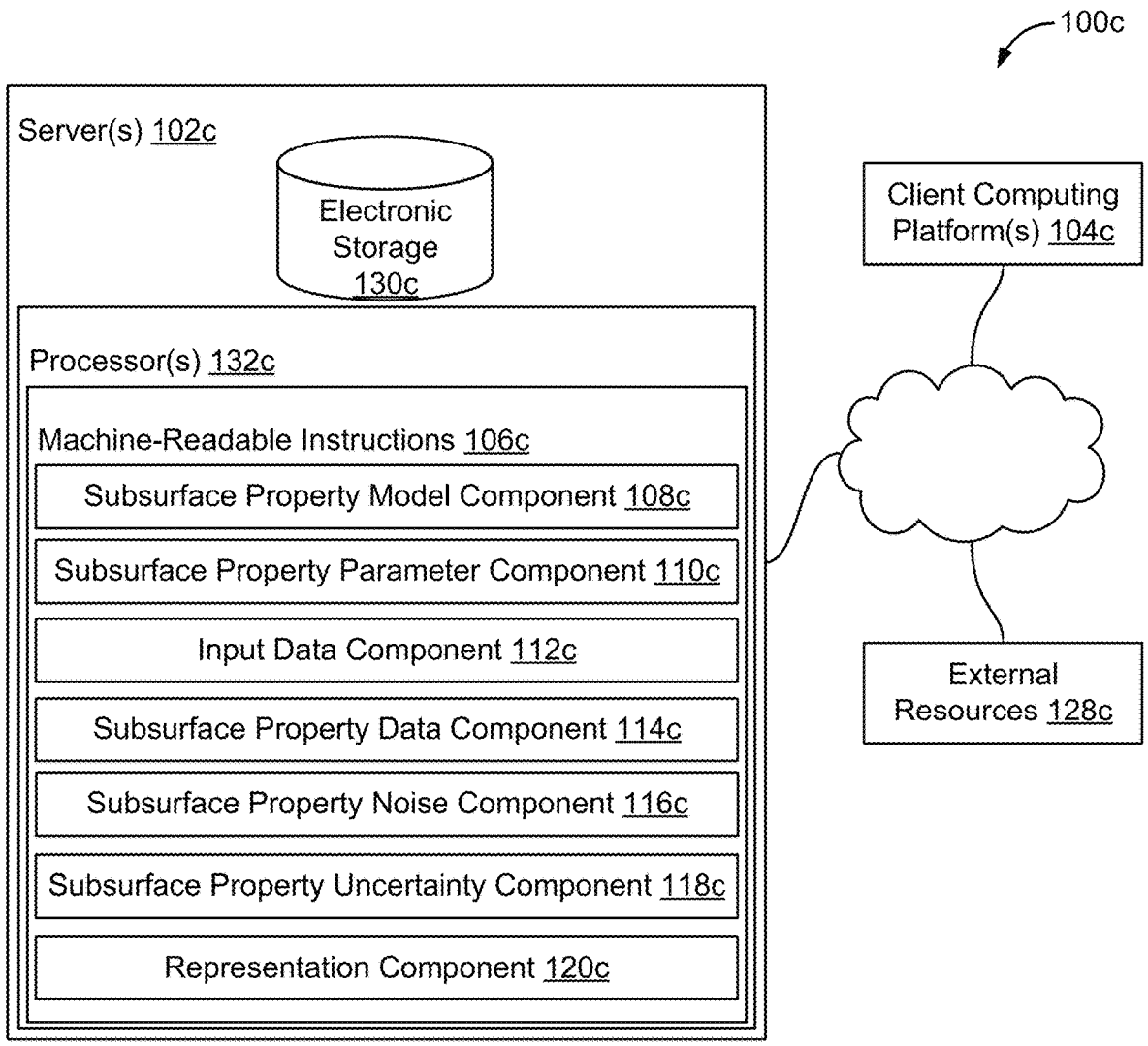
FIG. 1C illustrates a system for generating subsurface property data as a function of position and time, in accordance with one or more implementations.

FIG. 1C illustrates a system for generating subsurface property data as a function of position and time in a subsurface volume of interest, in accordance with one or more implementations. In some implementations, system 100c may include server 102c. Server 102c may be configured to communicate with client computing platform 104c according to a client/server architecture and/or other architectures. Client computing platform 104c may be configured to communicate with other client computing platforms via server 102c and/or according to a peer-to-peer architecture and/or other architectures. Users may access system 100c via client computing platform 104c.

Server 102c may be configured by machine-readable instructions 106c. Machine-readable instructions 106c may include an instruction component. The instruction component may include computer program components. The instruction component may include a subsurface property model component 108c, a subsurface property parameter component 110c, an input data component 112c, a subsurface property data component 114c, a subsurface property noise component 116c, a subsurface property uncertainty component 118c, a representation component 120c, and/or other instruction component.

Subsurface property model component 108c may be configured to obtain a first initial subsurface property model. The first initial subsurface property model may be based on machine learning techniques to map at least one variable to at least another variable. For example, the first initial subsurface property model may receive subsurface data and/or elastic property data as input and output subsurface property data. The first initial subsurface property model may be "untrained" or "unconditioned," indicating it may not estimate an output based on the input as accurately as a "trained" or "conditioned" model.

Input data may include subsurface data and/or elastic property data. Subsurface data may specify changes to subsurface energy values as a function of position and time in the subsurface volume of interest. The changes to the subsurface data may be used to identify a change in a position as a function of time, a change in subsurface energy values as a function of time, the change in subsurface energy values as a function of position, or a combination of the above. The subsurface energy values may be the data collected and/or measured by sending energy through a subsurface volume of interest to a receiver. In some implementations, the subsurface energy values may be characterized as the response of the elastic wavefield to contrasts across interfaces of subsurface layers as energy travels from a source through the subsurface to a receiver. The subsurface data may include a seismic angle stack change, a prestack seismic property change, a timeshift, and/or a time strain. It should be appreciated that these are exemplary; other subsurface data may include an amplitude-versus-offset (AVO) gather change. While changes in values are listed above, a value at a given time and/or position may also be included in the subsurface data.

Elastic property data may specify changes to a first set of elastic property values as a function of position and time in the subsurface volume of interest. In implementations, the elastic property data may include a quantitative and/or qualitative value corresponding to the elastic property. The changes to the elastic property may include a change in a position as a function of time, a change in elastic property values as a function of time, a change in elastic property values as a function of position, or a combination of the above. For example, the elastic property data may include changes as a function of position and time to an acoustic impedance, shear impedance, shear modulus, Young's modulus, incompressibility, compressibility, anisotropic parameters, and/or compressional velocity. It should be appreciated that these are exemplary; other elastic property data may include changes as a function of position and time to a shear-wave velocity, velocity ratio, Poisson Ratio, and/or density. While changes in values are listed above, a value at a given time and/or position may also be included in the elastic property data.

The subsurface property models disclosed herein may include, for example, a neural network, a random forest model, a support vector machine, a regression, a Bayesian network, and/or other subsurface property models. It should be appreciated that other subsurface property models may include, for example, convolutional neural networks, reinforcement learning, transfer learning, and/or other machine learning technologies.

Referring back to FIG. 1C, in some implementations, subsurface property model component 108c may be configured to obtain a second initial subsurface property model. The second initial subsurface property model may be substantially similar to, or the same as, the first initial subsurface property model. In some implementations, the second initial subsurface property model may be different from the first initial subsurface property model. For example, the differences may be based on a different model design, different model components, a different machine learning model, a different set of subsurface property parameters, and/or other differences discussed herein.

A given subsurface property model design may include a machine learning model, a design, a model parameter, and/or a threshold. For example, different model designs may include different structure parameters (e.g., first neuron number, hidden layer number, batch size, drop out, and/or activation), hyperparameters (e.g., learning rate, optimizer, losses, and/or epochs), functions (e.g., objective functions), thresholds (e.g., measure of model effectiveness), and/or other design features, such as, for example, running time. In implementations, structure parameters may have more of an impact on optimizing the subsurface property model than the hyperparameters or other design features. For example, this might mean that a 1% change in a structure parameter value changes the accuracy, speed, and/or other elements of the subsurface property model more than a 1% change in the hyperparameter values or other design feature values. In some implementations, the hyperparameters and/or other design features have more of an impact on optimizing the subsurface property model than the structure parameters. In one example, the neuron numbers, hidden layer numbers, and epochs may have the greatest impact on optimizing the subsurface property model. The model components may include a different combination of subsurface property models, as discussed herein. Subsurface property parameters will be discussed herein.

In some implementations, subsurface property model component 108c may be configured to generate a first conditioned subsurface property model. The first conditioned subsurface property model may be generated by training the first initial subsurface property model using training input data, a first training subsurface property dataset, and a first set of subsurface property parameters. In implementations, the subsurface property model is "conditioned," indicating the subsurface property model may have been trained to optimize performance and/or improve accuracy of the initial subsurface property model. For example, the conditioned subsurface property model may more accurately output subsurface property data based on the input data. In implementations, the conditioned subsurface property model may have generated a non-linear relationship between the input data and the subsurface property data.

Training the first initial subsurface property model may include applying the training input data to the first initial subsurface property model based on the first set of subsurface property parameters to generate a first iteration of subsurface property data. The first initial subsurface property model may be adjusted to more accurately estimate the subsurface property data based on differences between the first iteration of subsurface property data and the first training subsurface property data that correspond to the training input data. This is repeated numerous times until the first subsurface property model is "conditioned," i.e., it is able to output subsurface property data that are consistently within a threshold of the first training subsurface property data. In some implementations, the threshold may depend on the speed of the subsurface property model, resources used by the subsurface property model, and/or other optimization metrics. This threshold may be based on an average of values, a maximum number of values, and/or other parameters. Other metrics may be applied to determine that the first subsurface property model is "conditioned."

In some implementations, subsurface property model component 108c may be configured to generate a second conditioned subsurface property model. The second conditioned subsurface property model may be generated in a manner substantially similar to, or the same as, the first conditioned subsurface property model. In some implementations, the second conditioned subsurface property model may be the same as the first conditioned subsurface property model. In implementations, the second conditioned subsurface property model may be different than the first conditioned subsurface property model. For example, the differences may be based on a different model design, different model components, a different machine learning model, a different initial subsurface property model, a different set of subsurface property parameters, a different threshold, different training data, and/or other differences, as discussed herein. In one example, the first conditioned subsurface property model may be substantially similar to, or the same as, the second conditioned subsurface property model except for the model design, as will be discussed herein.

In some implementations, subsurface property model component 108c may be configured to store the first conditioned subsurface property model. For example, the first conditioned subsurface property model can be stored in a non-transitory storage medium, electronic storage 130c, non-transient computer readable mediums, and/or optical storage. It should be appreciated that these are merely examples and that the first conditioned subsurface property model can be stored in other storage as well (e.g., structured storage, unstructured storage, and/or virtual storage).

In some implementations, subsurface property model component 108c may be configured to store the second conditioned subsurface property model. This may be substantially similar to, or the same as, how the first conditioned subsurface property model is stored, as discussed above.

Subsurface property parameter component 110c may be configured to obtain a first set of subsurface property parameters. The first set of subsurface property parameters may define a first set of subsurface property relationships between subsurface properties and training input data. The subsurface property relationships may be a mapping between the subsurface properties and the training input data. For example, the first set of subsurface property relationships may specify which subsurface properties from the training input data should be used and specify a corresponding weight each piece of training input data has on generating subsurface property values. The subsurface properties that are specified in the subsurface property relationships may be selected based on which elements of the training input data have the greatest impact on the subsurface property values, which is sometimes known as "feature engineering." In implementations, feature engineering may be accomplished based on machine learning, domain knowledge, and/or other techniques.

In some implementations, the first set of subsurface property parameters may not be "feature engineered," and the subsurface property model uses all input data to generate the subsurface property values. The subsurface property parameters may include, for example, a set of dry rock matrix coefficients, anisotropic coefficients, grain bulk modulus, grain density, pore pressure, overburden pressure, porosity, temperature, water saturation, oil saturation, gas saturation, and/or brine salinity. It should be appreciated that these are exemplary; other subsurface property parameters may include an oil API gravity, gas gravity, gas-oil ratio, geomechanical compaction coefficient, and/or geomechanical R-factor.

In some implementations, subsurface property parameter component 110c may be configured to obtain a second set of subsurface property parameters. The second set of subsurface property parameters may define a second set of subsurface property relationships between the subsurface properties and the training input data. In implementations, the second set of subsurface property parameters may be substantially similar to, or the same as, the first set of subsurface property parameters. The second set of subsurface property relationships may include one of the subsurface property relationships from the first set of subsurface property parameters.

In some implementations, the second set of subsurface property parameters may be different than the first set of subsurface property parameters. For example, the difference between the first set of subsurface property parameters and the second set of subsurface property parameters may be based on different rock physics assumptions that affect the subsurface property relationships between subsurface properties and input data, different fluid models that affect the subsurface property relationships between subsurface properties and input data, different techniques of feature engineering (e.g., machine learning and/or domain knowledge, as discussed herein), different sets of subsurface properties selected, different subsurface property relationships, different weights each piece of input data has on the subsurface properties or vice versa, different types of input data (e.g., purely subsurface data, purely elastic property data, or combinations of the two types of input data), and/or other differences discussed herein.

Input data component 112c may be configured to obtain training input data. The training input data may be used to train a subsurface property model, as discussed herein. The training input data may initially be collected and/or measured via sensors in the subsurface volume of interest (e.g., field data) and/or be generated through the use of subsurface and/or elastic simulation models (e.g., synthetic data). Field data may be collected and/or measured from a well and/or reservoir in a subsurface volume of interest, or from any other portion of the subsurface volume. In one example, the subsurface simulation model may include a reservoir flow simulation model, as described herein. The subsurface simulation model may be used to generate synthetic input data. In one example, the elastic simulation model may include a reservoir flow simulation model, as described herein. The elastic simulation model may be used to generate synthetic input data. The data generated from the reservoir flow simulation model may be converted into 4D input data based on a rock-physics model. In some implementations, the 4D input data may be normalized via statistical analysis before being used to train the initial subsurface property models. The input data may be stored, and examples of such storage are discussed herein. The stored input data may be obtained and/or used as part of the training input data.

In some implementations, input data component 112c may be configured to generate a first target input dataset. The first target input dataset may be field data (e.g., data that is collected and/or measured from a well and/or reservoir, or from any other portion of the subsurface volume). In other words, the first target input dataset does not have corresponding subsurface property data to confirm the conditioned subsurface property model is accurately modeling the subsurface property relationship between the input data and the subsurface property data. The first target input dataset may specify changes to subsurface energy values and/or elastic property values as a function of position and time in the subsurface volume of interest. In implementations, the first target input dataset may be preprocessed via feature engineering, denoising, and/or other preprocessing techniques.

In some implementations, input data component 112c may be configured to generate a second target input dataset. This may be substantially similar to, or the same as, how the first target input dataset is generated, as discussed above. In some implementations, the second target input dataset may be the same as the first target input dataset. In implementations, the second target input dataset may be different than the first target input dataset. For example, the differences may be based on a different subsurface volume of interest, a different set of input data elements selected from the input dataset, different noise corresponding to each input dataset, different preprocessing techniques, different sensors used to collect and/or measure the input data, different types of input data (e.g., purely subsurface data, purely elastic property data, or combinations of the two types of input data), and/or other differences discussed herein. In one example, the first target input dataset may be substantially similar to, or the same as, the second target input dataset except for the subsurface property noise corresponding to each target input dataset, as will be discussed herein.

Subsurface property data component 114c may be configured to obtain a first training subsurface property dataset. The first training subsurface property dataset may be used to train a subsurface property model, as discussed herein. The first training subsurface property dataset may initially be collected and/or measured via sensors in the subsurface volume of interest (e.g., field data) and/or be generated through the use of subsurface, elastic, and/or subsurface property simulation models (e.g., synthetic data). The synthetic subsurface property data may be stored, and examples of such storage are discussed herein. The stored synthetic subsurface property data may be obtained and/or used as part of the first training subsurface property dataset.

In implementations, the first training subsurface property dataset may correspond to the training input data. In some implementations, the first training subsurface property dataset may be derived from the training input data using existing relationships between input data and subsurface property data, the subsurface property simulation model, elastic simulation model, subsurface simulation model, rock physics, fluid models, and/or other models. For example, the subsurface property simulation model may use the subsurface and/or elastic simulation models to generate the first training subsurface property dataset. The output from the subsurface and/or elastic simulation models may be used as input for the subsurface property simulation model. In one example, the subsurface property simulation model may include a reservoir flow simulation model, as described herein. The data generated from the reservoir flow simulation model may be converted into 4D subsurface property data based on a rock-physics model. In some implementations, the 4D subsurface property data may be normalized via statistical analysis before being used to train the initial subsurface property models. The data may be stored, and examples of such storage are discussed herein. The stored data may be obtained and/or used as part of the first training subsurface property dataset.

In some implementations, subsurface property data component 114c may be configured to obtain a second training subsurface property dataset. This may be substantially similar to, or the same as, how the first training subsurface property dataset is obtained and/or generated, as discussed above. In some implementations, the second training subsurface property dataset may be the same as the first training subsurface property dataset. In implementations, the second training subsurface property dataset may be different than the first training subsurface property dataset. For example, the differences may be based on a different subsurface volume of interest, different noise corresponding to each subsurface property dataset, different preprocessing techniques, different sensors used to collect and/or measure the training subsurface property datasets, different types of data (e.g., purely field data, purely synthetic data, different combinations of field and synthetic data, etc.), different rock physics assumptions, different fluid models, different subsurface, elastic, and/or subsurface property simulation models used to generate synthetic subsurface property data, and/or other differences discussed herein.

In some implementations, subsurface property data component 114c may be configured to generate a first target subsurface property dataset. The first target subsurface property dataset may be generated by applying the first conditioned subsurface property model to the first target input dataset. As discussed herein, the first conditioned subsurface property model can accurately estimate the first target subsurface property dataset using the first target input dataset as input because the first conditioned subsurface property model has been "trained" or "conditioned." The first target subsurface property dataset may specify a first set of subsurface property values as a function of position and time in the subsurface volume of interest.

In some implementations, subsurface property data component 114c may be configured to generate a second target subsurface property dataset. This may be substantially similar to, or the same as, how the first target subsurface property dataset is generated, as discussed above. In some implementations, the second target subsurface property dataset may be the same as the first target subsurface property dataset. In implementations, the second target subsurface property dataset may be different than the first target subsurface property dataset. For example, the differences may be based on a difference in a target input dataset, subsurface property noise, a conditioned subsurface property model, training input data, a training subsurface property dataset, a set of subsurface property parameters, and/or other differences discussed herein. In one example, the first target subsurface property dataset may be substantially similar to, or the same as, the second target subsurface property dataset except for the differences derived from the subsurface property noise corresponding to each target input dataset, as will be discussed herein.

In some implementations, subsurface property data component 114c may be configured to generate a third target subsurface property dataset. This may be substantially similar to, or the same as, how the first target subsurface property dataset is generated, as discussed above. In some implementations, the third target subsurface property dataset may be the same as the first and/or second target subsurface property dataset. In implementations, the third target subsurface property dataset may be different than the first and/or second target subsurface property dataset. For example, the differences may be based on a difference in a target input dataset, subsurface property noise, a conditioned subsurface property model, training input data, a training subsurface property dataset, a set of subsurface property parameters, and/or other differences discussed herein.

In one example, the first target subsurface property dataset may be substantially similar to, or the same as, the third target subsurface property dataset except the set of subsurface property parameters that define a set of subsurface property relationships between the training input data and the subsurface properties, as discussed herein. In another example, the first target subsurface property dataset may be substantially similar to, or the same as, the third target subsurface property dataset except the subsurface property models used to generate each subsurface property dataset may be different, as discussed herein.

Subsurface property noise component 116c may be configured to generate and/or obtain first subsurface property noise. The first subsurface property noise may correspond to the first target input dataset. Noise may refer to irregular fluctuations in the data derived from various sources. For example, the subsurface property noise may be derived from natural noise (e.g., noise from sensors collecting and/or measuring field data), synthetic noise (e.g., noise simulating natural noise), and/or other sources. Adding subsurface property noise to synthetic input data may provide more accurate subsurface property data. In some implementations, adding subsurface property noise to generated input data may allow the training input data to be based on both field data and synthetic data. In implementations, this added subsurface property noise may be modeled after the natural noise in the field data.

In some implementations, subsurface property noise component 116c may be configured to generate and/or obtain second subsurface property noise. This may be substantially similar to, or the same as, how the first subsurface property noise is generated, as discussed above. The second subsurface property noise may correspond to the second target input dataset. In some implementations, the second subsurface property noise may be the same as the first subsurface property noise. In implementations, the second subsurface property noise may be different than the first subsurface property noise. For example, the differences may be based on a different subsurface property noise model (e.g., field-data-based, machine-learning-based, etc.), different subsurface property noise type (e.g., only natural noise, only synthetic noise, different sets of natural and synthetic noise), different subsurface property natural noise sources (e.g., different sensors, different preprocessing methods, etc.), and/or other differences discussed herein.

Subsurface property uncertainty component 118c may be configured to generate a first subsurface property uncertainty. The first subsurface property uncertainty may help to determine how accurate values in the subsurface property data are. In implementations, the first subsurface property uncertainty may specify a likelihood a value is accurate. In some implementations, the first subsurface property uncertainty may specify a range of values between which a "true" value exists. For example, the subsurface property uncertainty may be in the form of an error bar, a confidence interval, a probability distribution, a standard deviation, standard error, and/or another format.

The first subsurface property uncertainty may be based on the first target subsurface property dataset and the second target subsurface property dataset. For example, the first subsurface property uncertainty may be based on differences between the first target subsurface property dataset and the second target subsurface property dataset. The differences may be based on different values in the target subsurface property datasets derived from changes to a common error source between the training subsurface property datasets, such as, for example, noise (e.g., derived from subsurface property noise models, subsurface property noise type, subsurface natural noise sources, etc.), interpolation, model (e.g., subsurface property model designs, model components, machine learning models, sets of subsurface property parameters, thresholds, weights, etc.), parameter uncertainty (e.g., limited to sample data), and/or other sources. In implementations, the first subsurface property uncertainty may be based on the first target subsurface property dataset and the third target subsurface property dataset, or any other combination of subsurface property datasets.

In some implementations, subsurface property uncertainty component 118c may be configured to generate a second subsurface property uncertainty. The second subsurface property uncertainty may be based on the first target subsurface property dataset and the third target subsurface property dataset. In some implementations, the second subsurface property uncertainty may be based on the second target subsurface property dataset and the third subsurface property dataset, or any other combination of subsurface property datasets. The second subsurface property uncertainty may be substantially similar to, or the same as, how the first subsurface property uncertainty is generated, as discussed above. In some implementations, the second subsurface property uncertainty may be the same as the first subsurface property uncertainty. In implementations, the second subsurface property uncertainty may be different than the first subsurface property uncertainty. For example, the differences may be based on a different error source used to generate the first subsurface property uncertainty, as discussed above. The differences may also be based on comparing different subsurface property datasets, different formats for the subsurface property uncertainty, different methods of generating the subsurface property data uncertainties, and/or other differences discussed herein.

Representation component 120c may be configured to generate a representation of the subsurface property data, input data, and/or subsurface property uncertainty. The representation may be generated using visual effects to depict at least some of the subsurface property data, input data, and/or subsurface property uncertainty as a function of position and time. The visual effects may include a visual transformation of the representation. A visual transformation may include a visual change in how the representation is presented or displayed. In some implementations, a visual transformation may include a visual zoom, a visual filter, a visual rotation, a visual stretching or change in aspect ratio, and/or a visual overlay (e.g., text and/or graphics overlay). In some implementations, the representation may be a video.

In one example, the representation may include a map overlay. The map overlay may include a digital elevation model map, a gross depositional environment map, a geophysical attribute, a physical map, a political map, and/or other types of maps. The map may be displayed as a raster image, a contour map, or a thematic map; it may also be partially transparent to view other information displayed below it. The first representation may illustrate a map of the subsurface volume of interest and corresponding subsurface property data, input data, and/or subsurface property uncertainty. Different sets of data may be represented using different colors and/or shades of a color. For example, a first target subsurface property dataset may be represented using a color gradient, a second target subsurface property dataset may be represented using a color bar (e.g., different colors), and/or other visual effects to represent the subsurface property data, input data, and/or subsurface property uncertainty.

In one example, the representation may be a four-dimensional video of a subsurface volume of interest displaying changes to subsurface property data, input data, and/or subsurface property uncertainty as a function of position and time. In some implementations, the representation may be a static image and changes to data as a function of time may be visualized using color.

Representation component 120c may be configured to display the representation. The representation may be displayed on a graphical user interface and/or other displays. The graphical user interface may include a user interface based on graphics and/or text. In implementations, a user may zoom in on and/or view a location of the volume of interest to illustrate more detail on a given location. The graphical user interface may be configured to receive voice input, gestures, haptic input, keyboard, mouse, and/or other input.

In some implementations, server 102c, client computing platform 104c, and/or external resources 128c may be operatively linked via an electronic communication link. For example, such electronic communication link may be established, at least in part, via a network such as the Internet and/or other networks. It will be appreciated that this is not intended to be limiting, and that the scope of this disclosure includes implementations, in which server 102c, client computing platform 104c, and/or external resources 128c may be operatively linked via some other communication media.

A given client computing platform 104c may include a processor to execute computer program components. The computer program components may enable a user corresponding to the given client computing platform 104c to interface with system 100c and/or external resources 128c, and/or provide other functionality attributed herein to client computing platform 104c. By way of non-limiting example, the given client computing platform 104c may include a desktop computer, a laptop computer, a handheld computer, a tablet computing platform, a Netbook, a Smartphone, a gaming console, and/or other computing platforms.

External resources 128c may include sources of information outside of system 100c, external entities participating with system 100c, and/or other resources. In some implementations, some or all of the functionality attributed herein to external resources 128c may be provided by resources included in system 100c.

Server 102c may include electronic storage 130c, processor 132c, and/or other components. Server 102c may include communication lines, or ports to enable the exchange of information with a network and/or other computing platforms. Illustration of server 102c in FIG. 1C is not intended to be limiting. Server 102c may include a plurality of hardware, software, and/or firmware components operating together to provide the functionality attributed herein to server 102c. For example, server 102c may be implemented by a cloud of computing platforms operating together as server 102c.

Electronic storage 130c may include storage media that electronically store information. The electronic storage media of electronic storage 130c may include one or both of system storage that is provided integrally (i.e., substantially non-removable) with server 102 and/or removable storage that is removably connectable to server 102c via, for example, a port (e.g., a USB port, a firewire port, and/or other ports) or a drive (e.g., a disk drive and/or other drives). Electronic storage 130c may include non-transitory storage media, non-transient electronic storage, optically readable storage media (e.g., optical disks and/or other optically readable storage media), magnetically readable storage media (e.g., magnetic tape, magnetic hard drive, floppy drive, and/or other magnetically readable storage media), electrical charge-based storage media (e.g., EEPROM, RAM, and/or other electrical charge-based storage media), solid-state storage media (e.g., flash drive and/or other solid-state storage media), and/or other electronically readable storage media. Electronic storage 130c may include a virtual storage resource (e.g., cloud storage, a virtual private network, and/or other virtual storage resources). Electronic storage 130c may store software algorithms, information determined by processor 132c, information received from server 102c, information received from client computing platform 104c, and/or other information that enables server 102c to function as described herein. It should be appreciated that the information may be stored in its natural and/or raw format (e.g., data lakes).

Processor 132c may provide information processing capabilities in server 102c. As such, processor 132c may include a physical computer processor, a digital processor, an analog processor, a digital circuit designed to process information, an analog circuit designed to process information, a state machine, and/or other mechanisms for electronically processing information. Although processor 132c is shown in FIG. 1C as a single entity, this is for illustrative purposes only. In some implementations, processor 132c may include a plurality of processing units. These processing units may be physically located within the same device, or processor 132c may represent processing functionality of a plurality of devices operating in coordination. Processor 132c may execute components 108c, 110c, 112c, 114c, 116c, 118c, 120c, and/or other components. Processor 132c may execute components 108c, 110c, 112c, 114c, 116c, 118c, 120c, and/or other components by software; hardware; firmware; some combination of software, hardware, and/or firmware; and/or other mechanisms for configuring processing capabilities on processor 132c. As used herein, the term "component" may refer to any component or set of components that perform the functionality attributed to the component. This may include a physical processor during execution of processor readable instructions, the processor readable instructions, circuitry, hardware, storage media, or any other components.

It should be appreciated that although components 108c, 110c, 112c, 114c, 116c, 118c, and 120c are illustrated in FIG. 1C as being implemented within a single processing unit, in implementations, in which processor 132c includes multiple processing units, one of components 108c, 110c, 112c, 114c, 116c, 118c, and/or 120c may be implemented remotely from the other components. The description of the functionality provided by the different components 108c, 110c, 112c, 114c, 116c, 118c, and/or 120c described below is for illustrative purposes, and is not intended to be limiting, as any of components 108c, 110c, 112c, 114c, 116c, 118c, and/or 120c may provide more or less functionality than is described. For example, one of components 108c, 110c, 112c, 114c, 116c, 118c, and/or 120c may be eliminated, and some or all of its functionality may be provided by other ones of components 108c, 110c, 112c, 114c, 116c, 118c, and/or 120c. As an example, processor 132c may execute an additional component that may perform some or all of the functionality attributed below to components 108c, 110c, 112c, 114c, 116c, 118c, and/or 120c.

It should be appreciated that although systems 100a, 100b, and/or 100c are illustrated as being implemented within separate systems, in implementations, systems 100a, 100b, and/or 100c may be implemented in a single system. In such a system, components of systems 100a, 100b, and/or 100c may be eliminated, and some or all of its functionality may be provided by other components of systems 100a, 100b, and/or 100c.

Figure 2A:
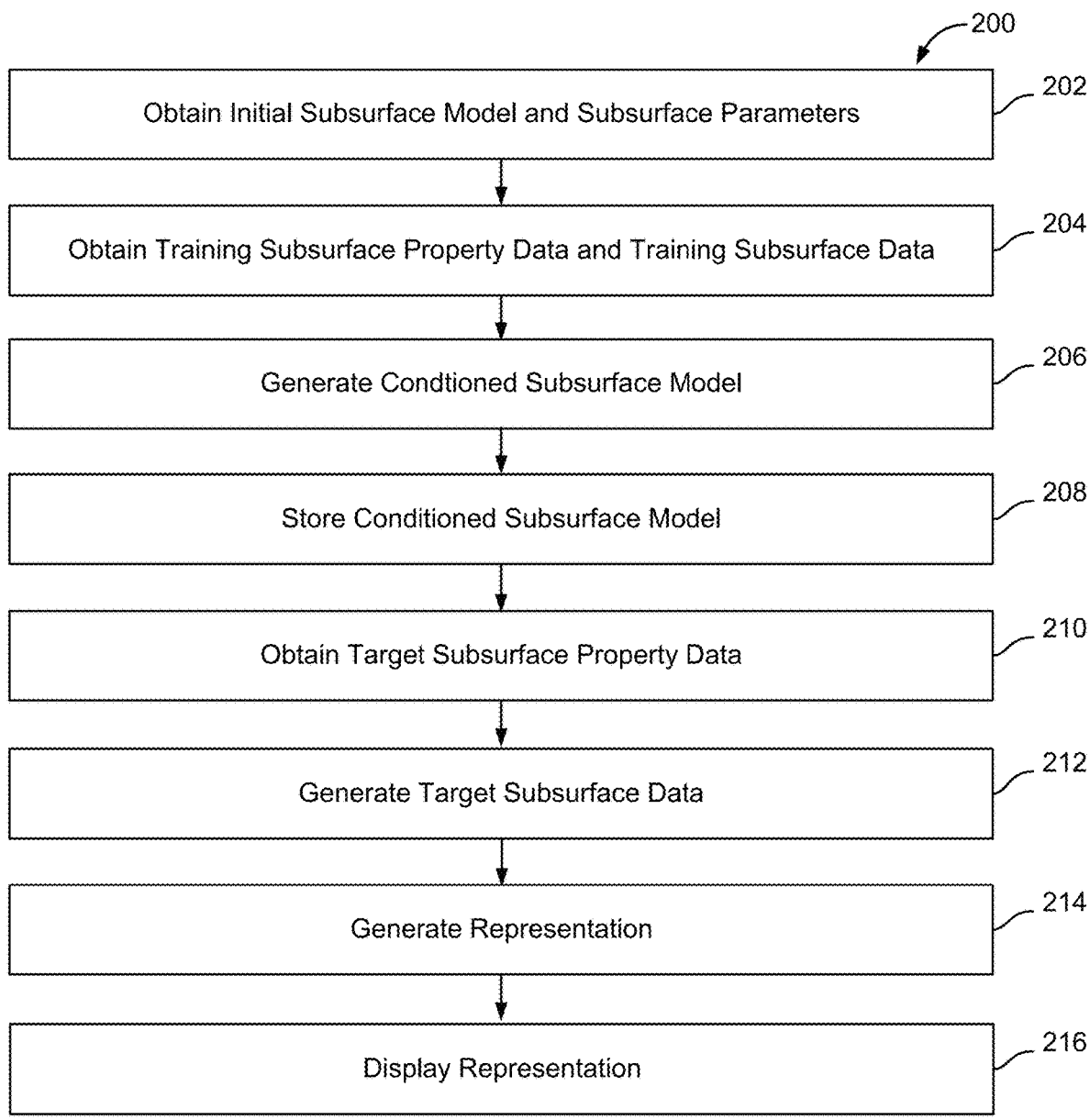
FIG. 2A illustrates an example operational flow diagram for training a subsurface model to generate subsurface data as a function of position and time in a subsurface volume of interest, in accordance with one or more implementations of the present disclosure.

FIG. 2A illustrates an example operational flow diagram 200 for training a subsurface model to generate subsurface data as a function of position and time in a subsurface volume of interest, in accordance with one or more implementations of the present disclosure. The operations of 200, 220, 240, 260, 300, 320, 340, 360, 400, 420, 440, and 460 presented below are intended to be illustrative. In some implementations, 200, 220, 240, 260, 300, 320, 340, 360, 400, 420, 440, and 460 may be accomplished with additional operations not described, and/or without one of the operations discussed. Additionally, the order in which the operations of methods 200, 220, 240, 260, 300, 320, 340, 360, 400, 420, 440, and 460 are illustrated in FIGS. 2A, 2B, 2C, 2D, 3A, 3B, 3C, 3D, 4A, 4B, 4C, and 4D and described below is not intended to be limiting.

In some implementations, methods 200, 220, 240, 260, 300, 320, 340, 360, 400, 420, 440, and 460 may be implemented in a processing device (e.g., a physical computer processor, a digital processor, an analog processor, a digital circuit designed to process information, an analog circuit designed to process information, a state machine, and/or other mechanisms for electronically processing information). The processing device may include a device executing some or all of the operations of methods 200, 220, 240, 260, 300, 320, 340, 360, 400, 420, 440, and 460 in response to instructions stored electronically on an electronic storage medium. The processing device may include a device configured through hardware, firmware, and/or software to be specifically designed for execution of operations of methods 200, 220, 240, 260, 300, 320, 340, 360, 400, 420, 440, and 460.

202 may include obtaining an initial subsurface model and subsurface parameters. As discussed herein, the initial subsurface model may be based on machine learning techniques and may be "untrained." The initial subsurface model may receive subsurface property data as input and output subsurface data. The subsurface parameters may define a set of subsurface relationships between training subsurface data and subsurface properties. 202 may be performed by a physical computer processor configured by machine-readable instructions including a component that is the same as or similar to subsurface model component 108a and/or subsurface parameter component 110a, in accordance with one or more implementations.

204 may include obtaining training subsurface property data and training subsurface data. The training subsurface property data may specify subsurface property values as a function of position and time in the subsurface volume of interest. The training subsurface property data may be used to train the initial subsurface model using the subsurface parameters. The training subsurface property data may include field data and/or synthetic data. In some implementations, the 4D training subsurface property data may be preprocessed. The training subsurface data may also be used to train the initial subsurface model, as discussed herein. The training subsurface data may specify subsurface energy values as a function of position and time in the subsurface volume of interest. The training subsurface data may include field data and/or synthetic data. The training subsurface data may correspond to the training subsurface property data. 204 may be performed by a physical computer processor configured by machine-readable instructions including a component that is the same as or similar to subsurface property component 112a and/or subsurface data component 114a, in accordance with one or more implementations.

206 may include generating a conditioned subsurface model. The conditioned subsurface model may be generated by training the initial subsurface model using training subsurface property data, training subsurface data, and a first set of subsurface parameters. The conditioned subsurface model may be an optimized subsurface model in comparison to the initial subsurface model, as discussed herein. The conditioned subsurface model may receive field data for the subsurface property data as input and output subsurface data. 206 may be performed by a physical computer processor configured by machine-readable instructions including a component that is the same as or similar to subsurface model component 108a, in accordance with one or more implementations.

208 may include storing the conditioned subsurface model. 208 may be performed by a physical computer processor configured by machine-readable instructions including a component that is the same as or similar to subsurface model component 108a, in accordance with one or more implementations.

210 may include obtaining target subsurface property data. The target subsurface property data may be field data. The target subsurface property data may specify changes to subsurface property values as a function of position and time in the subsurface volume of interest. In implementations, the first target subsurface property dataset may be preprocessed via feature engineering, denoising, and/or other preprocessing techniques. 210 may be performed by a physical computer processor configured by machine-readable instructions including a component that is the same as or similar to subsurface property component 112*a*, in accordance with one or more implementations.

212 may include generating target subsurface data. The target subsurface data may be generated by applying the conditioned subsurface model to the target subsurface property data. The target subsurface data may specify subsurface energy values as a function of position and time in the subsurface volume of interest. 212 may be performed by a physical computer processor configured by machine-readable instructions including a component that is the same as or similar to subsurface data component 114*a*, in accordance with one or more implementations.

214 may include generating the representation. The representation may be generated using visual effects to depict at least some of the subsurface data, subsurface property data, and/or subsurface data uncertainty as a function of position and time. In some implementations, the representation may be a video. 214 may be performed by a physical computer processor configured by machine-readable instructions including a component that is the same as or similar to representation component 120*a*, in accordance with one or more implementations.

216 may include displaying the representation. 216 may be performed by a physical computer processor configured by machine-readable instructions including a component that is the same as or similar to representation component 120*a*, in accordance with one or more implementations.

Figure 2B:
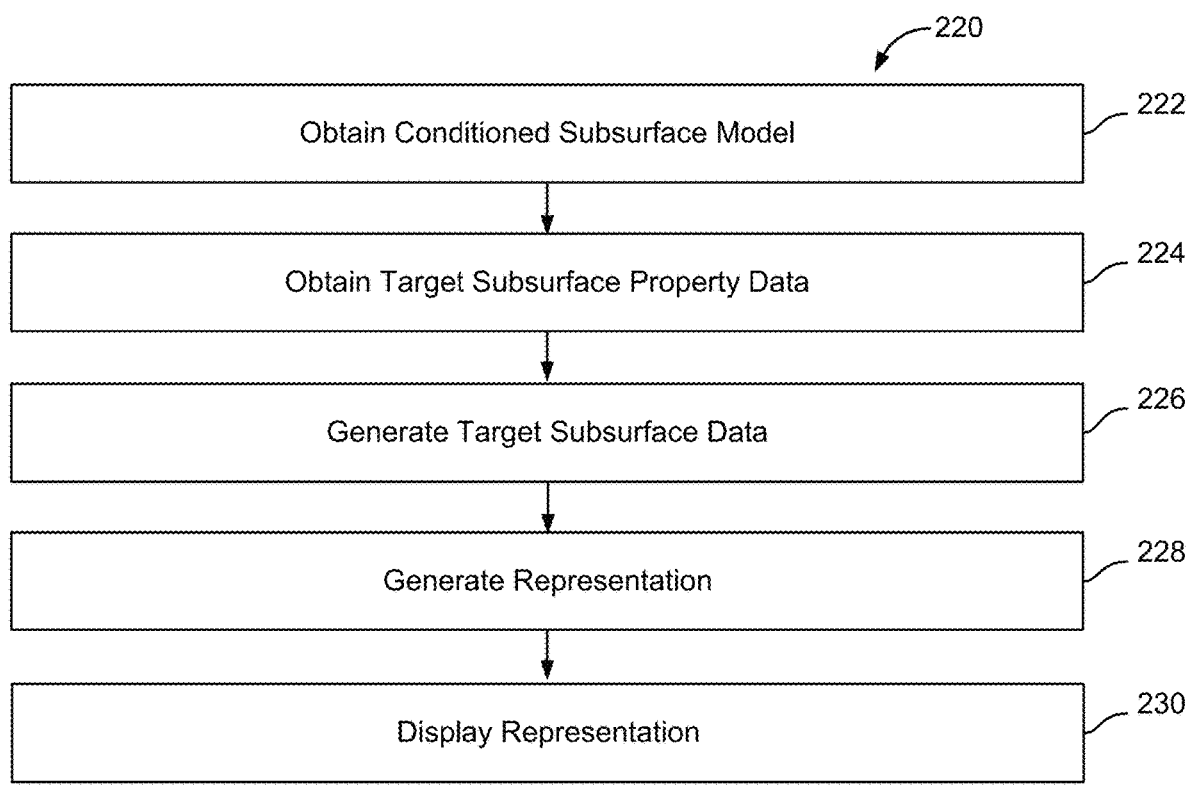
FIG. 2B illustrates an example operational flow diagram for generating subsurface data as a function of position and time in a subsurface volume of interest, in accordance with one or more implementations of the present disclosure.

FIG. 2B illustrates an example operational flow diagram 220 for generating subsurface data as a function of position and time in a subsurface volume of interest, in accordance with one or more implementations of the present disclosure. 222 may include obtaining the conditioned subsurface model. In some implementations, the conditioned subsurface model may have already been generated and stored. 222 may be performed by a physical computer processor configured by machine-readable instructions including a component that is the same as or similar to subsurface model component 108*a*, in accordance with one or more implementations.

224 may include obtaining target subsurface property data. This may be substantially similar to, or the same as, 210. 224 may be performed by a physical computer processor configured by machine-readable instructions including a component that is the same as or similar to subsurface property component 112*a*, in accordance with one or more implementations.

226 may include generating target subsurface data. This may be substantially similar to, or the same as, 212. 226 may be performed by a physical computer processor configured by machine-readable instructions including a component that is the same as or similar to subsurface data component 114*a*, in accordance with one or more implementations.

228 may include generating the representation. This may be substantially similar to, or the same as, 214. 228 may be performed by a physical computer processor configured by machine-readable instructions including a component that is the same as or similar to representation component 120*a*, in accordance with one or more implementations.

230 may include displaying the representation. This may be substantially similar to, or the same as, 216. 230 may be performed by a physical computer processor configured by machine-readable instructions including a component that is the same as or similar to representation component 120*a*, in accordance with one or more implementations.

Figure 2C:
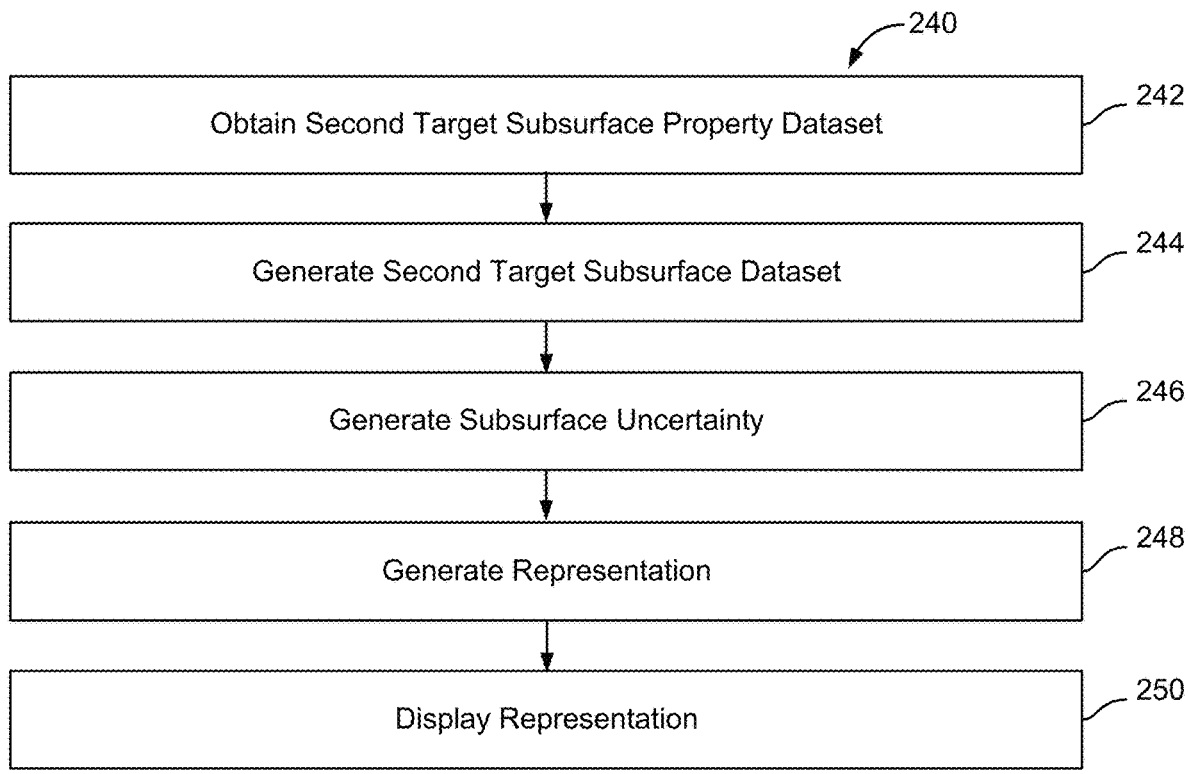
FIG. 2C illustrates an example operational flow diagram for generating subsurface data uncertainty, in accordance with one or more implementations of the present disclosure.

FIG. 2C illustrates an example operational flow diagram 240 for generating subsurface data uncertainty, in accordance with one or more implementations of the present disclosure. 242 may include obtaining a second target subsurface property dataset. In implementations, the second target subsurface property dataset may be different than the first target subsurface property dataset. In one example, the differences may be based on a different noise corresponding to each subsurface property dataset. 242 may be performed by a physical computer processor configured by machine-readable instructions including a component that is the same as or similar to subsurface property component 112*a* and/or subsurface noise component 116*a*, in accordance with one or more implementations.

244 may include generating a second target subsurface dataset. In implementations, the second target subsurface dataset may be different than the first target subsurface dataset. In one example, the differences may be derived from the different noise corresponding to each subsurface property dataset. 244 may be performed by a physical computer processor configured by machine-readable instructions including a component that is the same as or similar to subsurface property component 112*a*, in accordance with one or more implementations.

246 may include generating subsurface data uncertainty. The first subsurface data uncertainty may specify a likelihood a value is accurate and/or a range of values between which a "true" value exists. The first subsurface data uncertainty may be based on differences between the first target subsurface dataset and the second target subsurface dataset, as discussed herein. 246 may be performed by a physical computer processor configured by machine-readable instructions including a component that is the same as or similar to subsurface data component 114*a*, in accordance with one or more implementations.

248 may include generating the representation. This may be substantially similar to, or the same as, 214. 248 may be performed by a physical computer processor configured by machine-readable instructions including a component that is the same as or similar to representation component 120*a*, in accordance with one or more implementations.

250 may include displaying the representation. 250 may be performed by a physical computer processor configured by machine-readable instructions including a component that is the same as or similar to representation component 120*a*, in accordance with one or more implementations.

Figure 2D:
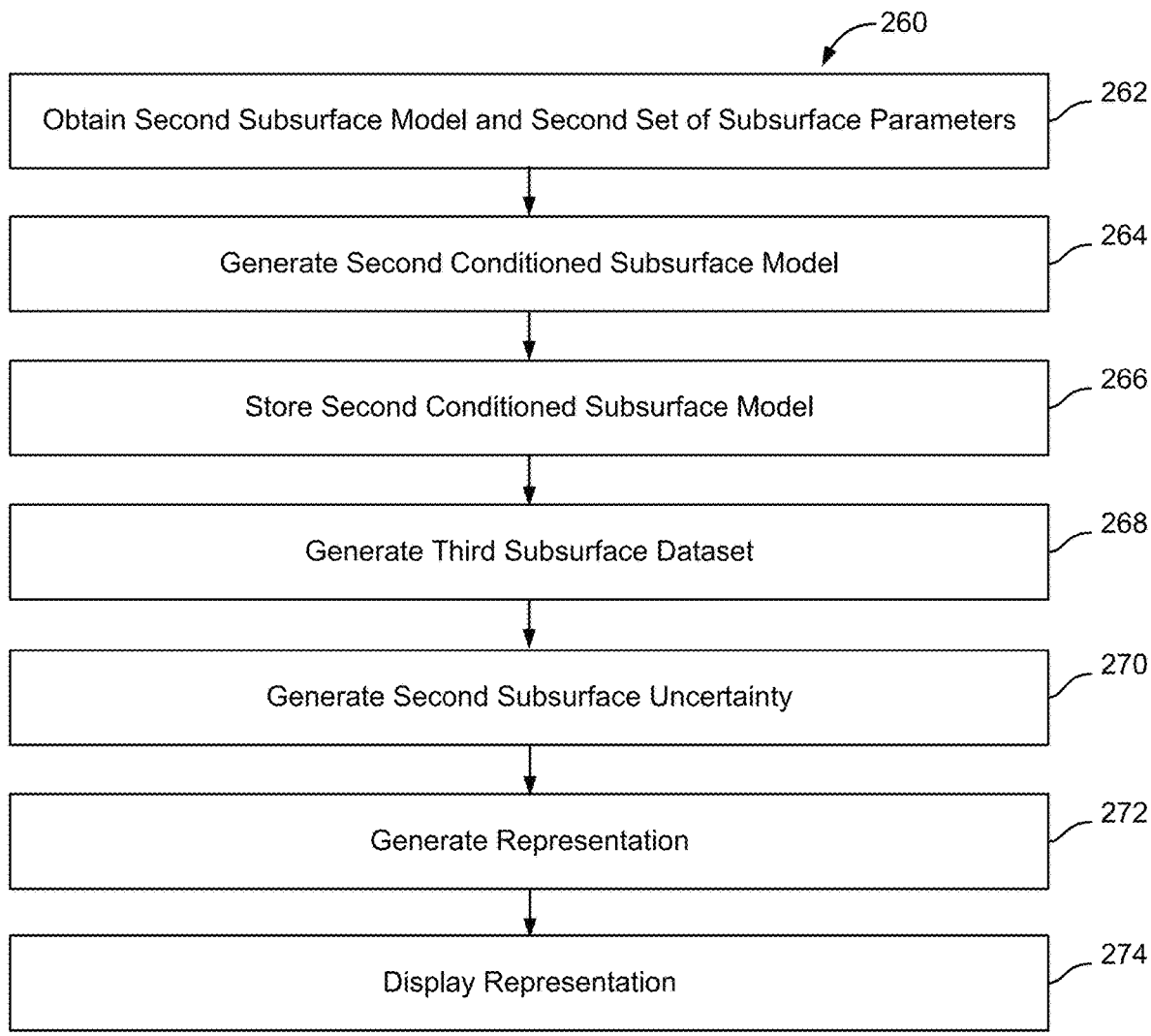
FIG. 2D illustrates an example operational flow diagram for generating subsurface data uncertainty, in accordance with one or more implementations of the present disclosure.

FIG. 2D illustrates an example operational flow diagram 260 for generating subsurface data uncertainty, in accordance with one or more implementations of the present disclosure. 262 may include obtaining a second initial subsurface model and a second set of subsurface parameters. In some implementations, the second initial subsurface model may be different from the first initial subsurface model. In one example, the differences may be based on a different set of subsurface parameters. In another example, the differences may be based on a different model design. 262 may be performed by a physical computer processor configured by machine-readable instructions including a component that is the same as or similar to subsurface model component 108*a* and/or subsurface parameter component 110*a*, in accordance with one or more implementations.

264 may include generating a second conditioned subsurface model. In implementations, the second conditioned subsurface model may be different than the first conditioned subsurface model. In one example, the differences may be based on a different set of subsurface parameters. In another example, the differences may be based on a different model design. 264 may be performed by a physical computer processor configured by machine-readable instructions including a component that is the same as or similar to subsurface model component 108*a*, in accordance with one or more implementations.

266 may include storing the second conditioned subsurface model. 266 may be performed by a physical computer processor configured by machine-readable instructions including a component that is the same as or similar to subsurface model component 108*a*, in accordance with one or more implementations.

268 may include generating a third target subsurface dataset. This may be substantially similar to, or the same as, 244. In one example, the differences may be based on a different set of subsurface parameters. In another example, the differences may be based on a different model design. 268 may be performed by a physical computer processor configured by machine-readable instructions including a component that is the same as or similar to subsurface data component 114*a*, in accordance with one or more implementations.

270 may include generating a second subsurface data uncertainty. This may be substantially similar to, or the same as, 246. In implementations, the second subsurface data uncertainty may be different than the first subsurface data uncertainty. For example, the differences may be based on a different error source used to generate the first subsurface data uncertainty, as discussed above. The differences may also be based on comparing different subsurface datasets, different formats for the subsurface data uncertainty, different methods of generating the subsurface data uncertainties, and/or other differences discussed herein. 270 may be performed by a physical computer processor configured by machine-readable instructions including a component that is the same as or similar to subsurface data uncertainty component 118*a*, in accordance with one or more implementations.

272 may include generating the representation. This may be substantially similar to, or the same as, 214. 272 may be performed by a physical computer processor configured by machine-readable instructions including a component that is the same as or similar to representation component 120*a*, in accordance with one or more implementations.

274 may include displaying the representation. 274 may be performed by a physical computer processor configured by machine-readable instructions including a component that is the same as or similar to representation component 120*a*, in accordance with one or more implementations.

Figure 3A:
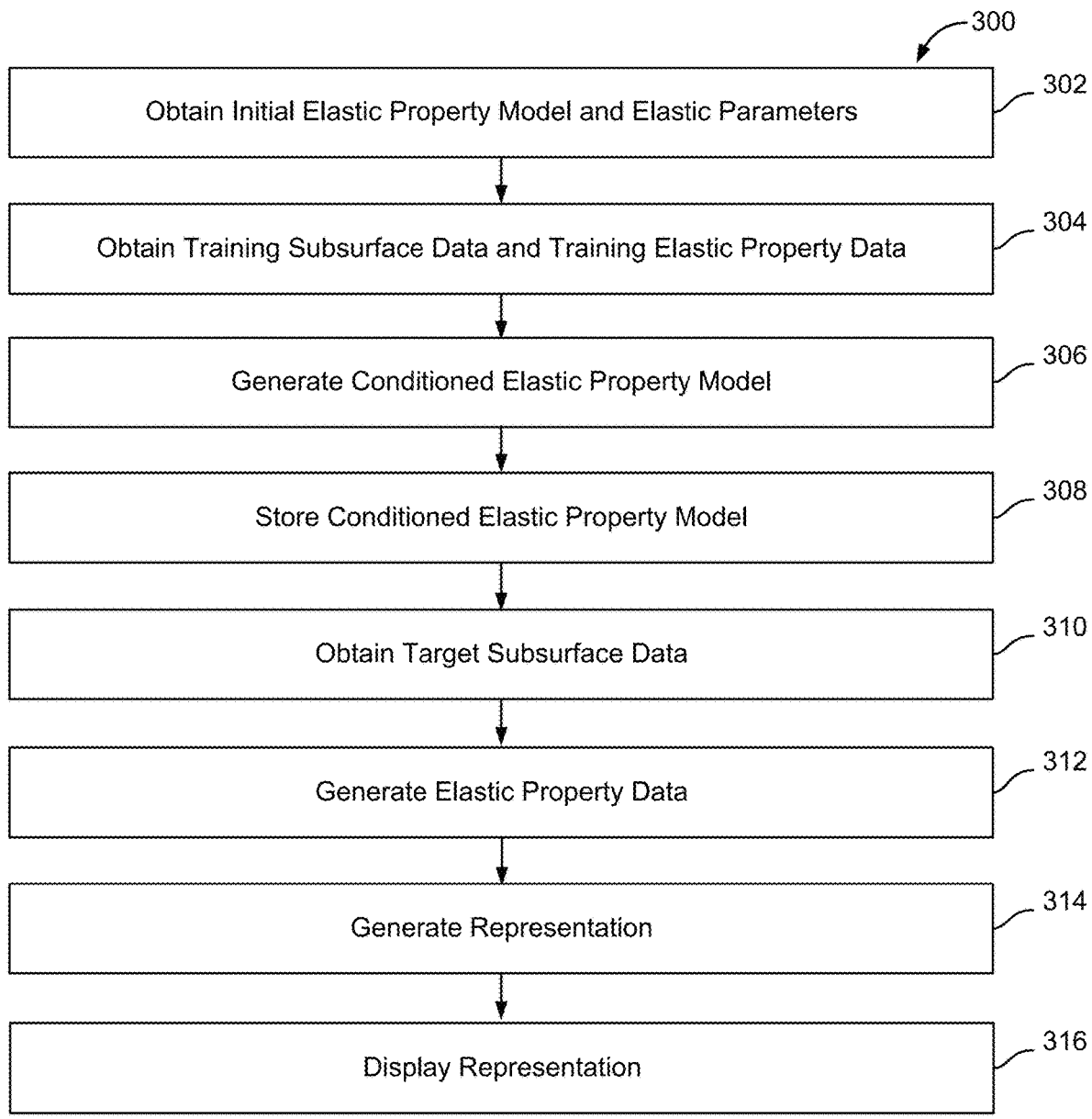
FIG. 3A illustrates an example operational flow diagram for training an elastic property model to generate elastic property data as a function of position and time in the subsurface volume of interest, in accordance with one or more implementations of the present disclosure.

FIG. 3A illustrates an example operational flow diagram 300 for training an elastic property model to generate elastic property data as a function of position and time in the subsurface volume of interest, in accordance with one or more implementations of the present disclosure. 302 may include obtaining an initial elastic model and elastic parameters. As discussed herein, the initial elastic model may be based on machine learning techniques and may be "untrained." The initial elastic model may receive subsurface data as input and output elastic property data. The elastic parameters may define a set of elastic relationships between elastic properties and training subsurface data. 302 may be performed by a physical computer processor configured by machine-readable instructions including a component that is the same as or similar to elastic model component 108*b* and/or elastic parameter component 110*b*, in accordance with one or more implementations.

304 may include obtaining training subsurface data and training elastic property data. The training subsurface data may specify subsurface energy values as a function of position and time in the subsurface volume of interest. The training subsurface data may be used to train the initial elastic model using the elastic parameters. The training subsurface data may include field data and/or synthetic data. In some implementations, the 4D training subsurface data may be preprocessed. The training elastic property data may also be used to train the initial elastic model, as discussed herein. The training elastic property data may specify elastic property values as a function of position and time in the subsurface volume of interest. The training elastic property data may include field data and/or synthetic data. The training elastic property data may correspond to the training subsurface data. 304 may be performed by a physical computer processor configured by machine-readable instructions including a component that is the same as or similar to subsurface data component 112*b* and/or elastic property data component 114*b*, in accordance with one or more implementations.

306 may include generating a conditioned elastic model. The conditioned elastic model may be generated by training the initial elastic model using training subsurface data, training elastic property data, and a first set of elastic parameters. The conditioned elastic model may be an optimized elastic model in comparison to the initial elastic model, as discussed herein. The conditioned elastic model may receive field data for the subsurface data as input and output elastic property data. 306 may be performed by a physical computer processor configured by machine-readable instructions including a component that is the same as or similar to elastic model component 108*b*, in accordance with one or more implementations.

308 may include storing the conditioned elastic model. 308 may be performed by a physical computer processor configured by machine-readable instructions including a component that is the same as or similar to elastic model component 108*b*, in accordance with one or more implementations.

310 may include obtaining target subsurface data. The target subsurface data may be field data. The target subsurface data may specify changes to subsurface energy values as a function of position and time in the subsurface volume of interest. In implementations, the first target subsurface dataset may be preprocessed via feature engineering, denoising, and/or other preprocessing techniques. 310 may be performed by a physical computer processor configured by machine-readable instructions including a component that is the same as or similar to subsurface data component 112*b*, in accordance with one or more implementations.

312 may include generating target elastic property data. The target elastic property data may be generated by applying the conditioned elastic model to the target subsurface data. The target elastic property data may specify elastic property values as a function of position and time in the subsurface volume of interest. 312 may be performed by a physical computer processor configured by machine-readable instructions including a component that is the same as or similar to elastic property data component 114*b*, in accordance with one or more implementations.

314 may include generating the representation. The representation may be generated using visual effects to depict at least some of the elastic property data, subsurface data, and/or elastic uncertainty as a function of position and time. In some implementations, the representation may be a video. 314 may be performed by a physical computer processor configured by machine-readable instructions including a component that is the same as or similar to representation component 120b, in accordance with one or more implementations.

316 may include displaying the representation. 316 may be performed by a physical computer processor configured by machine-readable instructions including a component that is the same as or similar to representation component 120b, in accordance with one or more implementations.

Figure 3B:
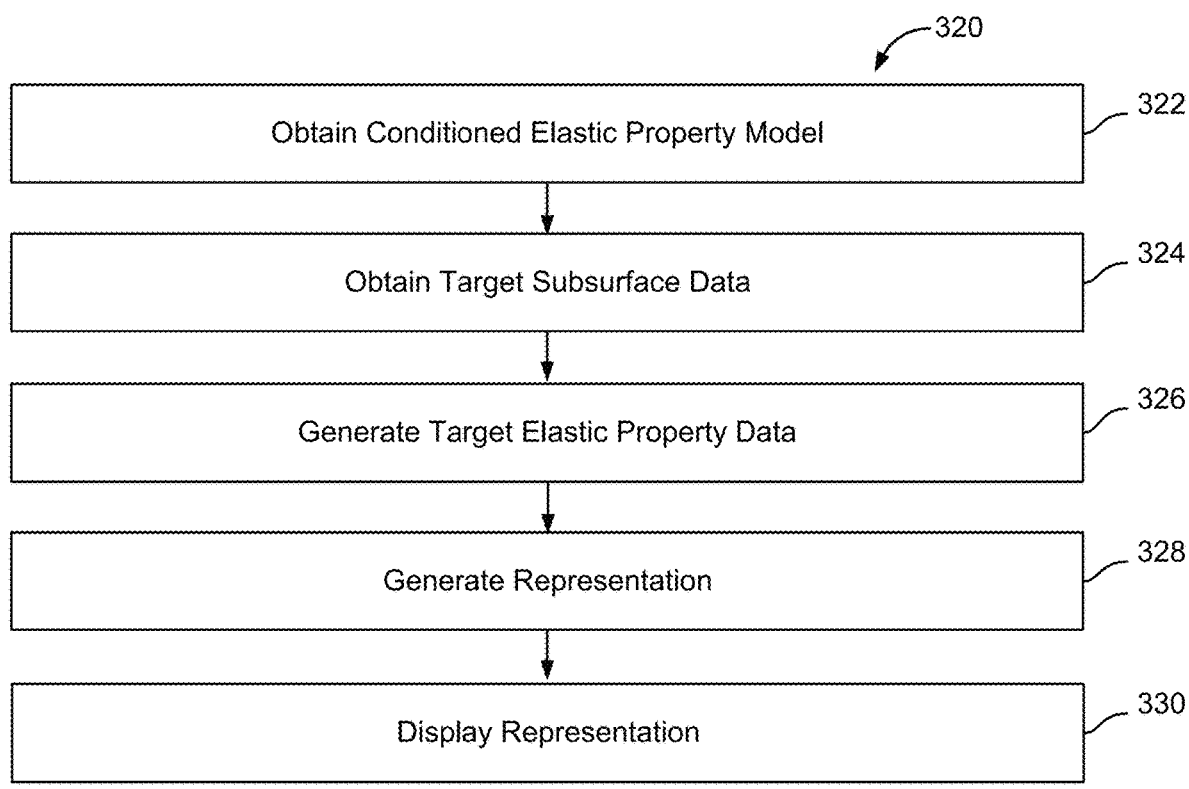
FIG. 3B illustrates an example operational flow diagram for generating elastic property data as a function of position and time in the subsurface volume of interest, in accordance with one or more implementations of the present disclosure.

FIG. 3B illustrates an example operational flow diagram 320 for generating elastic property data as a function of position and time in the subsurface volume of interest, in accordance with one or more implementations of the present disclosure. 322 may include obtaining the conditioned elastic model. In some implementations, the conditioned elastic model may have already been generated and stored. 322 may be performed by a physical computer processor configured by machine-readable instructions including a component that is the same as or similar to elastic model component 108b, in accordance with one or more implementations.

324 may include obtaining target subsurface data. This may be substantially similar to, or the same as, 310. 324 may be performed by a physical computer processor configured by machine-readable instructions including a component that is the same as or similar to subsurface data component 112b, in accordance with one or more implementations.

326 may include generating target elastic property data. This may be substantially similar to, or the same as, 312. 326 may be performed by a physical computer processor configured by machine-readable instructions including a component that is the same as or similar to elastic property data component 114b, in accordance with one or more implementations.

328 may include generating the representation. This may be substantially similar to, or the same as, 314. 328 may be performed by a physical computer processor configured by machine-readable instructions including a component that is the same as or similar to representation component 120b, in accordance with one or more implementations.

330 may include displaying the representation. This may be substantially similar to, or the same as, 316. 330 may be performed by a physical computer processor configured by machine-readable instructions including a component that is the same as or similar to representation component 120b, in accordance with one or more implementations.

Figure 3C:
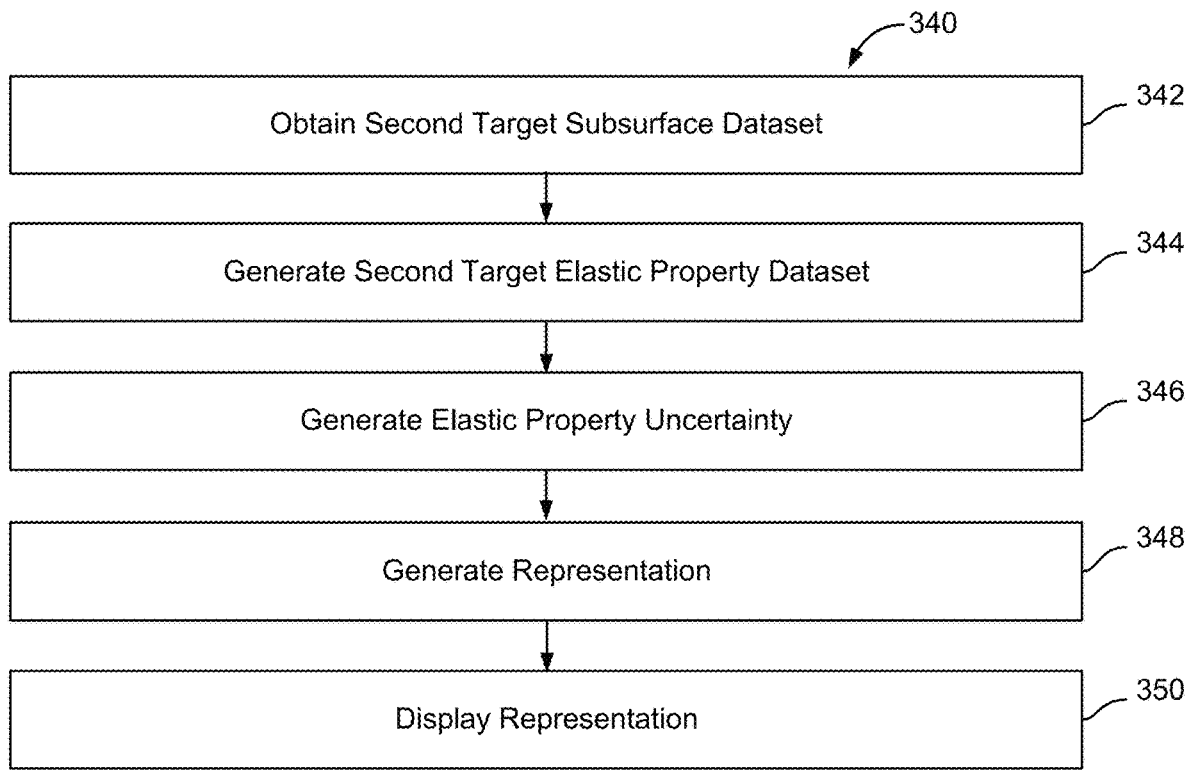
FIG. 3C illustrates an example operational flow diagram for generating elastic property uncertainty, in accordance with one or more implementations of the present disclosure.

FIG. 3C illustrates an example operational flow diagram 340 for generating elastic uncertainty, in accordance with one or more implementations of the present disclosure. 342 may include obtaining a second target subsurface dataset. In implementations, the second target subsurface dataset may be different than the first target subsurface dataset. In one example, the differences may be based on a different noise corresponding to each subsurface dataset. 342 may be performed by a physical computer processor configured by machine-readable instructions including a component that is the same as or similar to subsurface data component 112b and/or subsurface noise component 116b, in accordance with one or more implementations.

344 may include generating a second target elastic property dataset. In implementations, the second target elastic property dataset may be different than the first target elastic property dataset. In one example, the differences may be derived from the different noise corresponding to each subsurface dataset. 344 may be performed by a physical computer processor configured by machine-readable instructions including a component that is the same as or similar to subsurface data component 112b, in accordance with one or more implementations.

346 may include generating elastic uncertainty. The first elastic uncertainty may specify a likelihood a value is accurate and/or a range of values between which a "true" value exists. The first elastic uncertainty may be based on differences between the first target elastic property dataset and the second target elastic property dataset, as discussed herein. 346 may be performed by a physical computer processor configured by machine-readable instructions including a component that is the same as or similar to elastic property data component 114b, in accordance with one or more implementations.

348 may include generating the representation. This may be substantially similar to, or the same as, 314. 348 may be performed by a physical computer processor configured by machine-readable instructions including a component that is the same as or similar to representation component 120b, in accordance with one or more implementations.

350 may include displaying the representation. 350 may be performed by a physical computer processor configured by machine-readable instructions including a component that is the same as or similar to representation component 120b, in accordance with one or more implementations.

Figure 3D:
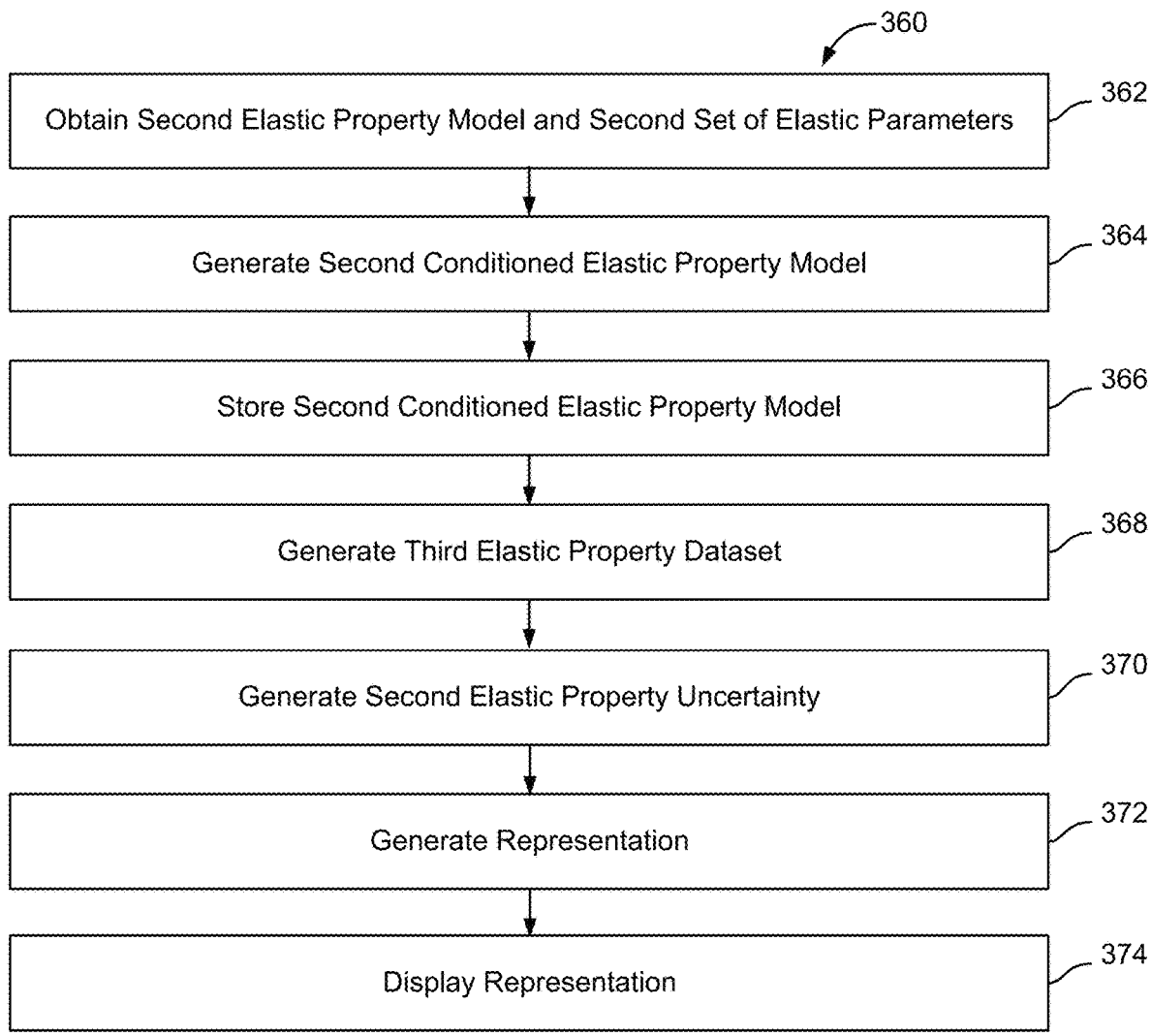
FIG. 3D illustrates an example operational flow diagram for generating elastic property uncertainty, in accordance with one or more implementations of the present disclosure.

FIG. 3D illustrates an example operational flow diagram 360 for generating elastic uncertainty, in accordance with one or more implementations of the present disclosure. 362 may include obtaining a second initial elastic model and a second set of elastic parameters. In some implementations, the second initial elastic model may be different from the first initial elastic model. In one example, the differences may be based on a different set of elastic parameters. In another example, the differences may be based on a different model design. 362 may be performed by a physical computer processor configured by machine-readable instructions including a component that is the same as or similar to elastic model component 108b and/or elastic parameter component 110b, in accordance with one or more implementations.

364 may include generating a second conditioned elastic model. In implementations, the second conditioned elastic model may be different than the first conditioned elastic model. In one example, the differences may be based on a different set of elastic parameters. In another example, the differences may be based on a different model design. 364 may be performed by a physical computer processor configured by machine-readable instructions including a component that is the same as or similar to elastic model component 108b, in accordance with one or more implementations.

366 may include storing the second conditioned elastic model. 366 may be performed by a physical computer processor configured by machine-readable instructions including a component that is the same as or similar to elastic model component 108b, in accordance with one or more implementations.

368 may include generating a third target elastic property dataset. This may be substantially similar to, or the same as, 344. In one example, the differences may be based on a different set of elastic parameters. In another example, the differences may be based on a different model design. 368 may be performed by a physical computer processor configured by machine-readable instructions including a component that is the same as or similar to elastic property data component 114*b*, in accordance with one or more implementations.

370 may include generating a second elastic uncertainty. This may be substantially similar to, or the same as, 246. In implementations, the second elastic uncertainty may be different than the first elastic uncertainty. For example, the differences may be based on a different error source used to generate the first elastic uncertainty, as discussed above. The differences may also be based on comparing different elastic property datasets, different formats for the elastic uncertainty, different methods of generating the elastic uncertainties, and/or other differences discussed herein. 370 may be performed by a physical computer processor configured by machine-readable instructions including a component that is the same as or similar to elastic uncertainty component 118*b*, in accordance with one or more implementations.

372 may include generating the representation. This may be substantially similar to, or the same as, 314. 372 may be performed by a physical computer processor configured by machine-readable instructions including a component that is the same as or similar to representation component 120*b*, in accordance with one or more implementations.

374 may include displaying the representation. 374 may be performed by a physical computer processor configured by machine-readable instructions including a component that is the same as or similar to representation component 120*b*, in accordance with one or more implementations.

Figure 4A:
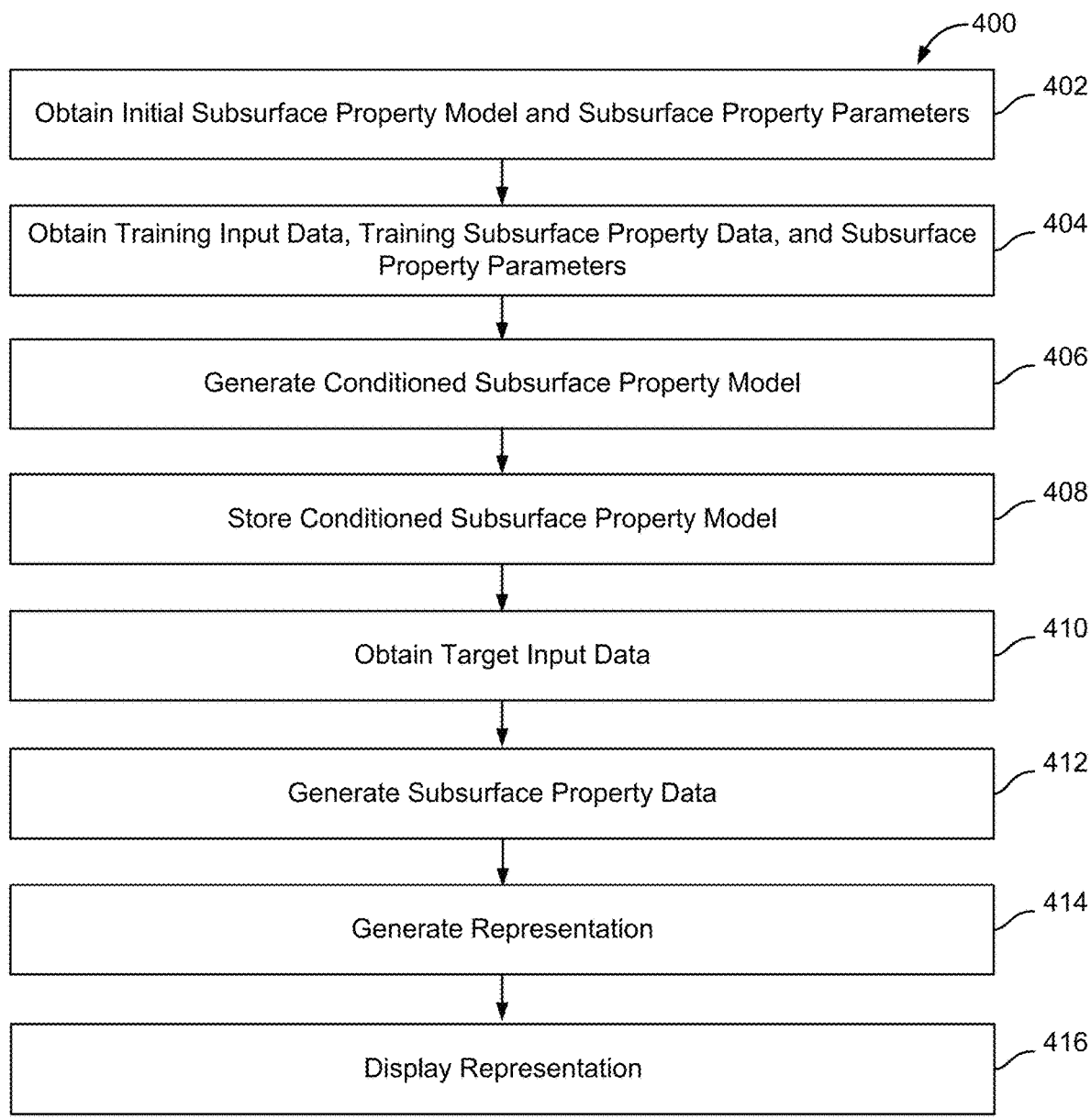
FIG. 4A illustrates an example operational flow diagram for training a subsurface property model to generate subsurface property data as a function of position and time in the subsurface volume of interest, in accordance with one or more implementations of the present disclosure.

FIG. 4A illustrates an example operational flow diagram 400 for training a subsurface property model to generate subsurface property data as a function of position and time in the subsurface volume of interest, in accordance with one or more implementations of the present disclosure. 402 may include obtaining an initial subsurface property model and subsurface property parameters. As discussed herein, the initial subsurface property model may be based on machine learning techniques and may be "untrained." The initial subsurface property model may receive input data and output subsurface property data. The input data may include subsurface data and/or elastic property data. The subsurface property parameters may define a set of subsurface property relationships between training input data and subsurface properties. 402 may be performed by a physical computer processor configured by machine-readable instructions including a component that is the same as or similar to subsurface property model component 108*c* and/or subsurface property parameter component 110*c*, in accordance with one or more implementations.

404 may include obtaining training input data and training subsurface property data. The training input data may specify subsurface energy values and/or elastic property values as a function of position and time in the subsurface volume of interest. The training input data may be used to train the initial subsurface property model using the subsurface property parameters. The training input data may include field data and/or synthetic data. In some implementations, the 4D training input data may be preprocessed. The training subsurface property data may specify subsurface property values as a function of position and time in the subsurface volume of interest. The training subsurface property data may also be used to train the initial subsurface property model, as discussed herein. The training subsurface property data may include field data and/or synthetic data. The training subsurface property data may correspond to the training input data. 404 may be performed by a physical computer processor configured by machine-readable instructions including a component that is the same as or similar to input data component 112*c* and/or subsurface property data component 114*c*, in accordance with one or more implementations.

406 may include generating a conditioned subsurface property model. The conditioned subsurface property model may be generated by training the initial subsurface property model using training input data, training subsurface property data, and a first set of subsurface property parameters. The conditioned subsurface property model may be an optimized subsurface property model in comparison to the initial subsurface property model, as discussed herein. The conditioned subsurface property model may receive field data for the input data and output subsurface property data. 406 may be performed by a physical computer processor configured by machine-readable instructions including a component that is the same as or similar to subsurface property model component 108*c*, in accordance with one or more implementations.

408 may include storing the conditioned subsurface property model. 408 may be performed by a physical computer processor configured by machine-readable instructions including a component that is the same as or similar to subsurface property model component 108*c*, in accordance with one or more implementations.

410 may include obtaining target input data. The target input data may be field data. The target input data may specify changes to subsurface energy values and/or elastic property values as a function of position and time in the subsurface volume of interest. In implementations, the first target input dataset may be preprocessed via feature engineering, denoising, and/or other preprocessing techniques. 410 may be performed by a physical computer processor configured by machine-readable instructions including a component that is the same as or similar to input data component 112*c*, in accordance with one or more implementations.

412 may include generating target subsurface property data. The target subsurface property data may be generated by applying the conditioned subsurface property model to the target input data. The target subsurface property data may specify subsurface property values as a function of position and time in the subsurface volume of interest. 412 may be performed by a physical computer processor configured by machine-readable instructions including a component that is the same as or similar to subsurface property data component 114*c*, in accordance with one or more implementations.

414 may include generating the representation. The representation may be generated using visual effects to depict at least some of the subsurface property data, input data, and/or subsurface property data uncertainty as a function of position and time. In some implementations, the representation may be a video. 414 may be performed by a physical computer processor configured by machine-readable instructions including a component that is the same as or similar to representation component 120*c*, in accordance with one or more implementations.

416 may include displaying the representation. 416 may be performed by a physical computer processor configured by machine-readable instructions including a component that is the same as or similar to representation component 120*c*, in accordance with one or more implementations.

Figure 4B:
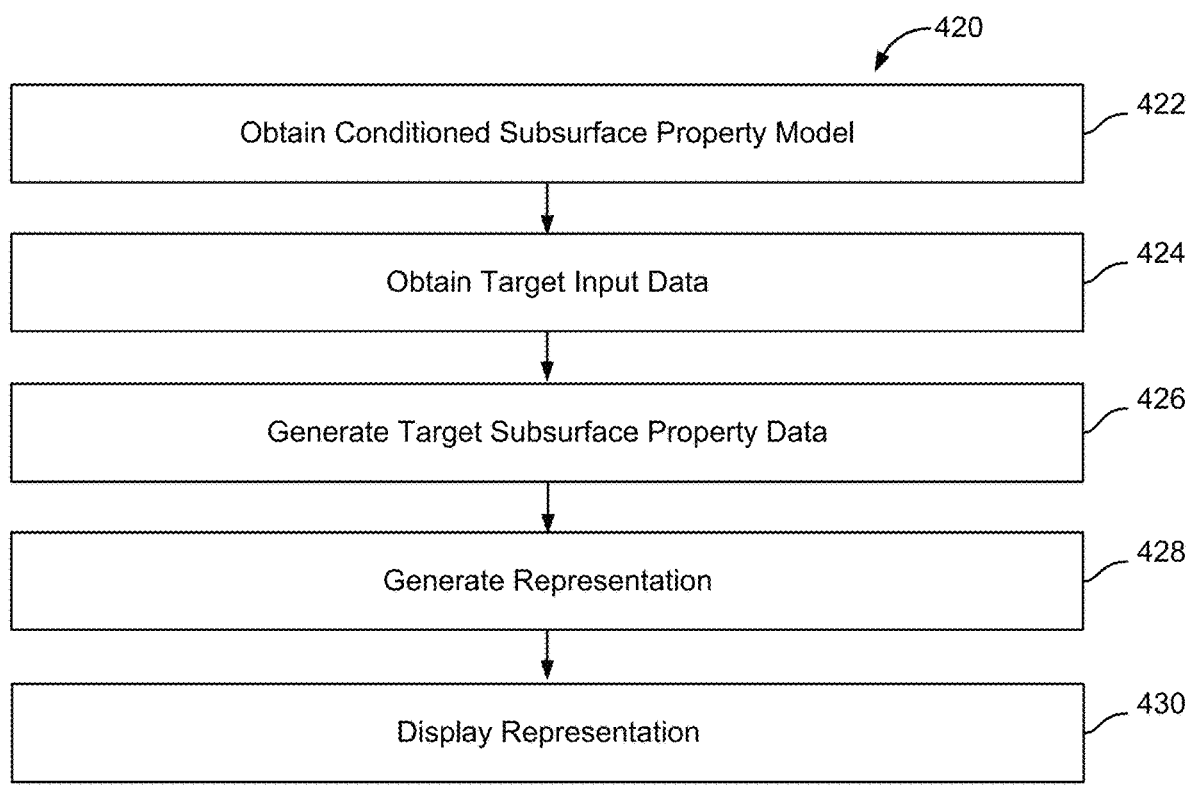
FIG. 4B illustrates an example operational flow diagram for generating subsurface property data as a function of position and time in the subsurface volume of interest, in accordance with one or more implementations of the present disclosure.

FIG. 4B illustrates an example operational flow diagram 420 for generating input data as a function of position and time in the subsurface volume of interest, in accordance with one or more implementations of the present disclosure. 422 may include obtaining the conditioned subsurface property model. In some implementations, the conditioned subsurface property model may have already been generated and stored. 422 may be performed by a physical computer processor configured by machine-readable instructions including a component that is the same as or similar to subsurface property model component 108c, in accordance with one or more implementations.

424 may include obtaining target input data. This may be substantially similar to, or the same as, 410. 424 may be performed by a physical computer processor configured by machine-readable instructions including a component that is the same as or similar to input data component 112c, in accordance with one or more implementations.

426 may include generating target subsurface property data. This may be substantially similar to, or the same as, 412. 426 may be performed by a physical computer processor configured by machine-readable instructions including a component that is the same as or similar to subsurface property data component 114c, in accordance with one or more implementations.

428 may include generating the representation. This may be substantially similar to, or the same as, 414. 428 may be performed by a physical computer processor configured by machine-readable instructions including a component that is the same as or similar to representation component 120c, in accordance with one or more implementations.

430 may include displaying the representation. This may be substantially similar to, or the same as, 416. 430 may be performed by a physical computer processor configured by machine-readable instructions including a component that is the same as or similar to representation component 120c, in accordance with one or more implementations.

Figure 4C:
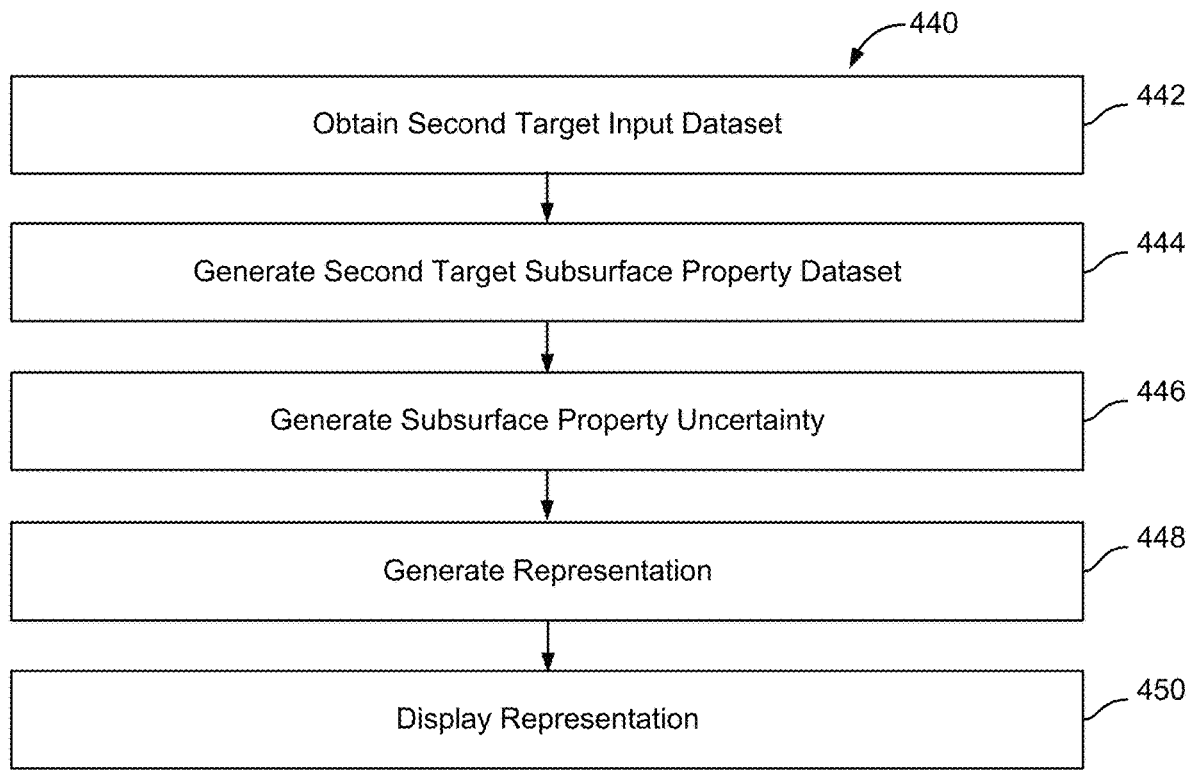
FIG. 4C illustrates an example operational flow diagram for generating subsurface property uncertainty, in accordance with one or more implementations of the present disclosure.

FIG. 4C illustrates an example operational flow diagram 440 for generating subsurface property uncertainty, in accordance with one or more implementations of the present disclosure. 442 may include obtaining a second target input dataset. In implementations, the second target input dataset may be different than the first target input dataset. In one example, the differences may be based on a different noise corresponding to each input dataset. 442 may be performed by a physical computer processor configured by machine-readable instructions including a component that is the same as or similar to input data component 112c and/or subsurface noise component 116c, in accordance with one or more implementations.

444 may include generating a second target subsurface property dataset. In implementations, the second target subsurface property dataset may be different than the first target subsurface property dataset. In one example, the differences may be derived from the different noise corresponding to each input dataset. 444 may be performed by a physical computer processor configured by machine-readable instructions including a component that is the same as or similar to input data component 112c, in accordance with one or more implementations.

446 may include generating subsurface property data uncertainty. The first subsurface property data uncertainty may specify a likelihood a value is accurate and/or a range of values between which a "true" value exists. The first subsurface property data uncertainty may be based on differences between the first target subsurface property dataset and the second target subsurface property dataset, as discussed herein. 446 may be performed by a physical computer processor configured by machine-readable instructions including a component that is the same as or similar to subsurface property data component 114c, in accordance with one or more implementations.

448 may include generating the representation. This may be substantially similar to, or the same as, 414. 448 may be performed by a physical computer processor configured by machine-readable instructions including a component that is the same as or similar to representation component 120c, in accordance with one or more implementations.

450 may include displaying the representation. 450 may be performed by a physical computer processor configured by machine-readable instructions including a component that is the same as or similar to representation component 120c, in accordance with one or more implementations.

Figure 4D:
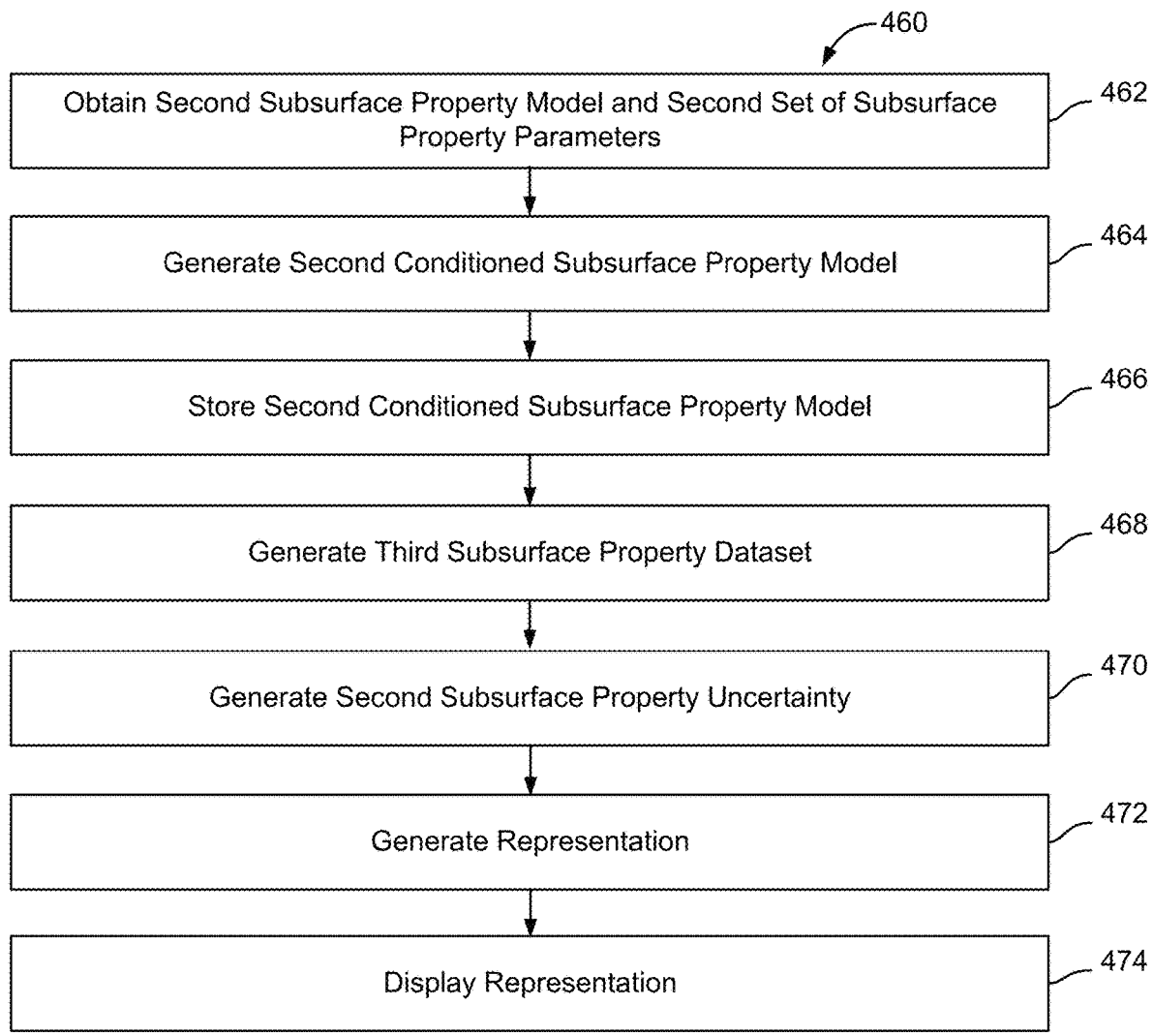
FIG. 4D illustrates an example operational flow diagram for generating subsurface property uncertainty, in accordance with one or more implementations of the present disclosure.

FIG. 4D illustrates an example operational flow diagram 460 for generating subsurface property uncertainty, in accordance with one or more implementations of the present disclosure. 462 may include obtaining a second initial subsurface property model and a second set of subsurface property parameters. In some implementations, the second initial subsurface property model may be different from the first initial subsurface property model. In one example, the differences may be based on a different set of subsurface property parameters. In another example, the differences may be based on a different model design. 462 may be performed by a physical computer processor configured by machine-readable instructions including a component that is the same as or similar to subsurface property model component 108c and/or subsurface property parameter component 110c, in accordance with one or more implementations.

464 may include generating a second conditioned subsurface property model. In implementations, the second conditioned subsurface property model may be different than the first conditioned subsurface property model. In one example, the differences may be based on a different set of subsurface property parameters. In another example, the differences may be based on a different model design. 464 may be performed by a physical computer processor configured by machine-readable instructions including a component that is the same as or similar to subsurface property model component 108c, in accordance with one or more implementations.

466 may include storing the second conditioned subsurface property model. 466 may be performed by a physical computer processor configured by machine-readable instructions including a component that is the same as or similar to subsurface property model component 108c, in accordance with one or more implementations.

468 may include generating a third target subsurface property dataset. This may be substantially similar to, or the same as, 444. In one example, the differences may be based on a different set of subsurface property parameters. In another example, the differences may be based on a different model design. 468 may be performed by a physical computer processor configured by machine-readable instructions including a component that is the same as or similar to subsurface property data component 114c, in accordance with one or more implementations.

470 may include generating a second subsurface property data uncertainty. This may be substantially similar to, or the same as, 446. In implementations, the second subsurface property data uncertainty may be different than the first subsurface property data uncertainty. For example, the differences may be based on a different error source used to generate the first subsurface property data uncertainty, as discussed above. The differences may also be based on comparing different subsurface property datasets, different formats for the subsurface property data uncertainty, different methods of generating the subsurface property data uncertainties, and/or other differences discussed herein. 470 may be performed by a physical computer processor configured by machine-readable instructions including a component that is the same as or similar to subsurface property uncertainty component 118c, in accordance with one or more implementations.

472 may include generating the representation. This may be substantially similar to, or the same as, 414. 472 may be performed by a physical computer processor configured by machine-readable instructions including a component that is the same as or similar to representation component 120c, in accordance with one or more implementations.

474 may include displaying the representation. 474 may be performed by a physical computer processor configured by machine-readable instructions including a component that is the same as or similar to representation component 120c, in accordance with one or more implementations.

Figure 5:
FIG. 5 illustrates example inputs that may be used in models, in accordance with one or more implementations of the present disclosure.
Figure 5:
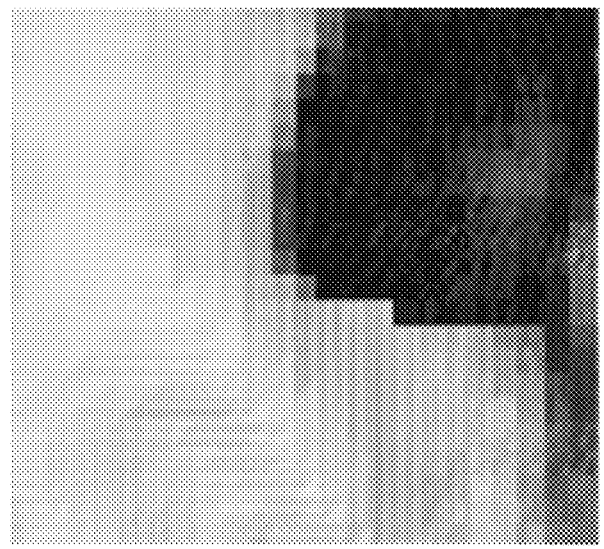
Figure 5:
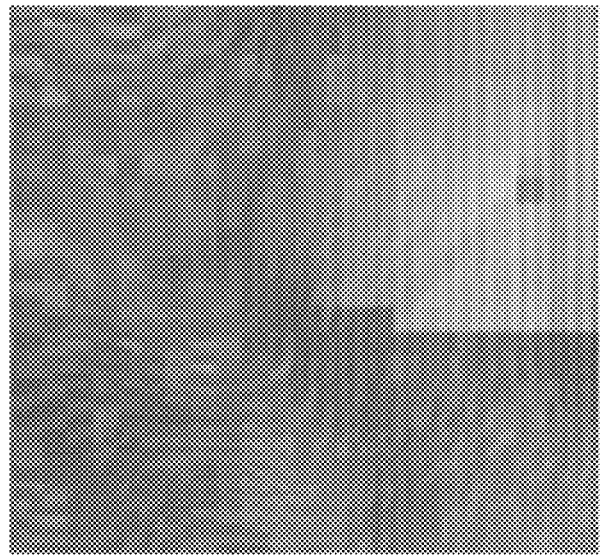

FIG. 5 illustrates example inputs that may be used in models, in accordance with one or more implementations of the present disclosure. 502 may represent 4D pore pressure data in the subsurface volume of interest. 504 may represent 4D water saturation data in the subsurface volume of interest. 506 may represent 4D gas saturation data in the subsurface volume of interest. The 4D pore pressure data, 4D water saturation data, and/or 4D gas saturation data may be generated from a reservoir simulation grid. The reservoir simulation grid may be a 1D line, 2D area, or 3D volume of discrete cells containing reservoir flow simulation model parameters along with pore pressure and saturation values generated over multiple time steps.

Figure 6:
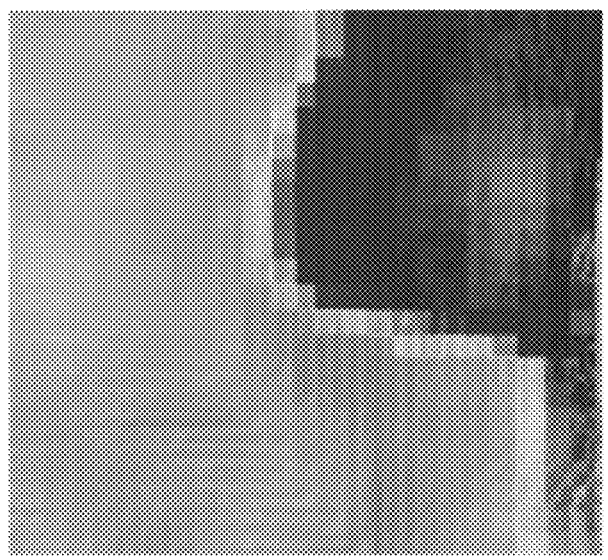
FIG. 6 illustrates example outputs that may come from models, in accordance with one or more implementations of the present disclosure.
Figure 6:
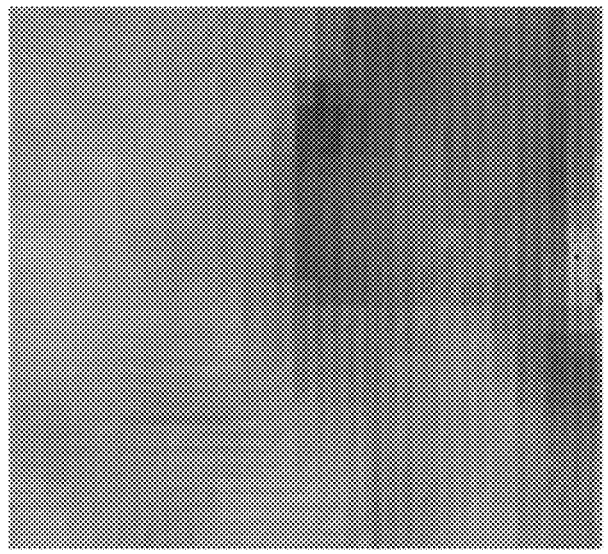
Figure 6:

FIG. 6 illustrates example outputs that may come from models, in accordance with one or more implementations of the present disclosure. 602 may represent 4D acoustic impedance data in the subsurface volume of interest. 604 may represent 4D shear impedance data in the subsurface volume of interest. 606 may represent 4D density data in the subsurface volume of interest.

Figure 7:
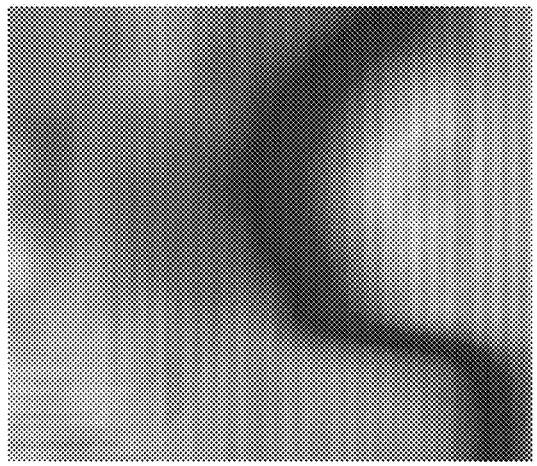
FIG. 7 illustrates example ground truth data and data generated from a model, in accordance with one or more implementations of the present disclosure.
Figure 7:
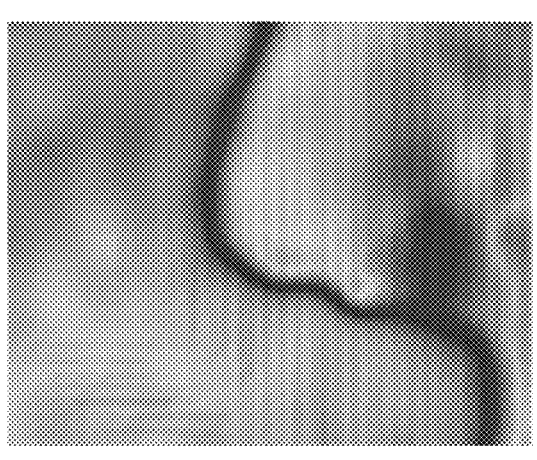
Figure 7:
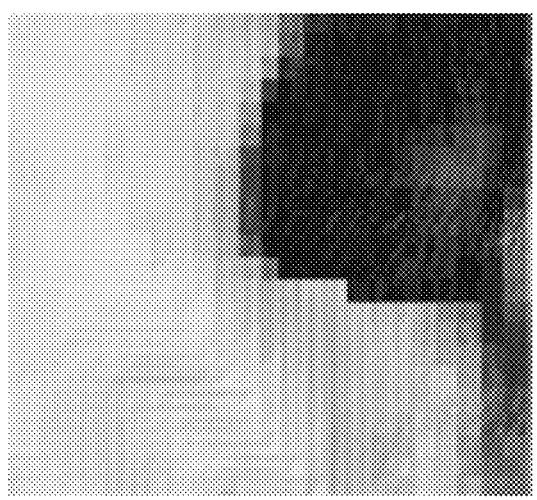
Figure 7:
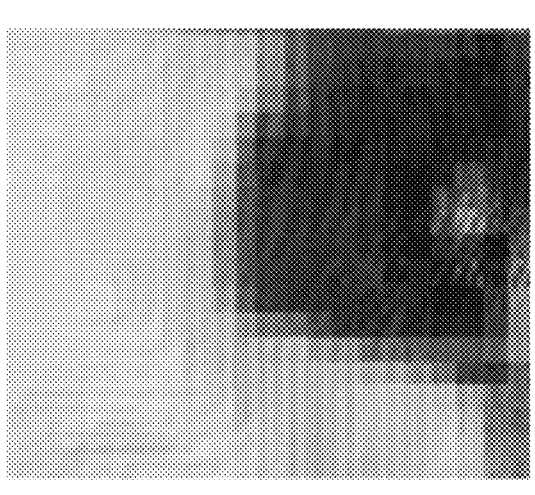
Figure 7:
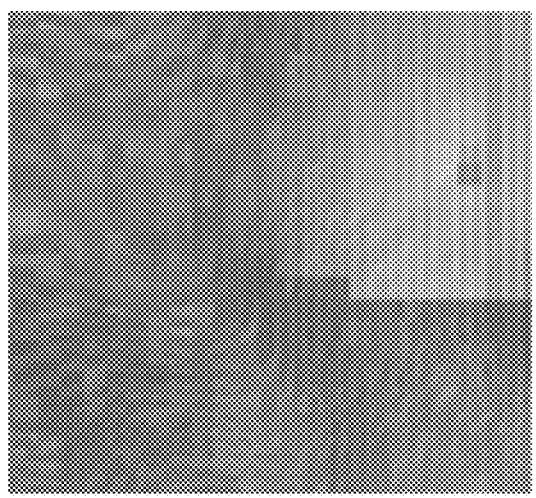
Figure 7:

FIG. 7 illustrates example data generated from ground truth data and a model, in accordance with one or more implementations of the present disclosure. 708, 710, and 712 may represent data generated from one of the models discussed herein (e.g., subsurface models, elastic models, subsurface property models, etc.). These data may be training data with corresponding ground truth data. These models may have been trained using a neural net. 708 may represent 4D pore pressure data in the subsurface volume of interest generated using a neural net model. 710 may represent 4D water saturation data in the subsurface volume of interest generated using a neural net model. 712 may represent 4D gas saturation data in the subsurface volume of interest generated using a neural net model.

702, 704, and 706 may represent the ground truth data. The ground truth data may refer to data that are collected from the subsurface volume of interest. These could be used to validate the model and/or train the model that is used to generate 708, 710, and/or 712. 702 may represent ground truth data for the 4D pore pressure data in the subsurface volume of interest. 704 may represent ground truth data for the 4D water saturation data in the subsurface volume of interest. 706 may represent ground truth data for the 4D gas saturation data in the subsurface volume of interest.

As illustrated, 708 is generally similar to 702, validating the model because the regions exhibiting no data changes (grey color) are identified in both the generated data and the ground truth data. Similarly, 710 is generally similar to 704, validating the model because the regions exhibiting data changes (darker solid color) are identified in both the generated data and the ground truth data. 712 and 706 are also generally similar, with the same regions being identified in both the generated data and the ground truth data.

Figure 8:
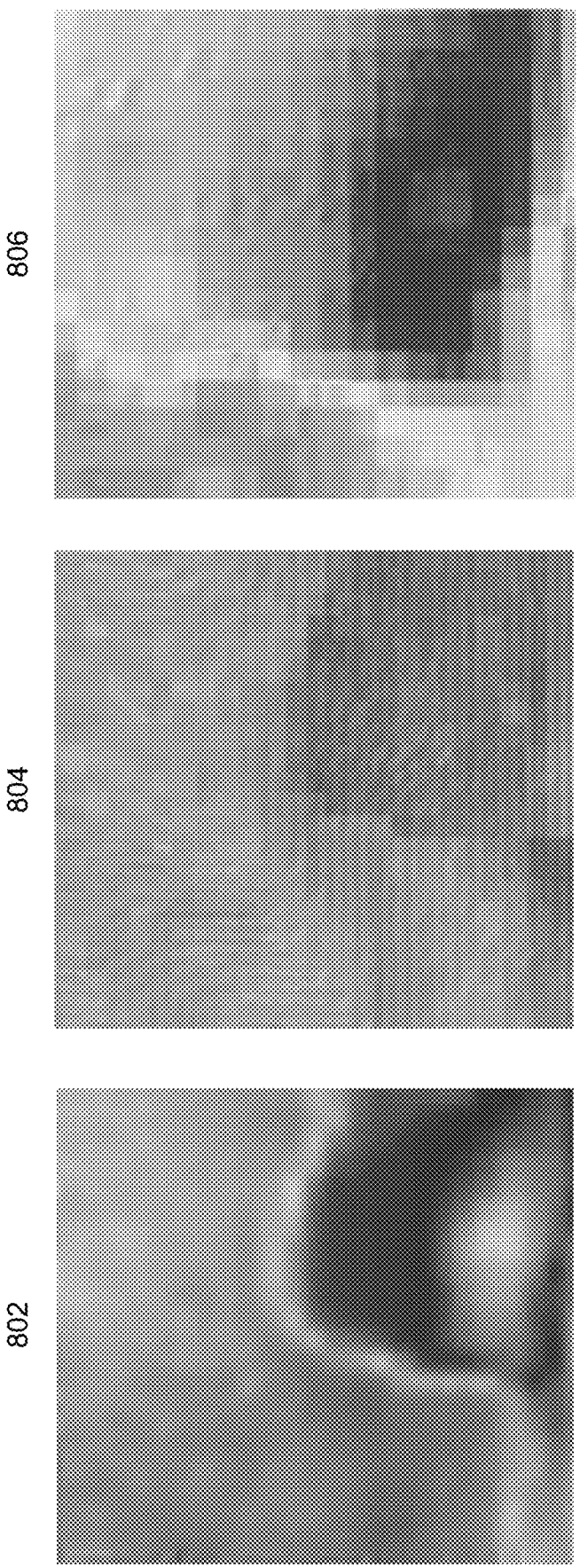
FIG. 8 illustrates example inputs that may be used in models, in accordance with one or more implementations of the present disclosure.

FIG. 8 illustrates example inputs that may be used in models, in accordance with one or more implementations of the present disclosure. 802, 804, and 806 may represent an example of "feature engineering." Feature engineering may be based on selecting the feature with the highest quality data while minimizing residuals, as well as determining whether it is realistic to have lower uncertainty field data for such a feature. Feature engineering may also account for data where additional information can be extracted and/or derived from them. For example, additional amplitude-variation-with-offset features, such as, for example, 4D gradient differences and 4D intercept differences, may be extracted and/or derived from other features. Feature engineering may also account for avoiding too many features which may slow down the processing abilities of the model.

802 may represent 4D acoustic impedance data in the subsurface volume of interest. 804 may represent 4D shear impedance data in the subsurface volume of interest. 806 may represent 4D compressional velocity data in the subsurface volume of interest. 802, 804, and 806 may represent a set of seismic inversion products that have lower error and/or residuals; on the other hand, it may be hard to generate meaningful output data if this type of data has high uncertainties.

Figure 9:
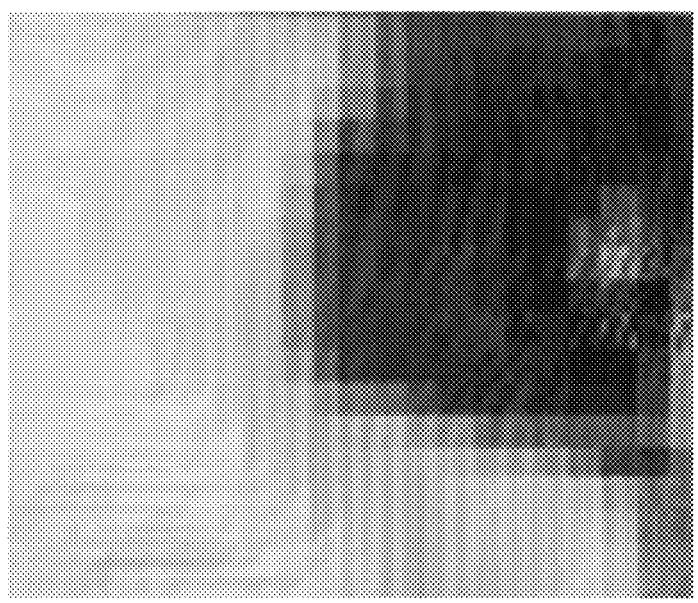
FIG. 9 illustrates the effect the example set of inputs has on the output of a model, in accordance with one or more implementations of the present disclosure.
Figure 9:
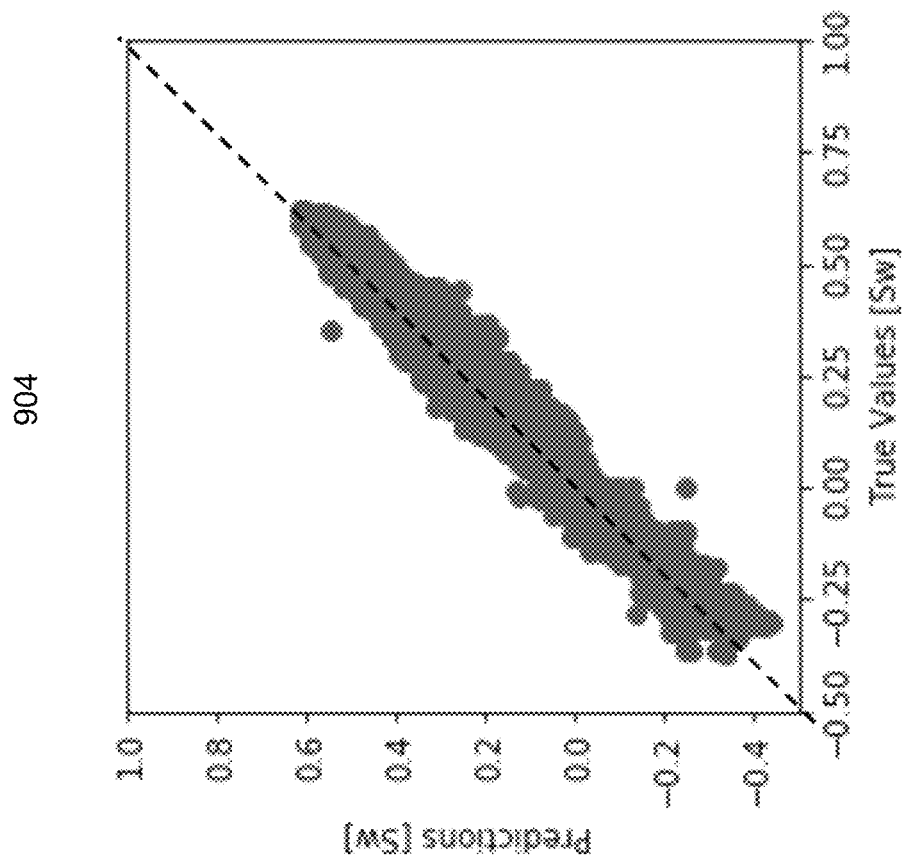

FIG. 9 illustrates the effect an example set of inputs has on the output of a model, in accordance with one or more implementations of the present disclosure. 802, 804, and 806 may be used to train a model and generate 902 and 904. 902 may represent 4D pore pressure data. 904 may be a chart with ground truth on the x axis and prediction generated from the model on the y axis. The line in 904 may represent idealized 4D pore pressure data whose predicted values equal their ground truth values, which may be used for QC purposes. The closer the output data are to the line, the more accurate the model may be. As illustrated, the data in 904 are generally grouped along the line.

Figure 10:
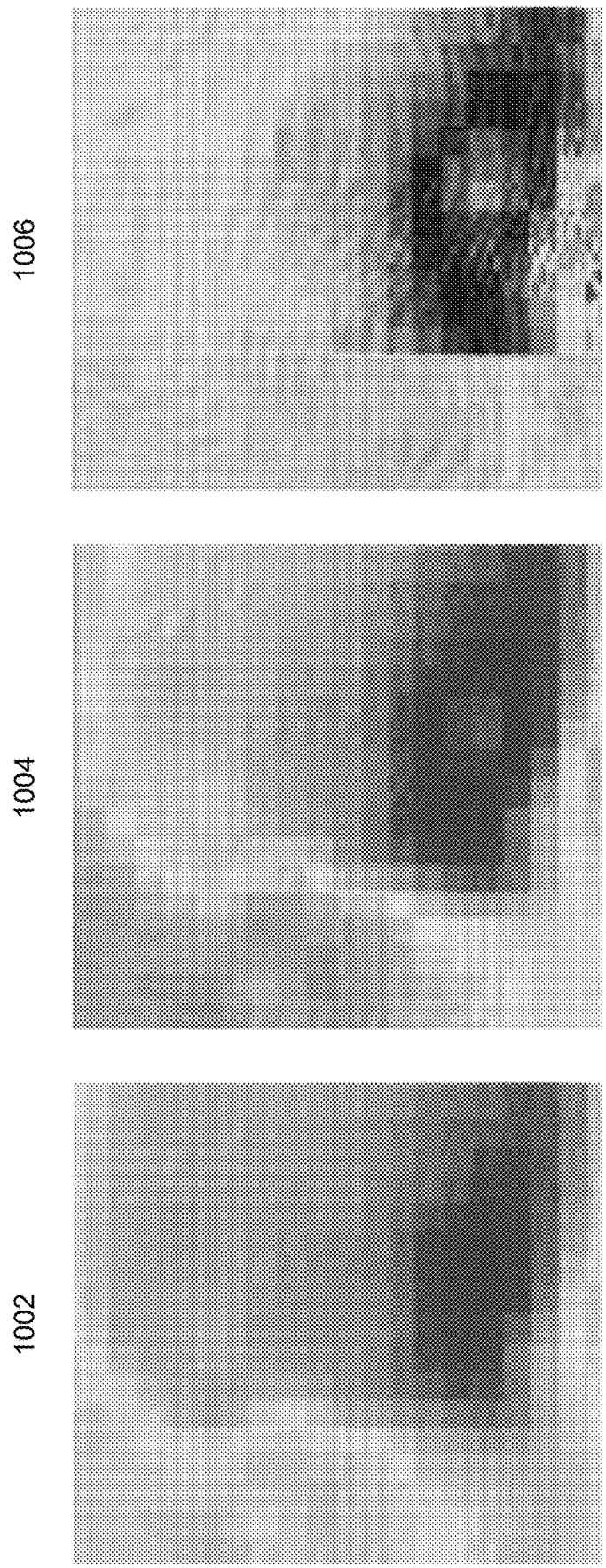
FIG. 10 illustrates example inputs that may be used in models, in accordance with one or more implementations of the present disclosure.

FIG. 10 illustrates example inputs that may be used in models, in accordance with one or more implementations of the present disclosure. 1002, 1004, and 1006 may represent an example of "feature engineering," as discussed herein. 1002 may represent 4D near stack data in the subsurface volume of interest. 1004 may represent 4D far stack data in the subsurface volume of interest. 1006 may represent 4D timeshift data in the subsurface volume of interest. 1002, 1004, and 1006 may represent a set of seismic attributes that are directly calculated that have lower uncertainties and are easily available in the field; on the other hand, there may be a higher modeling error associated with this type of data.

Figure 11:
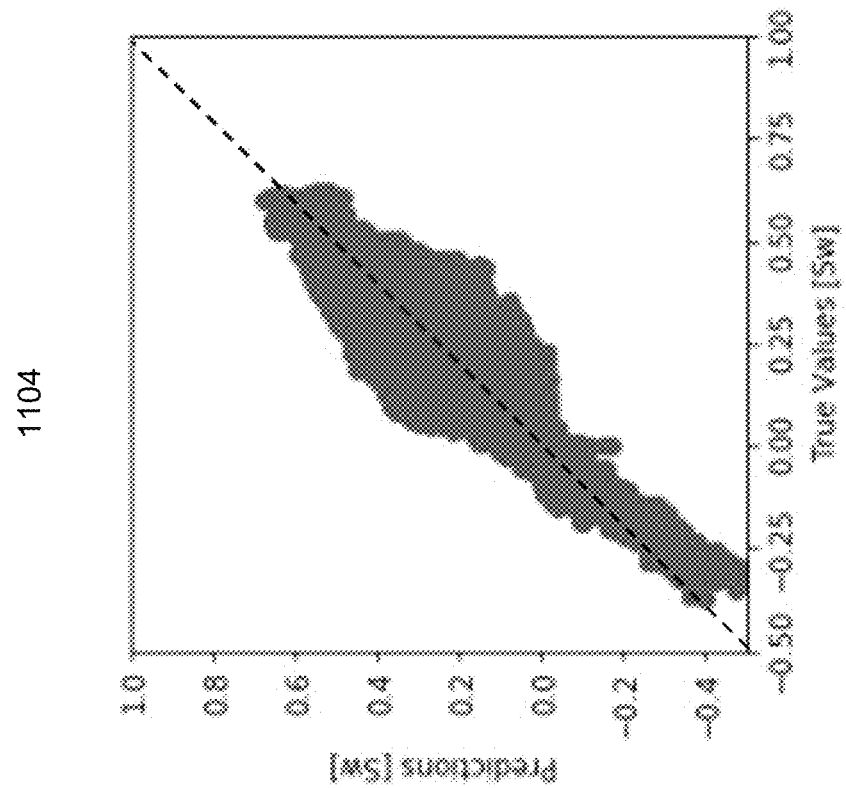
FIG. 11 illustrates the effect the example set of inputs has on the output of a model, in accordance with one or more implementations of the present disclosure.
Figure 11:
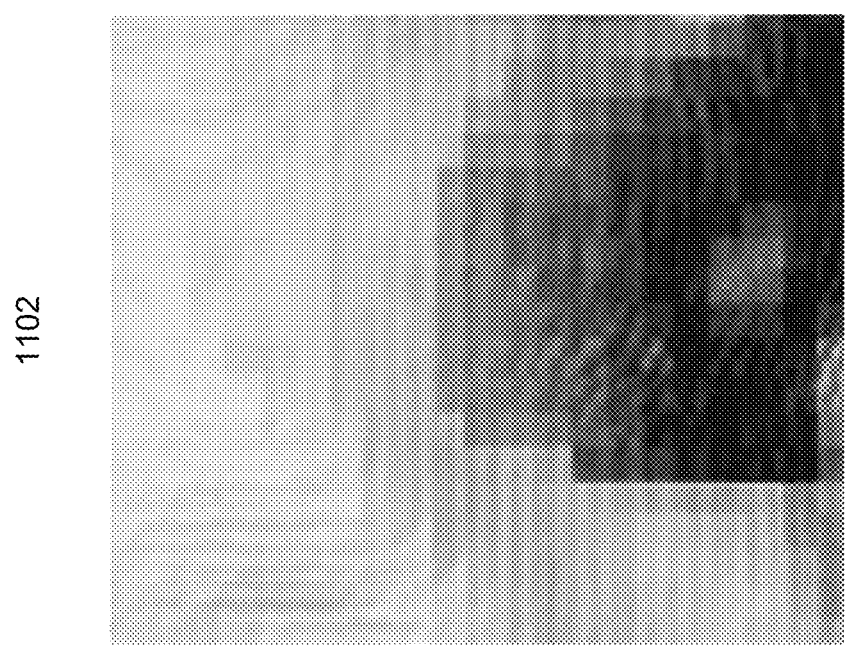

FIG. 11 illustrates the effect an example set of inputs has on the output of a model, in accordance with one or more implementations of the present disclosure. 1002, 1004, and 1006 may be used to train a model and generate 1102 and 1104. 1102 may represent 4D pore pressure data. The line in 1104 may represent idealized 4D pore pressure data whose predicted values equal their ground truth values, which may be used for QC purposes. The closer the output data are to the line, the more accurate the model may be. As illustrated, 904 may have more of the data grouped closer to the line than 1104, which may indicate the features selected in FIG. 9 are better at predicting the 4D pore pressure data than the features selected in FIG. 11.

Figure 12:
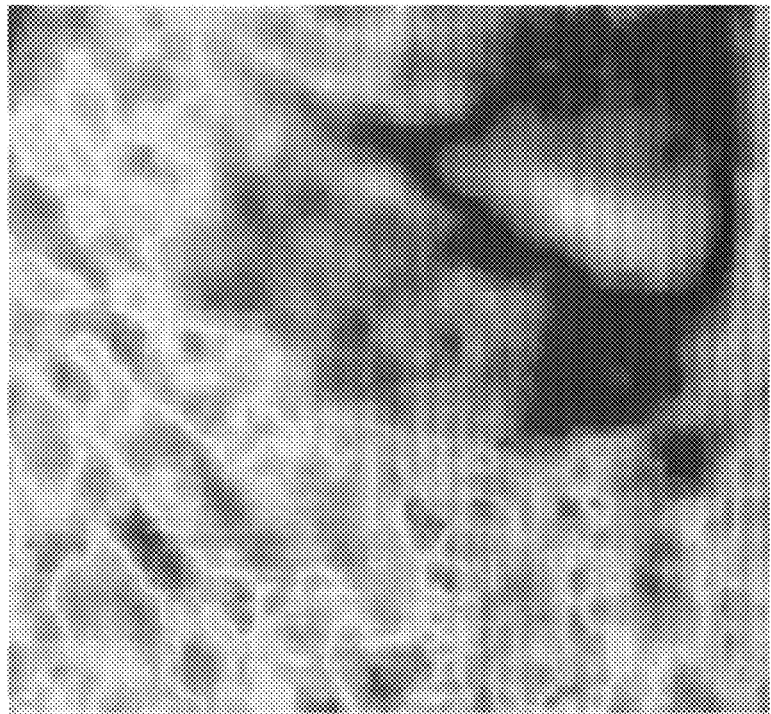
FIG. 12 illustrates synthetic data and field data, in accordance with one or more implementations of the present disclosure.
Figure 12:
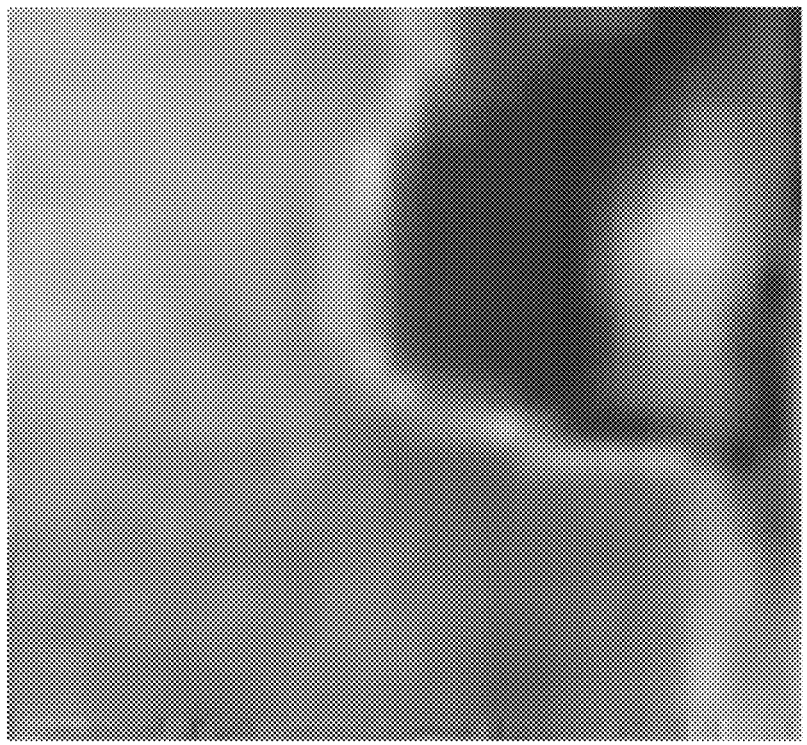

FIG. 12 illustrates synthetic data and field data, in accordance with one or more implementations of the present disclosure. 1202 may represent synthetic 4D acoustic impedance data in the subsurface volume of interest without noise added. 1204 may represent field 4D acoustic impedance data in the subsurface volume of interest. The dark spots may represent noise derived from one of various sources, as discussed herein. Differences between 1202 and 1204 can come from noise in the field data and/or from an erroneous model used to generate the synthetic data.

Figure 13:
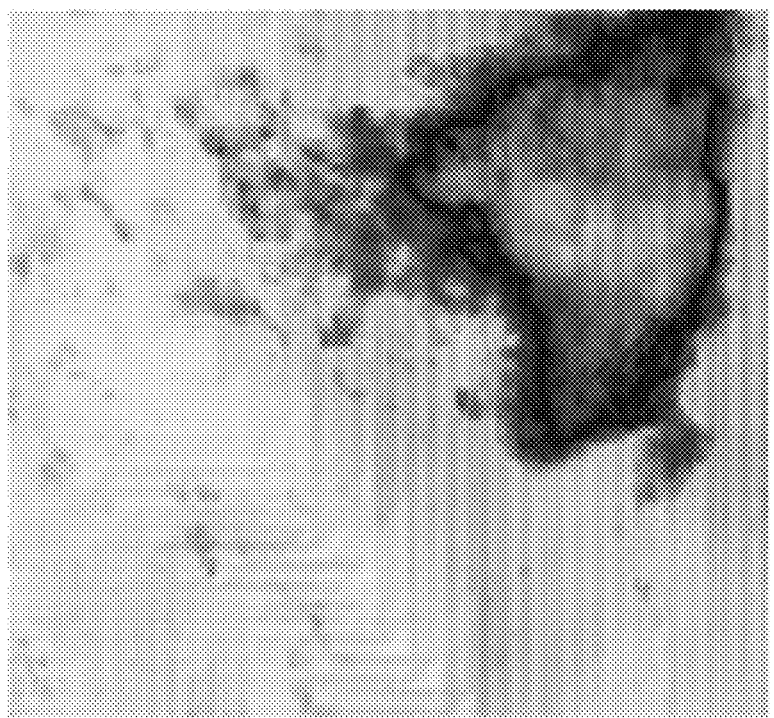
FIG. 13 illustrates the effect on the field data outputs from adding noise to synthetic input data during training, in accordance with one or more implementations of the present disclosure.
Figure 13:
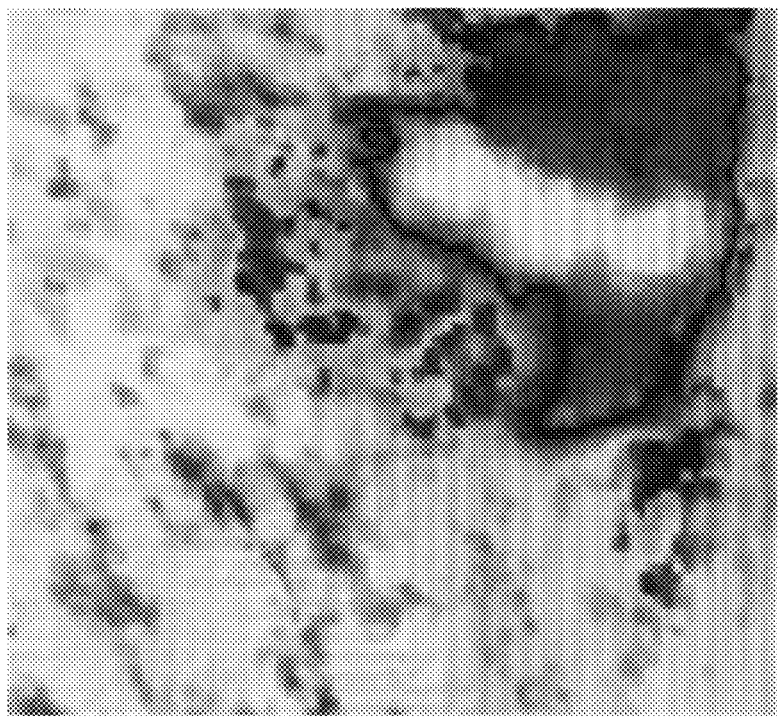

FIG. 13 illustrates the effect of adding noise to synthetic input data during training, in accordance with one or more implementations of the present disclosure. 1302 may represent output data, i.e., 4D water saturation data, with no noise added to their corresponding input data during training. 1304 may represent field output data, i.e., 4D water saturation data, after noise is added to their corresponding input data during training, which generates fewer stray spots in the subsurface volume of interest. In other words, adding the noise to the inputs during training may provide clearer, more accurate output data. In implementations, noise may be added for model regularization and/or to improve field data prediction results.

Figure 14:
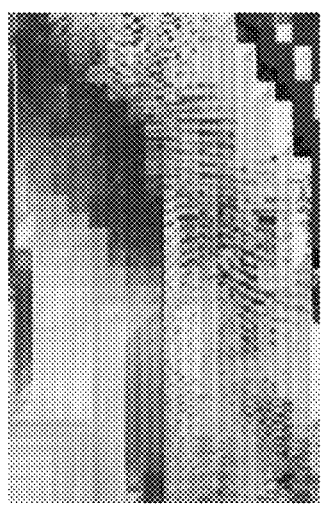
FIG. 14 illustrates example ground truth and field data of a subsurface volume of interest generated from a model, in accordance with one or more implementations of the present disclosure.
Figure 14:
Figure 14:
Figure 14:
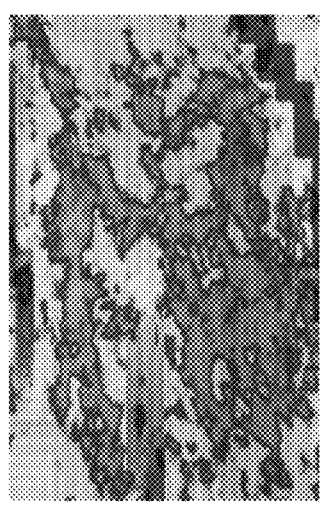
Figure 14:
Figure 14:
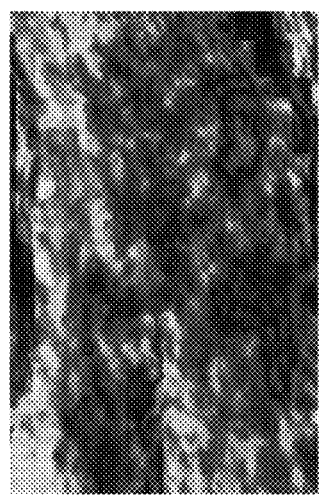

FIG. 14 illustrates example data derived from models and simulation-generated and input field data of a subsurface volume of interest, in accordance with one or more implementations of the present disclosure. 1402, 1404, and 1406 may represent the ground truth data. 1408, 1410, and 1412 may represent field data output generated from one of the models discussed herein (e.g., subsurface models, elastic models, subsurface property models, etc.). 1402 and 1408 may represent 4D pore pressure data. The general similarities, such as the clustering of data, may validate the feasibility of the presently disclosed technology. Similarly, 1404 and 1410, which may represent 4D water saturation data, also show similar spots with no 4D water saturation changes, which may validate the feasibility of the presently disclosed technology. 1406 and 1412 may represent 4D gas saturation data, which also show similarities in the general clustering of data, also validating the feasibility of the presently disclosed technology.

Figure 15:
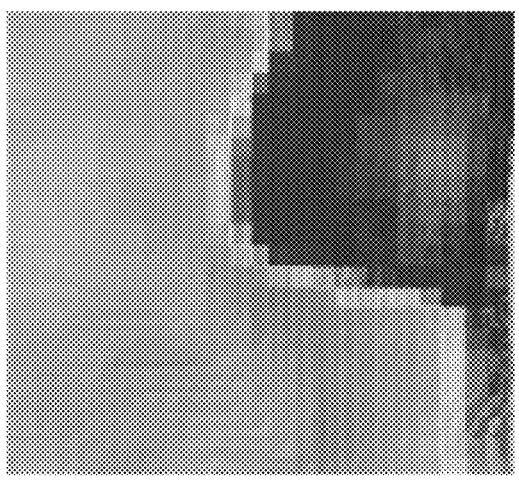
FIG. 15 illustrates example ground truth data and field data generated from a model, in accordance with one or more implementations of the present disclosure.
Figure 15:
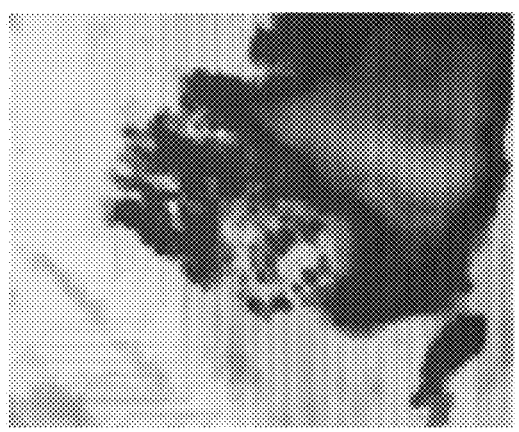
Figure 15:
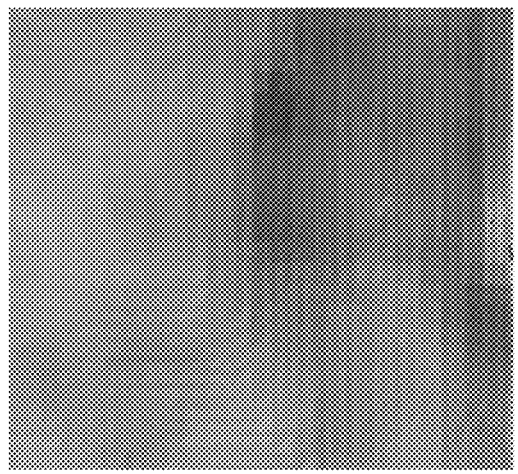
Figure 15:
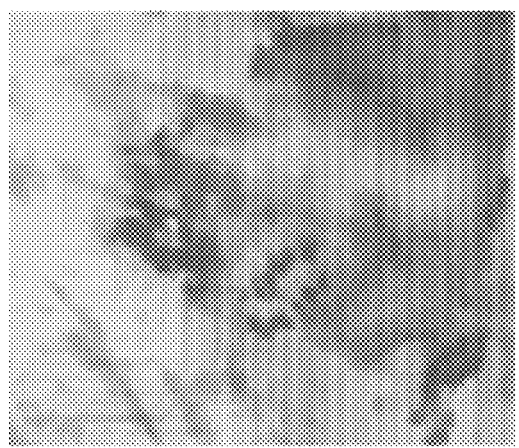
Figure 15:
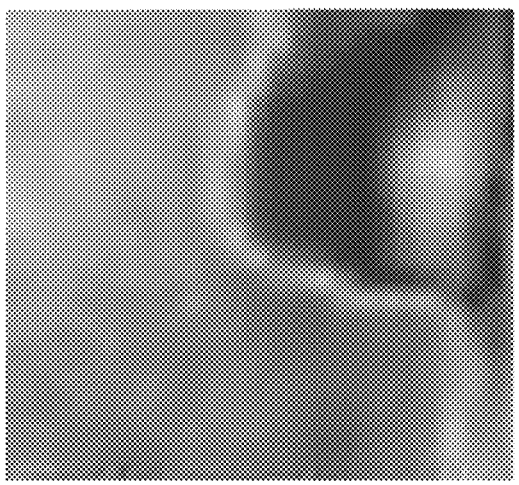
Figure 15:
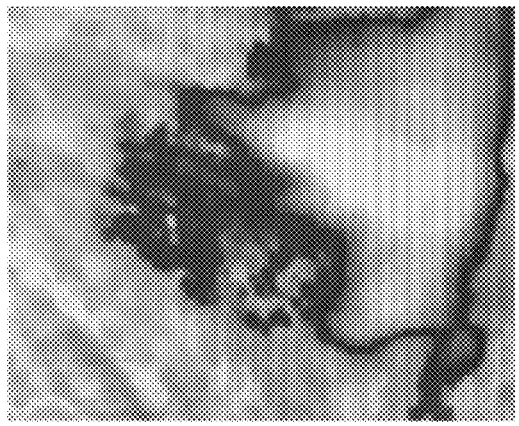

FIG. 15 illustrates example ground truth data and data generated from a model, in accordance with one or more implementations of the present disclosure. 1502, 1504, and 1506 may represent the ground truth data. The ground truth data may refer to data that are collected from the subsurface volume of interest. These could be used to validate the model and/or train the model that is used to generate 1508, 1510, and/or 1512, or they could be used as training data. 1502 may represent ground truth data for the 4D acoustic impedance data in the subsurface volume of interest. 1504 may represent ground truth data for the 4D shear impedance data in the subsurface volume of interest. 1506 may represent ground truth data for the 4D density data in the subsurface volume of interest.

1508, 1510, and 1512 may represent field output data generated from one of the models discussed herein (e.g., subsurface models, elastic models, subsurface property models, etc.). These models may have been trained using a neural net. 1508 may represent 4D acoustic impedance data in the subsurface volume of interest generated using a neural net model. As illustrated, 1508 is substantially similar to 1502, validating the presently disclosed technology. 1510 may represent 4D shear impedance data in the subsurface volume of interest generated using a neural net model. As illustrated, 1510 is substantially similar to 1504, validating the presently disclosed technology. 1512 may represent 4D density data in the subsurface volume of interest generated using a neural net model. As illustrated, 1512 is substantially similar to 1506, validating the presently disclosed technology.

Figure 16:
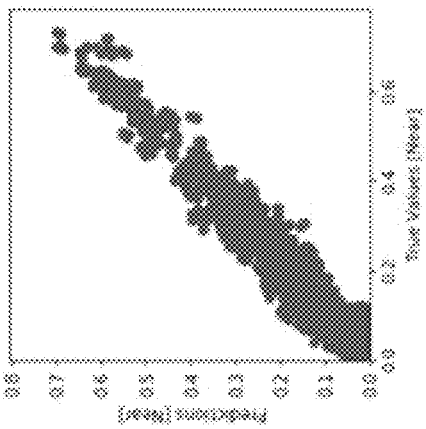
FIG. 16 illustrates example ground truth data (left column) and synthetic outputs (right column) generated from a model, in accordance with one or more implementations of the present disclosure.
Figure 16:
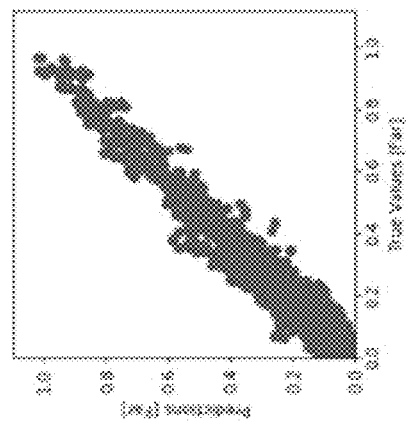
Figure 16:
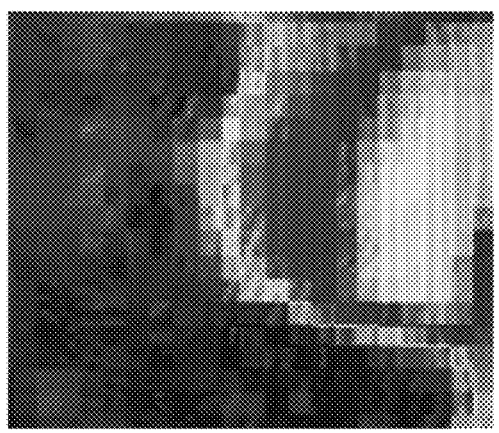
Figure 16:
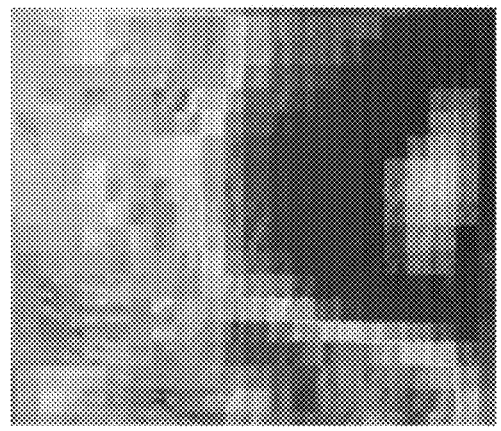
Figure 16:
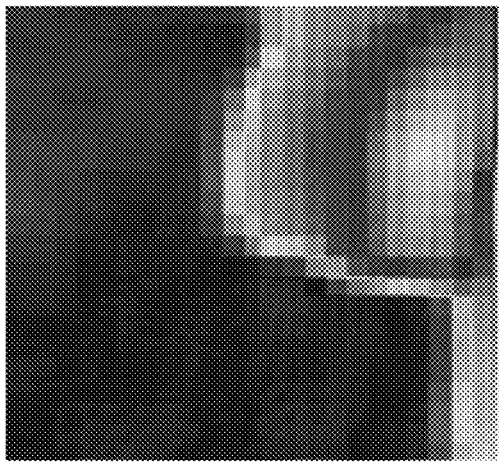
Figure 16:
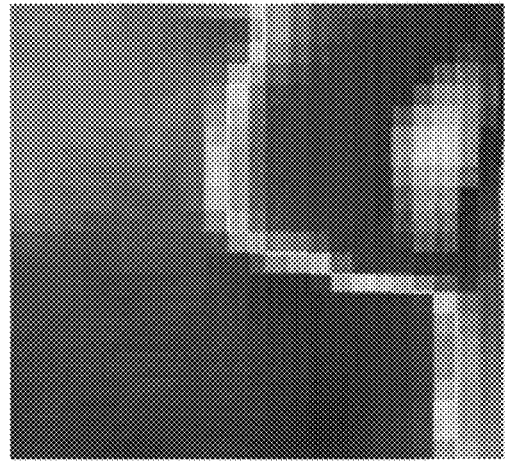

FIG. 16 illustrates example ground truth data and data generated from a model, in accordance with one or more implementations of the present disclosure. 1602 and 1608 may represent the ground truth data. The ground truth data may refer to data that are collected from the subsurface volume of interest. These could be used to validate the model and/or train the model that is used to generate 1604 and/or 1610, or they could be used as training data. 1602 may represent ground truth data for the 4D near stack data in the subsurface volume of interest. 1608 may represent ground truth data for the 4D far stack data in the subsurface volume of interest.

1604 and 1610 may represent data generated from one of the models discussed herein (e.g., subsurface models, elastic models, subsurface property models, etc.). These models may have been trained using a neural net. 1604 may represent 4D near stack data in the subsurface volume of interest generated using a neural net model. As illustrated, 1604 is substantially similar to 1602, validating the presently disclosed technology. 1610 may represent 4D far stack data in the subsurface volume of interest generated using a neural net model. As illustrated, 1610 is substantially similar to 1608, validating the presently disclosed technology.

1604 and 1610 may be generated based on 4D pore pressure data, 4D water saturation data, and 4D gas saturation data. In some implementations, 4D pore pressure and saturation data may be inputs that correspond to the outputs shown here from a neural net model. This figure illustrates the forward modeling process. No inputs are displayed in this figure. 1604 and 1610 may be representations of the data charted in 1606 and 1612, respectively. The x axis may represent the ground truth (i.e., true values) for the near and far stack data, while the y axis represents the predictions generated by the models for the near and far stack data. In general, both models used to predict the near and far stack data are fairly accurate, though the model for the far stack may be more precise, as the data are more tightly clustered around the diagonal line.

The presently disclosed technology provides the data discussed herein faster than collecting field data and/or other existing methods. For example, this method could provide generated data within minutes, hours, days, or weeks, instead of months. The presently disclosed technology can be used for lithologic identification and to rapidly update reservoir simulation models to improve history matching and production forecasting. The presently disclosed technology may provide significant advantages to reservoir management decisions, such as for example, well development, production forecasting, reservoir performance, as well as improving reservoir uncertainty management planning. In some implementations, the generated data may be used to self-update the reservoir simulation model and locate discrepancies between synthetic data and ground truth data to improve the presently disclosed technology and/or the reservoir simulation model.

Figure 17:
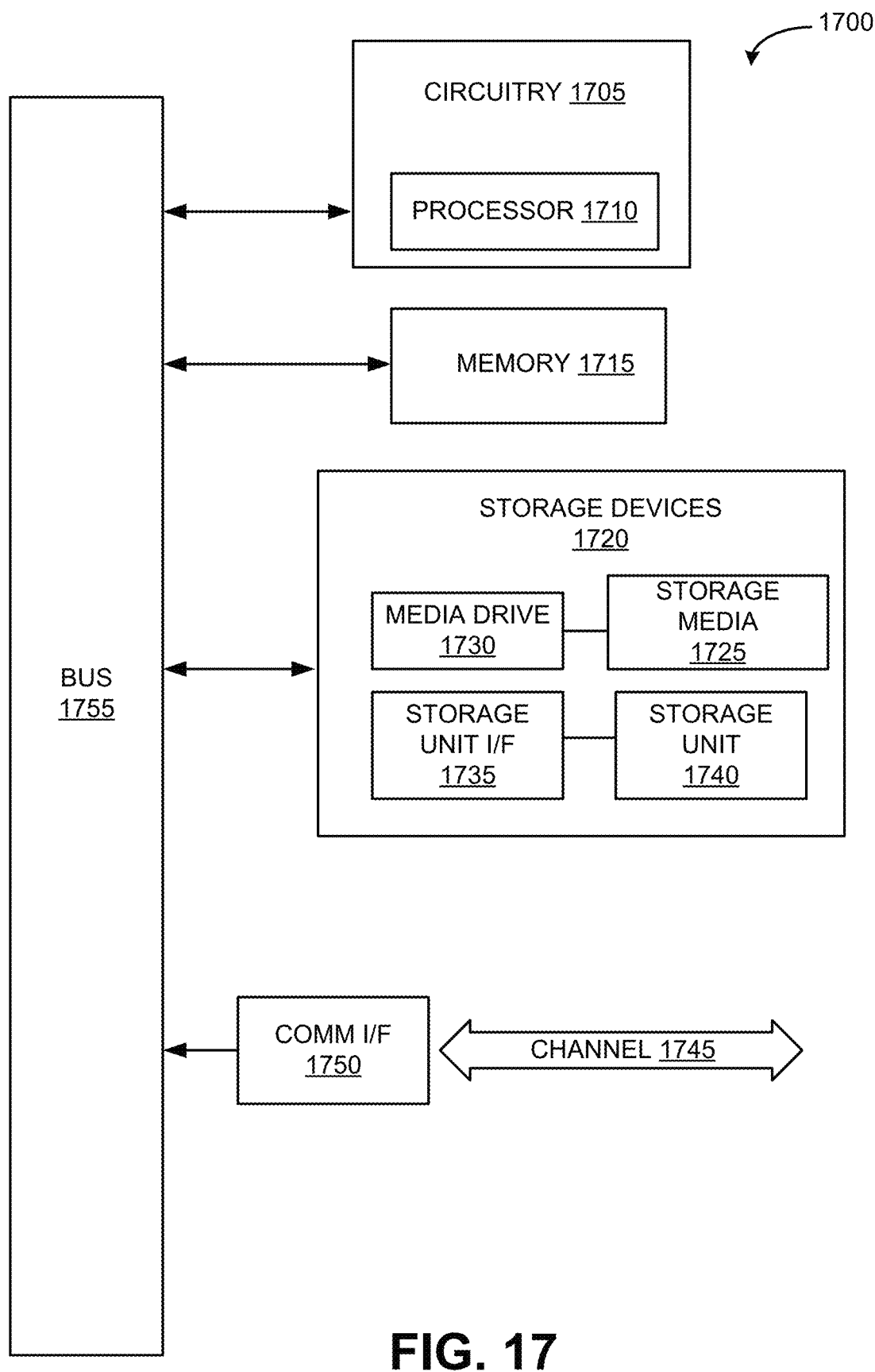
FIG. 17 illustrates an example computing component that may be used in implementing various features of the disclosed technology.

As used herein, the term component might describe a given unit of functionality that can be performed in accordance with one or more implementations, of the technology disclosed herein. As used herein, a component might be implemented utilizing any form of hardware, software, or a combination thereof. For example, a processor, controller, ASIC, PLA, PAL, CPLD, FPGA, logical component, software routine or other mechanism might be implemented to make up a component. In implementation, the various components described herein might be implemented as discrete components or the functions and features described can be shared in part or in total among components. In other words, as would be apparent to one of ordinary skill in the art after reading this description, the various features and functionality described herein may be implemented in any given application and can be implemented in separate or shared components in various combinations and permutations. Even though various features or elements of functionality may be individually described or claimed as separate components, one of ordinary skill in the art will understand that these features and functionality can be shared among common software and hardware elements, and such description shall not require or imply that separate hardware or software components are used to implement such features or functionality.

Where components of the technology are implemented in whole or in part using software, in one or more implementations, these software elements can be implemented to operate with a computing or processing component capable of carrying out the functionality described with respect thereto. One such example computing component is shown in FIG. 17. Various implementations are described in terms of this example-computing component 1700. After reading this description, it will become apparent to a person skilled in the relevant art how to implement the technology using other computing components or architectures.

Referring now to FIG. 17, computing component 1700 may represent, for example, computing or processing capabilities found within mainframes, supercomputers, workstations, or servers; desktop, laptop, notebook, or tablet computers; hand-held computing devices (tablets, PDA's, smartphones, cell phones, palmtops, and/or other hand-held computing devices); or the like, depending on the application and/or environment for which computing component 1700 is specifically purposed.

Computing component 1700 may include, for example, a processor, controller, control component, or other processing device, such as a processor 1710, and such as may be included in circuitry 1705. Processor 1710 may be implemented using a special-purpose processing component such as, for example, a microprocessor, controller, or other control logic. In the illustrated example, processor 1710 is connected to bus 1755 by way of circuitry 1705, although any communication medium may be used to facilitate interaction with other components of computing component 1700 or to communicate externally.

Computing component 1700 may also include a memory component, simply referred to herein as main memory 1715. For example, random access memory (RAM) or other dynamic memory may be used for storing information and instructions to be executed by processor 1710 or circuitry 1705. Main memory 1715 may also be used for storing temporary variables or other intermediate information during execution of instructions to be executed by processor 1710 or circuitry 1705. Computing component 1700 may likewise include a read only memory (ROM) or other static storage device coupled to bus 1755 for storing static information and instructions for processor 1710 or circuitry 1705.

Computing component 1700 may also include various forms of information storage devices 1720, which may include, for example, media drive 1730 and storage unit interface 1735. Media drive 1730 may include a drive or other mechanism to support fixed or removable storage media 1725. For example, a hard disk drive, a floppy disk drive, a magnetic tape drive, an optical disk drive, a CD or DVD drive (R or RW), or other removable or fixed media drive may be provided. Accordingly, removable storage media 1725 may include, for example, a hard disk, a floppy disk, magnetic tape, cartridge, optical disk, a CD or DVD, or other fixed or removable medium that is read by, written to, or accessed by media drive 1730. As these examples illustrate, removable storage media 1725 may include a computer usable storage medium having stored therein computer software or data.

In alternative implementations, information storage devices 1720 may include other similar instrumentalities for allowing computer programs or other instructions or data to be loaded into computing component 1700. Such instrumentalities may include, for example, fixed or removable storage unit 1740 and storage unit interface 1735. Examples of such removable storage units 1740 and storage unit interfaces 1735 may include a program cartridge and cartridge interface, a removable memory (for example, a flash memory or other removable memory component) and memory slot, a PCMCIA slot and card, and other fixed or removable storage units 1740 and storage unit interfaces 1735 that allow software and data to be transferred from removable storage unit 1740 to computing component 1700.

Computing component 1700 may also include a communications interface 1750. Communications interface 1750 may be used to allow software and data to be transferred between computing component 1700 and external devices. Examples of communications interface 1750 include a modem or softmodem, a network interface (such as an Ethernet, network interface card, WiMedia, IEEE 1702.XX, or other interface), a communications port (such as for example, a USB port, IR port, RS232 port Bluetooth® interface, or other port), or other communications interface. Software and data transferred via communications interface 1750 may typically be carried on signals, which may be electronic, electromagnetic (which includes optical) or other signals capable of being exchanged by a given communications interface 1750. These signals may be provided to/from communications interface 1750 via channel 1745. Channel 1745 may carry signals and may be implemented using a wired or wireless communication medium. Some non-limiting examples of channel 1745 include a phone line, a cellular or other radio link, a RF link, an optical link, a network interface, a local or wide area network, and other wired or wireless communications channels.

In this document, the terms "computer program medium" and "computer usable medium" are used to generally refer to transitory or non-transitory media such as, for example, main memory 1715, storage unit interface 1735, removable storage media 1725, and channel 1745. These and other various forms of computer program media or computer usable media may be involved in carrying a sequence of instructions to a processing device for execution. Such instructions embodied on the medium, are generally referred to as "computer program code" or a "computer program product" (which may be grouped in the form of computer programs or other groupings). When executed, such instructions may enable the computing component 1700 or a processor to perform features or functions of the present application as discussed herein.

While various implementations, of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning, and configurations can be implemented to implement the desired features of the technology disclosed herein. Also, a multitude of different constituent component names other than those depicted herein can be applied to the various partitions. Additionally, with regard to flow diagrams, operational descriptions, and method claims, the order in which the steps are presented herein shall not mandate that various implementations be implemented to perform the recited functionality in the same order unless the context dictates otherwise.

Although the disclosed technology is described above in terms of various exemplary implementations, and implementations, it should be understood that the various features, aspects, and functionality described in one of the individual implementations are not limited in their applicability to the particular implementation with which they are described, but instead can be applied, alone or in various combinations, to one or more of the other implementations of the disclosed technology, whether or not such implementations are described and whether or not such features are presented as being a part of a described implementation. Thus, the breadth and scope of the technology disclosed herein should not be limited by any of the above-described exemplary implementations.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The presence of words such as "first," "second," "third," or other like words in some instances shall not be read to mean there can only be one, two or three elements; it should be appreciated that there may be more than one, two, or three elements used in the presently disclosed technology. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various implementations set forth herein are described in terms of exemplary block diagrams, flow charts, and other illustrations. As will become apparent to one of ordinary skill in the art after reading this document, the illustrated implementations and their various alternatives can be implemented without confinement to the illustrated examples. For example, block diagrams and their accompanying description should not be construed as mandating a particular architecture or configuration.

What is claimed is:

1. A computer-implemented method for training a subsurface model to generate subsurface data as a function of position and time in a subsurface volume of interest, the method being implemented in a computer system that includes a physical computer processor, a display, and electronic storage, the method comprising:
    obtaining, from the electronic storage, a first training subsurface dataset comprising a first set of subsurface energy values obtained at a first set of times from a first set of field data sensors located at a first set of positions, and a first set of subsurface property values corresponding to the first set of subsurface energy values;
    obtaining, from the electronic storage, a first initial subsurface model and a first set of subsurface parameters based on a first set of subsurface relationships between the first training subsurface dataset and the first set of subsurface property values;
    determining (i) training subsurface property data from changes to the first set of subsurface property values as a function of position and time and (ii) changes to the first set of subsurface energy values as a function of position and time, wherein position and time are determined from the first set of positions and the first set of times, respectively;
    generating, with the physical computer processor, a first conditioned subsurface model by training the first initial subsurface model using the training subsurface property data, the first training subsurface dataset, and the changes to the first set of subsurface energy values as a function of position and time;
    storing the first conditioned subsurface model in the electronic storage;
    obtaining, from the electronic storage, a first target subsurface dataset comprising a second set of subsurface energy values obtained at a second set of times from a second set of field data sensors located at a second set of positions in the subsurface volume of interest, and a second set of subsurface property values corresponding to the second set of subsurface energy values;
    determining changes to the second set of subsurface property values as a function of position and time in the subsurface volume of interest;
    generating, with the physical computer processor, a first target subsurface property dataset based on the second set of subsurface energy values as a function of position and time in the subsurface volume of interest by applying the first conditioned subsurface model to the first target subsurface dataset;
    generating a representation of the first target subsurface dataset as a function of position and time in the subsurface volume of interest using visual effects to depict at least some of the first target subsurface dataset as a function of position and time; and
    displaying the representation via the display.

2. The computer-implemented method of claim 1, further comprising:
obtaining, from the electronic storage, a third set subsurface energy values obtained at a third set of times from field data sensors located at a third set of positions in the subsurface volume of interest, and a third set of subsurface property values corresponding to the third set of subsurface energy values;
generating a second target subsurface property dataset based on changes to the third set of subsurface property values as a function of position and time in the subsurface volume of interest, wherein a first noise corresponding to the first target subsurface property dataset is different from a second noise corresponding to the second target subsurface property dataset;
generating, with the physical computer processor, a second target subsurface dataset based on the third set of subsurface energy values as a function of position and time in the subsurface volume of interest by applying the first conditioned subsurface model to the second target subsurface property dataset; and
generating, with the physical computer processor, a first subsurface data uncertainty based on the first target subsurface dataset and the second target subsurface dataset.

3. The computer-implemented method of claim 1, further comprising:
obtaining, from the electronic storage, a second initial subsurface model and a second set of subsurface parameters defining a second set of subsurface relationships between a second training subsurface dataset and the subsurface properties;
generating, with the physical computer processor, a second conditioned subsurface model by training the second initial subsurface model using the training subsurface property data, a second training subsurface dataset, and the second set of subsurface parameters;
generating, with the physical computer processor, a third target subsurface dataset based on a third set of subsurface energy values as a function of position and time by applying the second conditioned subsurface model to the first target subsurface property dataset; and
generating, with the physical computer processor, a second subsurface data uncertainty based on the first target subsurface dataset and the third target subsurface dataset.

4. The computer-implemented method of claim 3, wherein the second initial subsurface model and the second conditioned subsurface model comprise a model design selected from a group consisting of a machine learning model, a model parameter, and a threshold, and the model design is different from the first subsurface models.

5. The computer-implemented method of claim 1, wherein the initial subsurface models and the conditioned subsurface models comprise one of a neural network, a random forest model, a support vector machine, a regression, and a Bayesian network.

6. The computer-implemented method of claim 1, wherein the subsurface property data comprise changes as a function of position and time to one of a geomechanical property, an anisotropic rock property, a reservoir pore pressure, a temperature, a fluid saturation, and a fluid property.

7. The computer-implemented method of claim 1, wherein the subsurface data comprise one of a seismic angle stack change, a prestack seismic property change, a time-shift, a time strain, an amplitude-versus-offset (AVO) gather change, a compressional velocity change, a shear-wave velocity change, a density change, a velocity ratio change, a Poisson Ratio change, an acoustic impedance change, and a shear impedance change.

8. The computer-implemented method of claim 1, wherein the subsurface parameters comprise one of a set of dry rock matrix coefficients, anisotropic coefficients, grain bulk modulus, grain density, pore pressure, overburden pressure, porosity, temperature, water saturation, oil saturation, gas saturation, brine salinity, oil API gravity, gas gravity, gas-oil ratio, geomechanical compaction coefficient, and geomechanical R-factor.

9. A computer-implemented method for training a subsurface model to generate subsurface data as a function of position and time in a subsurface volume of interest, the method being implemented in a computer system that includes a physical computer processor and electronic storage, the method comprising:
obtaining, from the electronic storage, a first set of subsurface energy values obtained at a first set of times from a first set of field data sensors located at a first set of positions, and a first set of subsurface property values corresponding to the first set of subsurface energy values;
obtaining, from the electronic storage, a first conditioned subsurface model, the first conditioned subsurface model having been generated by applying a first initial subsurface model to training subsurface property data, a first training subsurface dataset, and a first set of subsurface parameters, wherein the training subsurface property data is based on changes to the first set of subsurface property values as a function of position and time, the first training subsurface dataset is based on changes to the first set of subsurface energy values as a function of position and, and the first set of subsurface parameters defines a first set of subsurface relationships between a first training subsurface dataset and the first set of subsurface property values;
obtaining, from the electronic storage, a first target subsurface property dataset based on changes to a second set of subsurface property values as a function of position and time in the subsurface volume of interest; and
obtaining, from field sensors in a subsurface volume of interest, a second set of subsurface energy values;
generating, with the physical computer processor, a first target subsurface dataset based on the second set of subsurface energy values as a function of position and time in the subsurface volume of interest by applying the first conditioned subsurface model to the first target subsurface property dataset.

10. The computer-implemented method of claim 9, wherein the computer system comprises a display, and wherein the computer-implemented method further comprises:
generating, with the physical computer processor, a representation of the subsurface data as a function of position and time in the subsurface volume of interest using visual effects to depict at least some of the first target subsurface dataset as a function of position and time; and
displaying the representation via the display.

11. The computer-implemented method of claim 9, further comprising:
obtaining, from the electronic storage, a second target subsurface property dataset based on changes to a second set of subsurface property values as a function of position and time in the subsurface volume of interest, wherein a first noise value corresponding to the first target subsurface property dataset is different from a second noise value corresponding to the second target subsurface property dataset;

generating, with the physical computer processor, a second target subsurface dataset based on a second set of subsurface energy values as a function of position and time in the subsurface volume of interest by applying the first conditioned subsurface model to the second target subsurface property dataset; and generating, with the physical computer processor, a first subsurface data uncertainty based on the first target subsurface dataset and the second target subsurface dataset.

12. The computer-implemented method of claim 11, wherein the computer system comprises a display, and wherein the computer-implemented method further comprises:

generating, with the physical computer processor, a representation of the first target subsurface dataset and the first subsurface data uncertainty as a function of position and time in the subsurface volume of interest using visual effects to depict a portion of the first target subsurface dataset as a function of position and time and corresponding first subsurface data uncertainty; and displaying the representation via the display.

13. The computer-implemented method of claim 9, further comprising:

obtaining, from the electronic storage, a second initial subsurface model and a second set of subsurface parameters defining a second set of subsurface relationships between a second training subsurface dataset and the subsurface properties;

generating, with the physical computer processor, a second conditioned subsurface model by training the second initial subsurface model using the training subsurface property data, a second training subsurface dataset, and the second set of subsurface parameters;

generating, with the physical computer processor, a third target subsurface dataset based on a third set of subsurface energy values as a function of position and time by applying the second conditioned subsurface model to the first target subsurface property dataset; and generating, with the physical computer processor, a second subsurface data uncertainty based on the first target subsurface dataset and the third target subsurface dataset.

14. A system for generating subsurface data as a function of position and time in a subsurface volume of interest, the system comprising:

a display;
electronic storage; and
a physical computer processor configured by machine readable instructions to:

obtain, from the electronic storage, a first training subsurface dataset comprising a first set subsurface energy values obtained at a first set of times from a first set of field data sensors located at a first set of positions, and a first set of subsurface property values corresponding to the first set of subsurface energy values;

obtain, from the electronic storage, a first conditioned subsurface model, the first conditioned subsurface model having been generated by applying a first initial subsurface model to the training subsurface property data, the first training subsurface dataset, and the first set of subsurface property values;

obtain, from the electronic storage, a second set subsurface energy values obtained at a second set of times from a second set of field data sensors located at a second set of positions in a subsurface volume of interest, and a second set of subsurface property values corresponding to the second set of subsurface energy values;

determine changes to the second set of subsurface property values as a function of position and time in the subsurface volume of interest; and generate, with the physical computer processor, a first target subsurface dataset based on the second set of subsurface energy values as a function of position and time in the subsurface volume of interest by applying the first conditioned subsurface model to the second set of subsurface property values;

generate, with the physical computer processor, a representation of the first target subsurface dataset using visual effects to depict a portion of the first target subsurface dataset as a function of position and time; and display the representation via the display.

15. The system of claim 14, wherein the physical computer processor is further configured by machine readable instructions to:

obtain, from the electronic storage, a second target subsurface property dataset based on changes to the second set of subsurface property values as a function of position and time in the subsurface volume of interest, wherein a first noise corresponding to the first target subsurface property dataset is different from a second noise corresponding to the second target subsurface property dataset;

generate, with the physical computer processor, a second target subsurface dataset based on a second set of subsurface energy values as a function of position and time in the subsurface volume of interest by applying the first conditioned subsurface model to the second target subsurface property dataset; and generate, with the physical computer processor, a first subsurface data uncertainty based on the first target subsurface dataset and the second target subsurface dataset.

16. The system of claim 14, wherein the physical computer processor is further configured by machine readable instructions to:

obtain, from the electronic storage, a second initial subsurface model and a second set of subsurface parameters defining a second set of subsurface relationships between a second training subsurface dataset and the second set of subsurface properties;

generate, with the physical computer processor, a second conditioned subsurface model by training the second initial subsurface model using the training subsurface property data, a second training subsurface dataset, and the second set of subsurface parameters;

generate, with the physical computer processor, a third target subsurface dataset based on a third set of subsurface energy values as a function of position and time by applying the second conditioned subsurface model to the first target subsurface property dataset; and generate, with the physical computer processor, a second subsurface data uncertainty based on the first target subsurface dataset and the third target subsurface dataset.

17. The system of claim 16, wherein the second initial subsurface model and the second conditioned subsurface model comprise a model design selected from a group consisting of a machine learning model, a model parameter, and a threshold, and the model design is different from the first subsurface models.

\* \* \* \* \*